United States Patent
Gross et al.

(10) Patent No.: US 9,305,278 B2
(45) Date of Patent: Apr. 5, 2016

(54) SYSTEM AND METHOD FOR COMPILING INTELLECTUAL PROPERTY ASSET DATA

(75) Inventors: John Nicholas Gross, Berkeley, CA (US); Ken Sale, Castro Valley, CA (US); Alan Meyer, Danville, CA (US); Ken Boasso, Danville, CA (US)

(73) Assignee: Patent Savant, LLC, Berkeley, CA (US)

( * ) Notice: Subject to any disclaimer, the term of this patent is extended or adjusted under 35 U.S.C. 154(b) by 0 days.

(21) Appl. No.: 13/355,298

(22) Filed: Jan. 20, 2012

(65) Prior Publication Data

US 2012/0191757 A1 Jul. 26, 2012

Related U.S. Application Data

(60) Provisional application No. 61/434,588, filed on Jan. 20, 2011, provisional application No. 61/442,049, filed on Feb. 11, 2011.

(51) Int. Cl.
*G06F 17/30* (2006.01)
*G06Q 10/06* (2012.01)
(Continued)

(52) U.S. Cl.
CPC ...... *G06Q 10/0633* (2013.01); *G06F 17/30864* (2013.01); *G06Q 10/0637* (2013.01); *G06Q 10/10* (2013.01); *G06Q 50/184* (2013.01)

(58) Field of Classification Search
CPC ... G06F 17/30864; G06F 8/65; G06F 9/4443; G06F 17/30; G06F 15/16; G06F 17/60; G06Q 50/184; G06Q 10/00; G06Q 10/10; G06Q 10/0633; G06Q 10/0637
USPC .......... 707/781, E17.005, E17.032, 770, 769, 707/E17.014, 707; 705/310, 7.36, 7.27, 705/26.25, 27.1, 37; 709/203, 207, 219, 709/225; 713/182, 183, 184, 179; 463/31, 463/9, 43, 42; 340/689, 407; 726/3, 6; 704/231, 270
See application file for complete search history.

(56) References Cited

U.S. PATENT DOCUMENTS

| | | | | |
|---|---|---|---|---|
| 5,628,004 A | * | 5/1997 | Gormley et al. | 707/999.104 |
| 5,806,057 A | * | 9/1998 | Gormley et al. | 707/640 |
| 5,892,769 A | * | 4/1999 | Lee | H04L 12/413 370/447 |

(Continued)

FOREIGN PATENT DOCUMENTS

WO WO2010087566 A1 8/2010

OTHER PUBLICATIONS

Reiner Kraft; Chi Chao Chang; Farzin Maghoul; and Ravi Kumar—"Searching with Context"—Published in: Proceeding WWW '06 Proceedings of the 15th international conference on World Wide Web—May 23-26, 2006, Edinburgh, Scotland.—pp. 477-486.*

(Continued)

*Primary Examiner* — Anh Ly
(74) *Attorney, Agent, or Firm* — Law Office of J. Nicholas Gross, PC

(57) ABSTRACT

An access server computing system scrapes a set of records maintained by a target computing system in a database which is only made accessible over the Internet with a limited protocol query and an access challenge. The access server accesses the target computing system through an Internet browser interface based on emulating a user query made through the limited protocol, including by automatically passing locator identifier fields to retrieve a corresponding set of record which are stored in the first database.

19 Claims, 30 Drawing Sheets

(51) Int. Cl.
*G06Q 50/18* (2012.01)
*G06Q 10/10* (2012.01)

(56) References Cited

U.S. PATENT DOCUMENTS

| | | | |
|---|---|---|---|
| 5,991,751 A | 11/1999 | Rivette et al. | |
| 5,999,907 A * | 12/1999 | Donner | 705/310 |
| 6,026,409 A * | 2/2000 | Blumenthal | 707/999.003 |
| 6,182,116 B1 * | 1/2001 | Namma et al. | 709/204 |
| 6,195,714 B1 * | 2/2001 | Li | H04Q 11/0478 370/352 |
| 6,289,342 B1 | 9/2001 | Lawrence et al. | |
| 6,615,166 B1 * | 9/2003 | Guheen | G06Q 10/06 709/220 |
| 6,779,024 B2 | 8/2004 | DeLaHuerga | |
| 6,834,110 B1 * | 12/2004 | Marconcini | G06Q 20/382 707/E17.116 |
| 7,027,052 B1 * | 4/2006 | Thorn et al. | 345/440 |
| 7,676,375 B1 * | 3/2010 | Neifeld et al. | 705/310 |
| 7,865,383 B2 | 1/2011 | Tafoya | |
| 8,762,537 B2 * | 6/2014 | Alperovitch | G06F 21/554 709/206 |
| 2002/0002481 A1 | 1/2002 | Uchio et al. | |
| 2002/0038233 A1 | 3/2002 | Shubov et al. | |
| 2002/0042784 A1 | 4/2002 | Kerven et al. | |
| 2002/0093528 A1 | 7/2002 | Grainger | |
| 2002/0147738 A1 * | 10/2002 | Reader | 707/5 |
| 2002/0161733 A1 * | 10/2002 | Grainger | 705/1 |
| 2002/0174010 A1 * | 11/2002 | Rice, III | G06F 17/30194 707/E17.005 |
| 2002/0188633 A1 * | 12/2002 | Davis et al. | 707/513 |
| 2003/0040962 A1 | 2/2003 | Lewis | |
| 2003/0154122 A1 | 8/2003 | Jackson, Jr. et al. | |
| 2003/0177124 A1 | 9/2003 | Sauri | |
| 2003/0193994 A1 * | 10/2003 | Stickler | 375/150 |
| 2003/0195877 A1 | 10/2003 | Ford et al. | |
| 2003/0220897 A1 | 11/2003 | Lee et al. | |
| 2003/0229900 A1 * | 12/2003 | Reisman | G06F 17/30873 707/E17.111 |
| 2004/0078776 A1 * | 4/2004 | Moon et al. | 717/101 |
| 2004/0080524 A1 | 4/2004 | Yeh et al. | |
| 2004/0093323 A1 | 5/2004 | Bluhm et al. | |
| 2004/0117388 A1 | 6/2004 | Inaba | |
| 2004/0138936 A1 | 7/2004 | Johnson et al. | |
| 2004/0220842 A1 * | 11/2004 | Barney | G06Q 10/10 705/7.31 |
| 2004/0249739 A1 | 12/2004 | Axford | |
| 2005/0055625 A1 * | 3/2005 | Kloss | 715/500.1 |
| 2005/0203899 A1 | 9/2005 | Anderson et al. | |
| 2005/0210009 A1 | 9/2005 | Tran | |
| 2005/0234738 A1 * | 10/2005 | Hodes | 705/1 |
| 2006/0053077 A1 * | 3/2006 | Mourad | G06F 17/3089 707/E17.116 |
| 2006/0080135 A1 | 4/2006 | Frank et al. | |
| 2006/0085219 A1 * | 4/2006 | Frank et al. | 705/1 |
| 2006/0129593 A1 | 6/2006 | Slovak et al. | |
| 2006/0173920 A1 | 8/2006 | Adler et al. | |
| 2006/0271379 A1 * | 11/2006 | Resnick et al. | 705/1 |
| 2007/0027811 A1 | 2/2007 | Jackson et al. | |
| 2007/0094298 A1 * | 4/2007 | Parent | 707/102 |
| 2007/0116193 A1 | 5/2007 | Cheng et al. | |
| 2007/0124166 A1 | 5/2007 | Van Luchene | |
| 2007/0208669 A1 * | 9/2007 | Rivette et al. | 705/59 |
| 2007/0208719 A1 * | 9/2007 | Tran | 707/3 |
| 2007/0219853 A1 | 9/2007 | Van Luchene et al. | |
| 2007/0219854 A1 | 9/2007 | Mueller et al. | |
| 2007/0294232 A1 | 12/2007 | Gibbs et al. | |
| 2008/0010198 A1 * | 1/2008 | Eliscu | 705/40 |
| 2008/0016022 A1 | 1/2008 | Holt | |
| 2008/0016067 A1 * | 1/2008 | Holt | 707/6 |
| 2008/0021900 A1 | 1/2008 | Holt et al. | |
| 2008/0065685 A1 * | 3/2008 | Frank | 707/102 |
| 2008/0072145 A1 * | 3/2008 | Blanchard et al. | 715/273 |
| 2008/0077570 A1 * | 3/2008 | Tang et al. | 707/5 |
| 2008/0133338 A1 * | 6/2008 | Frank et al. | 705/10 |
| 2008/0140786 A1 * | 6/2008 | Tran | 709/206 |
| 2008/0208606 A1 | 8/2008 | Allsop et al. | |
| 2009/0138466 A1 * | 5/2009 | Henry et al. | 707/5 |
| 2009/0150326 A1 | 6/2009 | Sheets | |
| 2009/0282045 A1 * | 11/2009 | Hsieh et al. | 707/9 |
| 2009/0313041 A1 | 12/2009 | Eder | |
| 2010/0191564 A1 * | 7/2010 | Lee et al. | 705/7 |
| 2010/0299301 A1 | 11/2010 | Busch et al. | |
| 2011/0099463 A1 * | 4/2011 | Abagyan et al. | 715/202 |
| 2011/0145120 A1 | 6/2011 | Lee et al. | |
| 2012/0130773 A1 | 5/2012 | Abu-Ghazalah et al. | |
| 2012/0191619 A1 * | 7/2012 | Gross | 705/310 |
| 2012/0191748 A1 * | 7/2012 | Gross | 707/769 |

OTHER PUBLICATIONS

Tomasz Imielinski and Alessio Signorini—"If You Ask Nicely, I will Answer: Semantic Search and Today's Search Engines"—Published in: Semantic Computing, 2009. ICSC '09. IEEE International Conference on; Date of Conference: Sep. 14-16, 2009; Conference Location :Berkeley, CA—pp. 184-191.*
Israel Patent Office Web Pages, Patent Office Database Screenshot and Advanced Search Page Portal, retrieved from http://www.ilpatsearch.justice.gov.il/Ul/AdvancedSearch.aspx on Oct. 23, 2013, pp. 4.
Google, "USPTO Bulk Downloads: PAIR Data", available online Oct. 20, 2010, retrieved from http://www.google.com/googlebooks/uspto-patents-pair.html on Oct. 29, 2013.
Patent Search, "Patent Watch", available online Oct. 26, 2009, retrieved from http://www.patentsearoh.net.au/patentwatch.aspx on Oct. 28, 2013.
USPTO, "Private PAIR: Quick Start Guide", available Oct. 2009, retrieved from http://www.uspto.gov/patents/process/status/private_pair/PrivPairOverview_Oct09.pdf on Oct. 28, 2013.
WIPO, Committee on Development and Intellectual Properly (CDIP), "Study Paper Regarding Recommendation 8", Sixth Session Geneva, Nov. 22-26, 2010, retrieved from www.wipo.intiedocs/mdocs/mdocs/../cdip_3_inC2studLiiUnC1.doc on Oct. 23, 2013.
Intellogist.com, Report on Patent Lens, retrieved from https://web.archive.org/web/20090701 002456/http://www.intellogist.com/wiki/Report:Patent_Lens/Search_interface/TheSearch_Forms/Structured_Search on Jul. 1, 2014, pp. 16.
Putnam, Jonathan "The Economics of Patent Portfolio Valuation", published Jun. 1, 1999, retrieved at http://www.ipfrontline.com/depts/article.aspx?id=16&depid=3# on Jul. 7, 2014, pp. 2.
Trademark Manual of Examining Procedure Section 104, available online May 16, 2008, retrieved at http://www.bitlaw.com/source/tmep/1 04.html on Jul. 3, 2014, pp. 2.
Moore, Kimberly A. "Worthless patents." Berkeley Tech. LJ 20 (2005): 1521, 32 pages.
Wolf, Greenfield & Sacks, P.C. "Trademark Searching", published Sep. 18, 2006, retrieved from http://www.wolfgreenfield.com/files/martin_lisa_trademark_searching_inta_91806.pdf on Jul. 2, 2014, pp. 46.
Ambrogi, Robert, "Patent and Trademark Searching Via the Web", published Jan. 2004, retrieved at http://www/legaline.com/Jan2004column.html on Jul. 2, 2014, pp. 4.
Erdmann, Charlotte A. "Patent Search Tools and the 8-Step Strategy" published Fall 2005, retrieved at http://www.powershow.com/view1/7021f-ZDc1Z1PATENT_SEARCH_TOOLS_AND_THE_8STEPSTRATEGY_powerpoint_ppt_presentation on Jul. 2, 2014, pp. 45.

* cited by examiner

FIGURE 7A

Patent Savant ™

I want information On...

- PTO Records *(FIGURE 7E)*
- Reexams *(FIGURE 7B)*
- Reissues
- Pending Apps
- Litigations/ Appeals (BPAI)
- Alerts *(FIGURE 7J)*
- Examiners *(FIGURE 7F)*
- Attorneys/ Agents *(FIGURE 7H)*
- Companies *(FIGURE 7I)*
- Documents *(FIGURE 7B)*
- Predictions/ Crowdsource *(FIGURE 7G)*

Most Recently Filed (# or date)
{Case id, patent #, title, assignee, date...}
...

Most Recent Events
{Case id, date, event...}
...

Activity in my cases
{Case id, my label, patent #, date, event...}
...

My alerts!
{alert type, Case id, my label, patent #, date...}

News/Cases
AB Corp wins patent jury verdict
CAFC upholds damages award in XY case
PTO rules change
...

Recent Predictions
123 Corp predicted to win patent case
Prediction for CD Corp changes dramatically
...

Reexamination Record Search/Filter

Basic Text Search

Search In                           Search For

Application Data

○    Reexam Control Number    [        ]
○    Patent Number            [        ]
○    Serial Number            [        ]

○    Patent Title             [        ]
○    Patent Specification     [        ]
○    Patent Inventor          [        ]
○    Patent Class/Subclass    [        ]

○    Examiner                 [        ]                720
○    Art Unit                 [        ]

○    Assignee                         [        ]
○    Attorney/Agent for Requester     [        ]
○    Attorney/Agent for Patent Owner  [        ]
○    Correspondence Name              [        ]
○    Correspondence Address           [        ]
○    Current Status                   [        ]
○    Status Date                      [        ]

Transaction History

○    Transaction Description  [        ]

Image File Wrapper

Text                          [        ]
○ Text in Any Document
◉ Text in Document Code    [        ]

Reexams returned must match every checked criterion.
( Search )

Advanced Boolean Text Search

( Document Code ▾ ) RXPCT
And the phrase [ waiver of page limit ] ( within ▾ ) 100  words of [ without prejudice to Requester's arguments ]
And ( Mail Room Date ▾ ) ( After ▾ ) 08/01/2008                                    730
( And ▾ ) ( Add Condition )

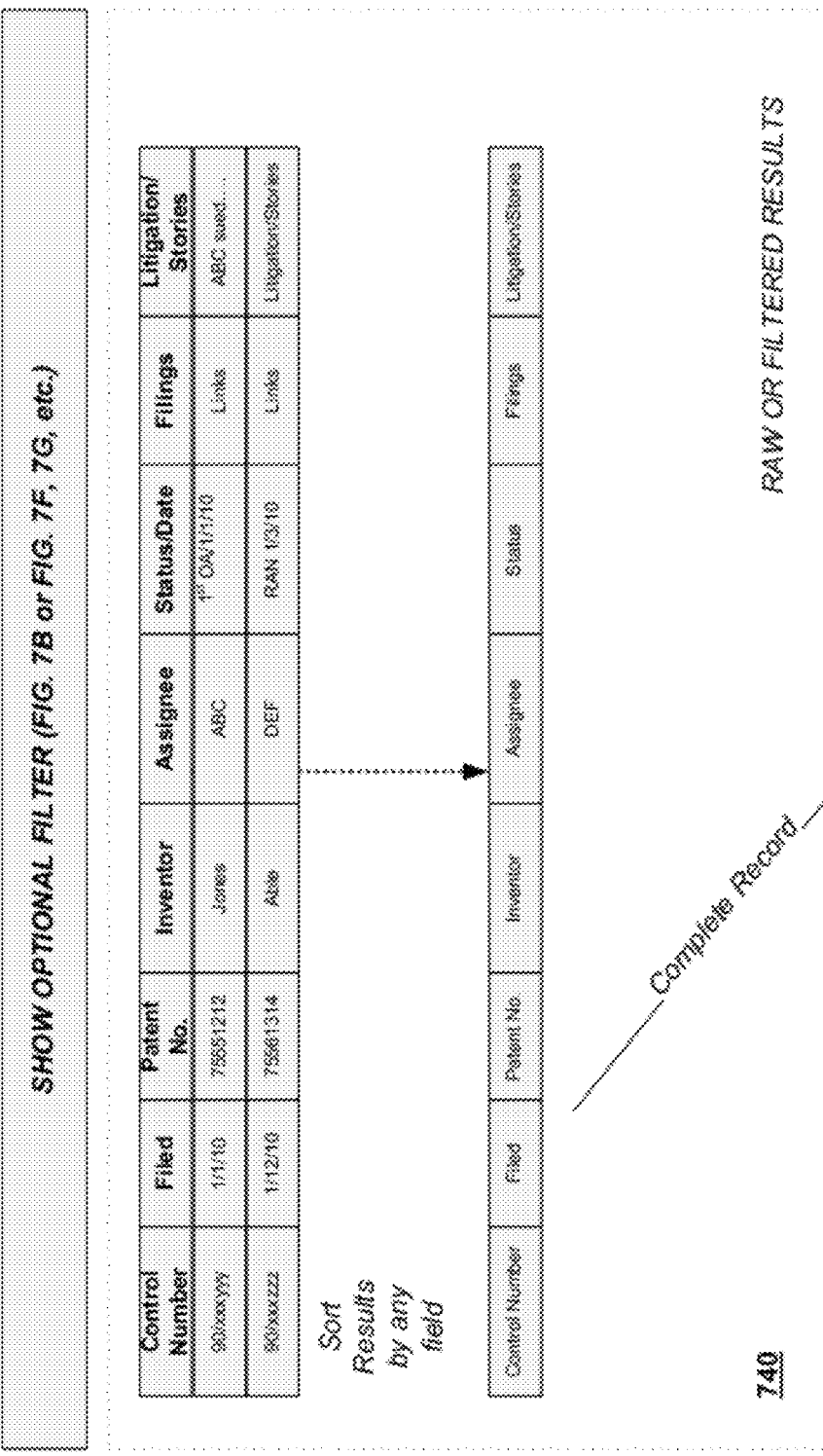

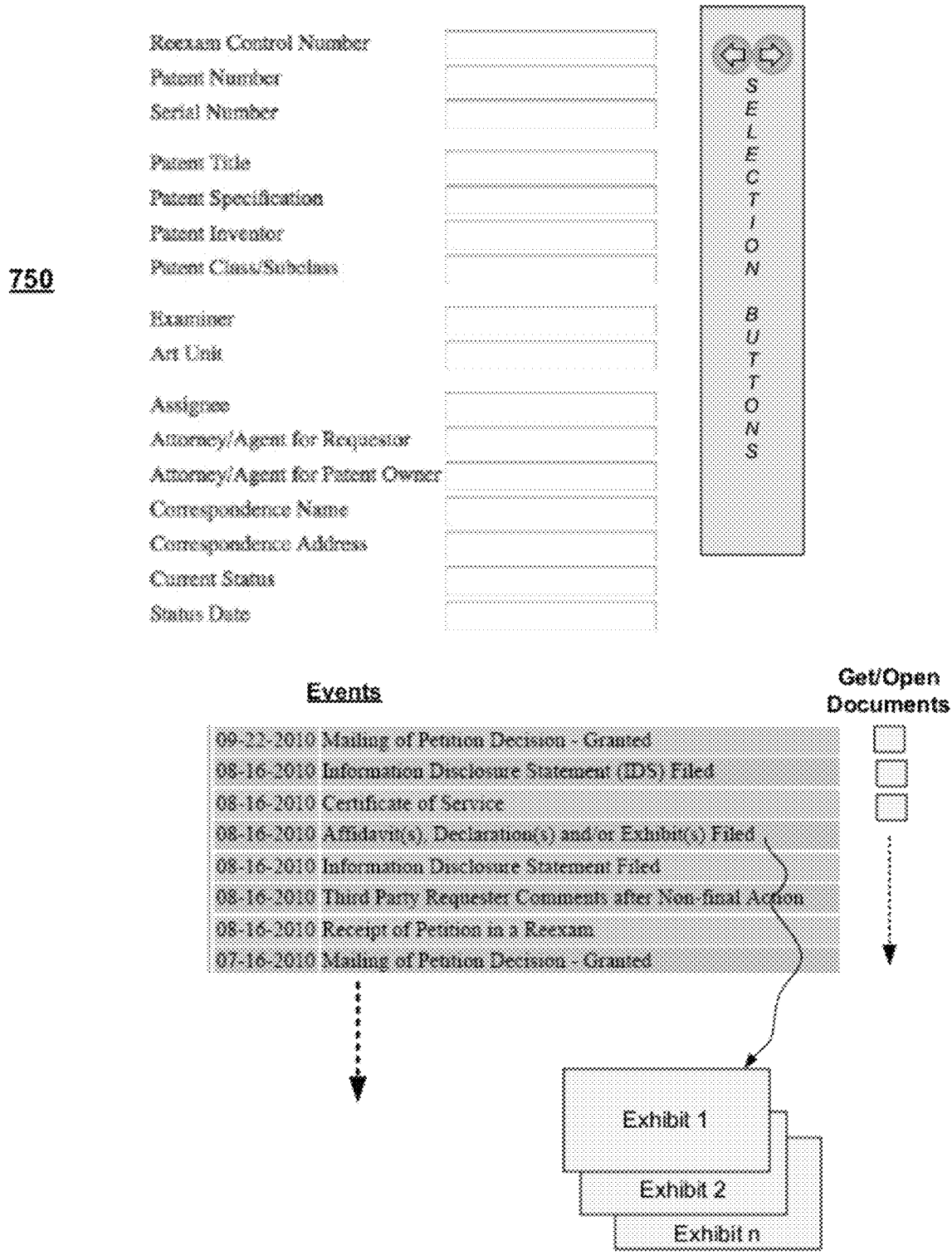

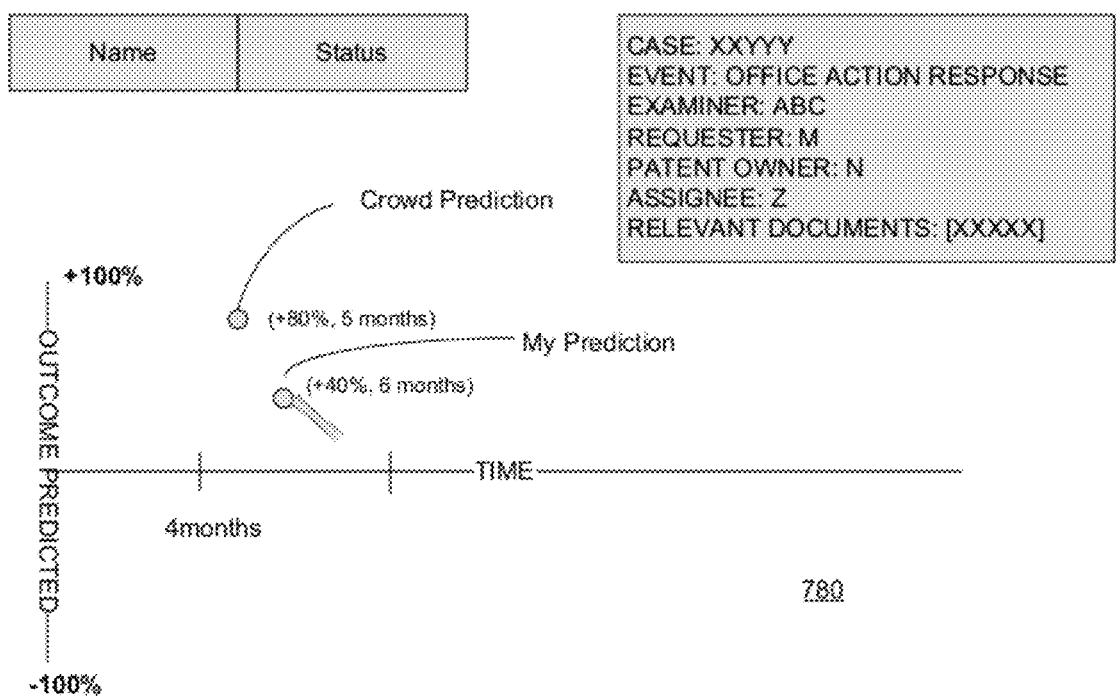

ATTORNEY/FIRM PROFILE: REPRESENTATIVE/FIRM X
FIGURE 7H
CASES CURRENTLY HANDLED
MOST RECENT ACTIONS
790
PROVIDE PROFILE DATA
COMMUNITY PROFILE DATA
NUMBER OF CASES HANDLED: PRESENT
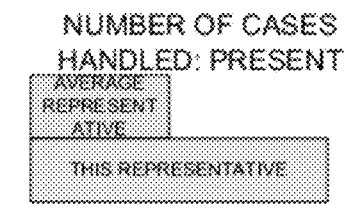
NUMBER OF CASES HANDLED: TOTAL
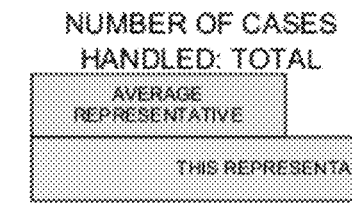
REQUESTER SUCCESS RATE
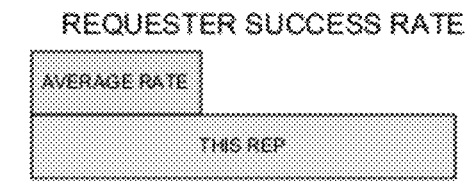
PATENT OWNER SUCCESS RATE
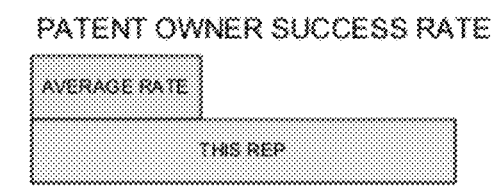
APPEAL RATE
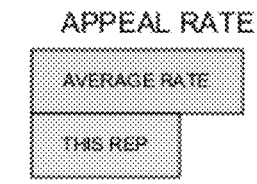
APPEAL SUCCESS RATE
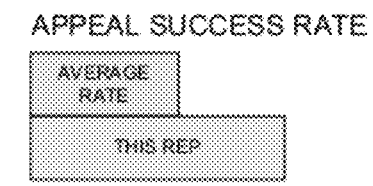

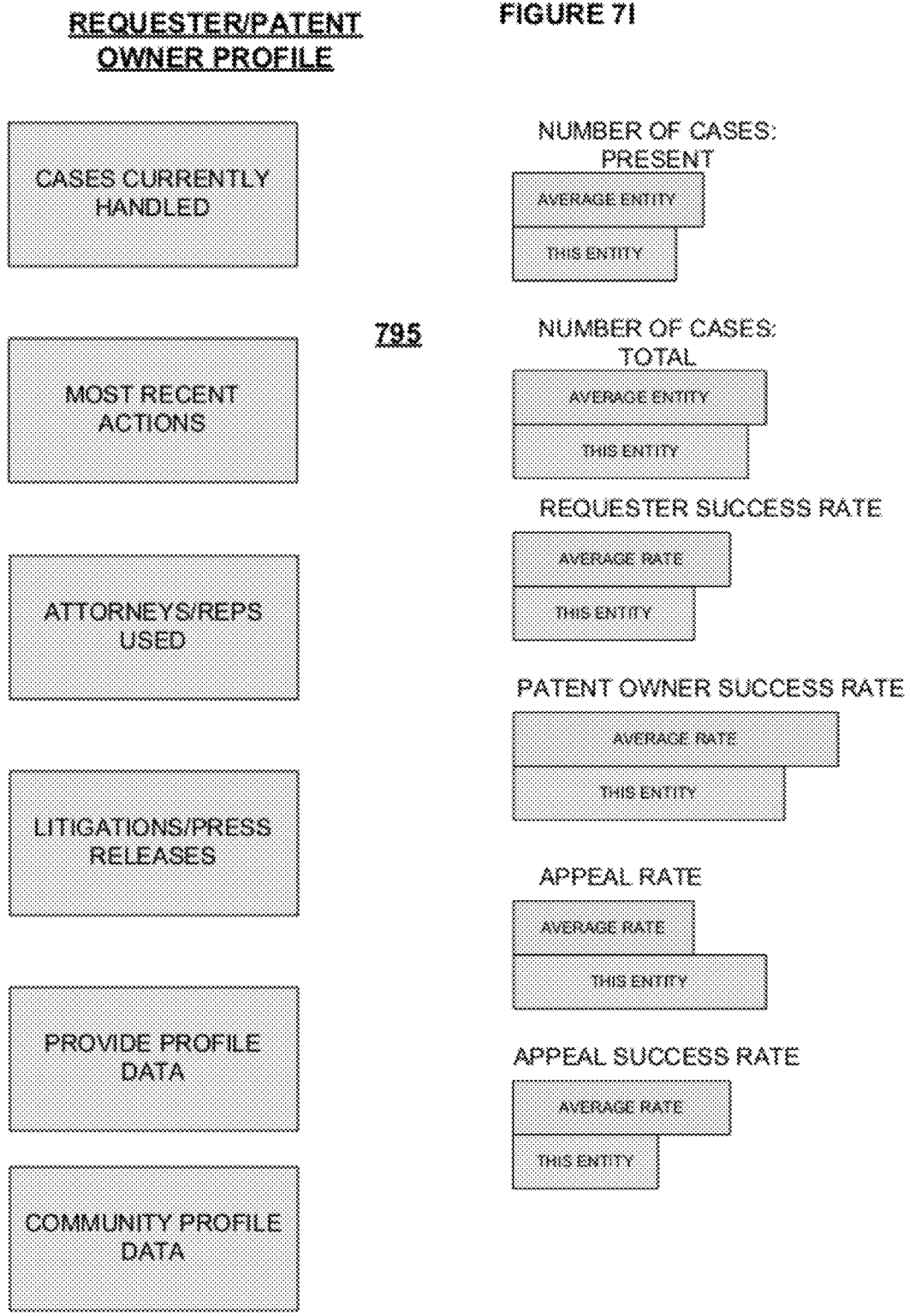

FIGURE 9B
Duration Distribution Display
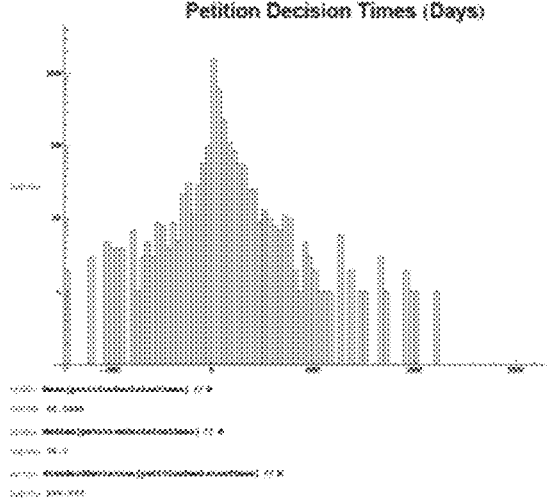
FIGURE 9C
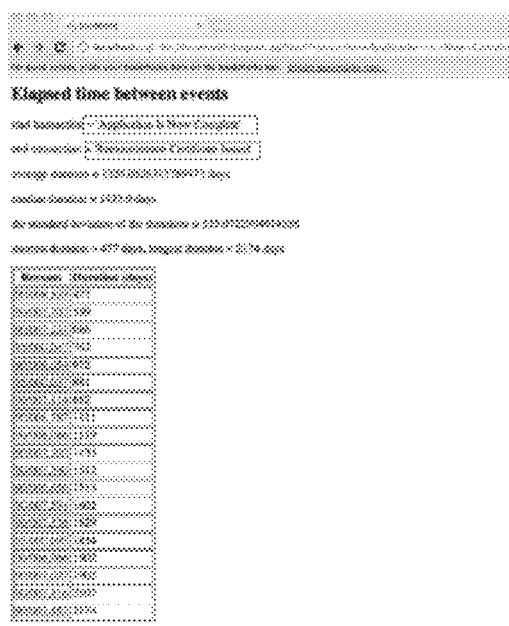
FIGURE 9E

Found 49 Matches searching for "ABCD" in fields: examiner

Find Petitions and Responses

|  | Art Unit |  | 3992 |  |  |
|---|---|---|---|---|---|
| And | Petition Title | Like | *OPPOSITION PETITION TO PATENT OWNER'S PETITION* |  |  |
| Followed by | Document Code | RXPTGR | And Response | is | DECISION GRANTING PETITION |

( Add Condition ) ( Petition Title ¢ )

( Search )

Search Reexams

|  | Status |  | is | On Appeal -- Awaiting Decision by the Board of Appeals |
|---|---|---|---|---|
| And | Transaction Description | is | Right of Appeal Notice |  |
| Followed by | Transaction Description | Like | *Petition* |  |
| Followed by | Transaction Description | is | Action Closing Prosecution |  |

( Add Condition ) ( Petition Title ¢ )

( Search )

FIGURE 9G

Find Requests for Extensions of Time followed by Granted or Denied

|  | Document Code | is |  | RXRQT |
|---|---|---|---|---|
|  | Followed by | Document Code | RXEXTD |
| Or | Followed by | Document Code | RXEXTG |

( Add Condition ) ( Document Code ¢ )

( Search )

Query:
- Pending/Issued/Abandon/All
- Keyword/class = 7xx
- Date range: xx to yy
- Target event = NOA
- Examiner = All
- Entity = all
- Representative=all
- Threshold: none

Changes between XX period and YY period for:
- #Apps
- #Target Event
- Ratio

SYSTEM AND METHOD FOR COMPILING INTELLECTUAL PROPERTY ASSET DATA

RELATED APPLICATION DATA

The present application claims the benefit under 35 U.S.C. 119(e) of the priority date of Provisional Application Ser. No. 61/434,588 filed Jan. 20, 2011 and Ser. No. 61/442,049 filed Feb. 11, 2011 both of which are hereby incorporated by reference.

The application is further related to the following applications, all of which are filed on this same date and incorporated by reference herein:

System & Method For Assessing & Responding to Intellectual Property Rights Proceedings/Challenges; Ser. No. 13/355,218;

System & Method For Locating & Assessing Intellectual Property Assets; Ser. No. 13/355,232;

System & Method For Facilitating Sequential Review of Restructured Protected Data; Ser. No. 13/355,241;

System & Method For Analyzing & Predicting Behavior Of An Organization & Personnel; Ser. No. 13/355,342

System & Method For Predicting Outcome Of An Intellectual Property Rights Proceeding/Challenge; Ser. No. 13/355,392

FIELD OF THE INVENTION

The present invention relates to automated electronic system tools and methods for identifying and collecting data that may be access constrained. The invention has particular applicability in extracting and presenting useful data on intellectual property assets and proceedings (such as that found for patent prosecutions).

BACKGROUND

A number of prior art systems exist for obtaining and reviewing general issued patent related information, including offerings by Google, Delphion, etc. None of these systems, however, allow for inspection or review of cases that are still pending (not yet issued) or in a post-issuance proceedings. The USPTO maintains a website which provides similar data, as well as databases containing information on still-pending cases through a system known as PAIR (patent application information retrieval). The PAIR system as currently constituted and presented, however, does not contain any accessible electronic database to permit the general public to perform conventional search, inspection operations for cases. For instance, in its current incarnation the user is required to know in advance and specify a specific case number (which may be difficult or impossible to locate) before they can see the data associated with such case, and even then the data is not organized in a fashion that makes it easy to review. As an example, the user cannot search any of the underlying communications by the Examiners or applicants to understand or follow what is transpiring in the application. Other than the use of specific case numbers, the user is not permitted to search or identify information of interest by subject matter, inventor, Examiner, or any other convenient parameter.

The PAIR system has been in existence for several years and yet has not been improved upon despite its obvious limitations. In fact the PTO has made every effort to make the information difficult to obtain through a variety of access limiting mechanisms, including using CAPTCHA codes and timeout mechanisms. A US government document dated Sep. 24, 2009 published by the Office of the Chief Information Officer titled "Public Meeting on Data Dissemination—Request for Information" confirms (see page 5) that the US PTO online search systems are designed for single queries, and are not designed for a large amount of traffic. In the RFI attached to this document the authors confirm that the PTO has no present solution to this problem, and they were actively seeking assistance from third parties to research the problem and provide a solution within the next 6 years. Moreover the authors confirm that the USPTO system is designed to prevent machine access to the PAIR data through a CAPTCHA system.

The general entry screens available through PAIR are shown in FIGS. 11A, 11B and 11C. As seen in FIG. 11A, the user must first traverse a security screen, which includes a well-known re-CAPTHCA test. After passing this test, the user is presented with a screen as seen in FIG. 11B, which only permits him/her to search cases by case number. As is apparent, this is extremely limiting as many persons do not know what these numbers are, and the PAIR system provides no insight or guidance on what the numbers might be. Nor does the PAIR system identify for the user the most recent submissions made so that the user has any idea of the range of input that might be relevant to identify the last N days of materials for example. Thus, there is no indication anywhere, of most recent cases/events issued by the PTO for ease of reference/convenience.

Finally, as seen in FIG. 11C the user is presented with the specific reexamination data in the form of multiple tabs. One tab allows the user to examine an image file wrapper of submissions (IFW) made by the submitter and/or issued by the PTO. Again, however, there is no general search capability at this point to allow the user to locate items of interest in the file, such as comments, text, etc., associated with this case (or other cases). While the tabs are reasonably well organized, one other significant problem with the PAIR site is that it is extremely difficult to navigate within a conventional browser, because many of the conventional function buttons do not operate in a consistent manner. For example while reviewing one screen, it is often impossible to simply go "back" one screen to look at another entry. Instead, the page load fails and the user is required to resubmit the query all over again. In addition, the system frequently times out and requires the user to re-log in all over again, which because of the recaptcha mechanism, is time consuming.

Consequently, persons skilled in the art have been actively deterred if not discouraged from accessing and compiling any of this USPTO data. In turn this means that a large amount of very useful data is kept effectively hidden from the general public, which is undesirable and does not advance the purpose of the patent laws. The problem is most acute in cases of reexaminations, which are a form of post-issuance patent challenge. Since reexamination cases are frequently associated with ongoing litigation, the financial stakes are often high and the public interest factor much larger. Yet as with un-issued cases the public is stuck using the very limited PAIR system for obtaining information about ongoing cases. Other examples of organizational processes which do not lend themselves to public inspection and review are well-known, including for example the status of ongoing immigration applications.

Because the data is effectively inaccessible, it is difficult to predict basic information about cases, such as how long they will last, what strategies work or do not work, etc. The public, again, is left with mostly indirect guesswork and gross average statistics published by the PTO itself.

Clearly, there is a need for systems and methods to improve the limitations in the current PAIR (and similar) systems and existing approaches might attempt to do so, but are not sufficient. This need is increasing as Congress has only recently enacted even more post and pre-grant challenge mechanisms for patents and applications in the America Invents Act (AIA) (which provisions are incorporated by reference herein). The challenge proceedings in the AIA are to be implemented by 35 U.S.C. §321 or inter partes review under 35 U.S.C. §311 and in accordance with a new set of PTO rules which are provided at Federal Register/Vol. 77, No. 3/p. 442 and p. 448—Thursday, Jan. 5, 2012 which is also incorporated by reference herein. The rules for reexaminations have also been changed, which means that it will take several years for practitioners to begin to understand the new interpretations, standards and rulings by the PTO based on the new statutes and regulations. Thus, to fully avail themselves of these new procedures, the public requires a data discovery, review and presentation tool which provides greater transparency and oversight of USPTO (and similar governmental agency) proceedings.

Public sector information such as PAIR offers a veritable untapped resource of inestimable value (BBC News—Data storm: Making government data pay 15 Dec. 2011: Michael Cross). Despite the availability of public databases (e.g., USPTO PAIR, SEC EDGAR, et. al.) the organization of these data combined with the user access makes finding meaningful relationships all but impossible. The plethora of available search engines (Google, Yahoo, Delphion, Dialog, et. al.) has not improved this situation: access to Public Sector Information is inadequate as evidenced by reports that this information is being under utilized resulting in missed opportunity.

In addition to patents, public sector information can range from data sets about the weather and the natural environment to great works of historic art. At issue is a foundational philosophy that restricts user access to a constrained search strategy—if one knows what they are looking for, they can find it. But it is extremely difficult for a researcher to find relationships between information that are not already scripted by a database schema employed in the data storage system.

SUMMARY OF THE INVENTION

Objects of the present invention, therefore, are to provide an improved organizational analysis system and method that overcomes the aforementioned limitations of the prior art.

DESCRIPTION OF THE DRAWINGS

FIGS. 7A-7I illustrate aspects of a graphical interface system implemented in accordance with an exemplary embodiment of the present invention;

FIGS. 9A-9G illustrate exemplary interfaces for a query process implemented in accordance with an exemplary embodiment of the present invention;

FIGS. 11A-11C show a prior art system used to locate and review USPTO records, particularly reexamination cases.

DETAILED DESCRIPTION

Figure 1:
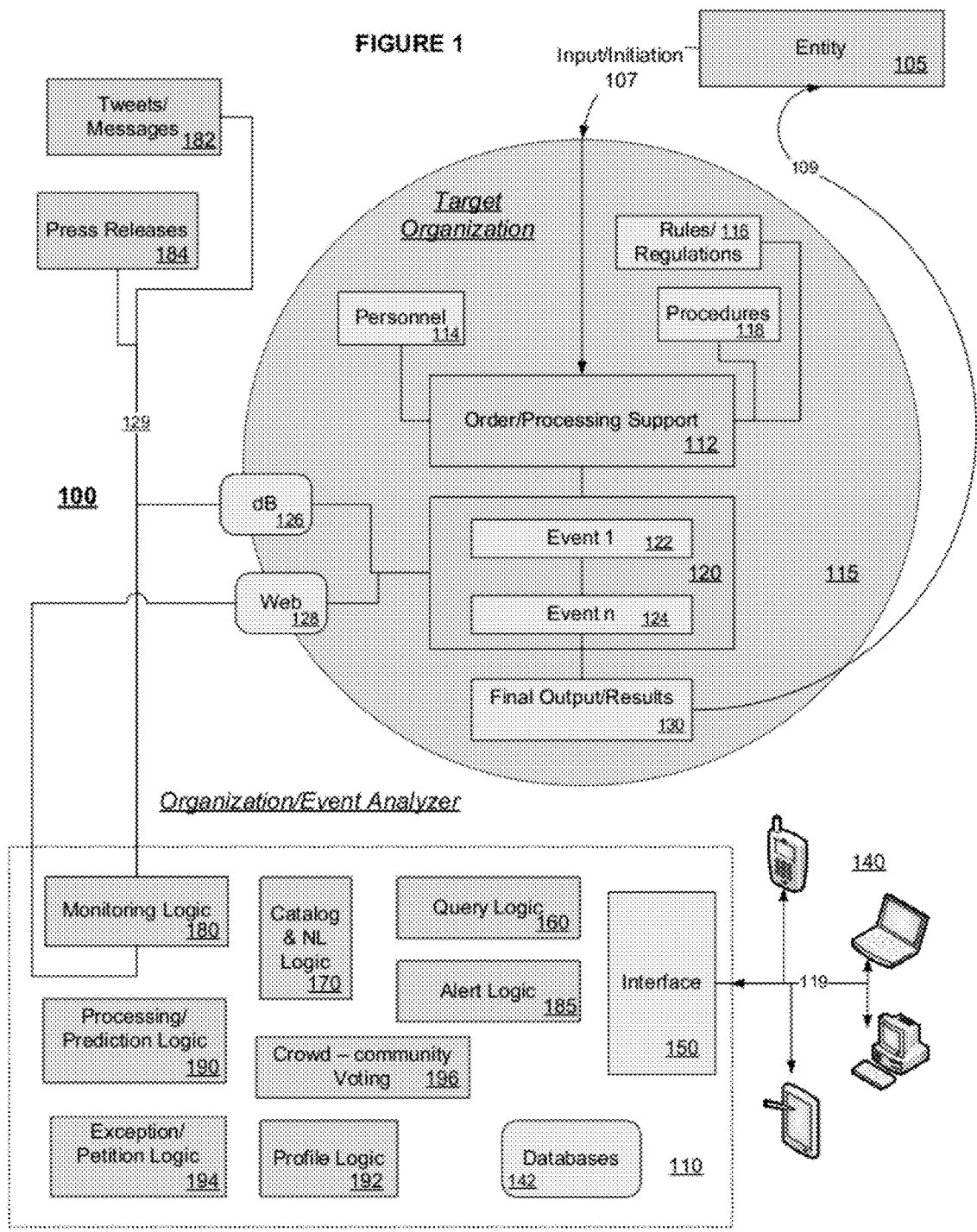
FIG. 1 illustrates an organization analysis system implemented in accordance with an exemplary embodiment of the present invention.

As will be explained in more detail below, an organization analysis system permits third parties not otherwise authorized or affiliated with the target organization to better understand, characterize and predict the behavior of such entities, and the outcome of events associated with the same. Despite the apparent deterrents and discouragements Applicants have overcome the technological hurdles imposed by the USPTO, and have solved the long felt need to secure and maintain public data (including aggregate data) that the public is entitled to access but hitherto has been effectively stymied. Thus in the preferred embodiment of a United States Patent Office organization, the system preferably permits users to:

1) monitor the status of individual or multiple ongoing cases using easily understood topics or categories, or by date;
2) browse the entire set of pending cases (and their related documents as might otherwise be available at the target organization's publicly accessible databases) within a conventional web browser, and using conventional browser related functions so that the review process is easy, flexible and effectively emulates the behavior of any other conventional website;
3) perform multiple queries (using text or other input) across one or an entire set of cases to locate cases of interest or matching user-defined criteria—in addition the criteria can be significantly expanded beyond the basic case number limited interface offered currently;
4) profile and characterize the timing and performance of the PTO as a whole with respect to cases or associated actions for such cases, including in aggregate or with respect to specific art units/personnel;
5) profile and characterize the behavior of art units and/or specific personnel, again, across an entire set of documents;
6) search and identify key developments and precedent in technology, law or litigation as expressed in documents/ actions/events in the PTO;

7) search and identify exceptions handling activity by the PTO, including actions and rationale associated with petitions;
8) receive alerts for ongoing (and new) cases in accordance with predefined criteria;
9) estimate, project and predict the timing and outcome of both micro and macro events.

Other functions and capabilities are also described below. Again while the present preferred embodiment uses the example of the United States Patent Office (UPSTO) and its personnel (examiners), it will be apparent to those skilled in the art that any number of target organizations with similar characteristics could be examined and monitored in accordance with the present teachings. For example another application could serve persons interested in studying the behavior and predicted outcome of trademark applications, immigration applications, SEC filings, etc. to help identify optimal documentation formatting, routing, etc., to increase the chances of success for a case. In other embodiments the invention could be used to mine and extract information from databases maintained by similar governmental organizations. For instance the PACER database is used by the United States Judicial branch to maintain events and records for ongoing litigations. Patent litigations could be identified and monitored in the same manner as described herein as events to be tracked. Since patent litigations are a rich source of materials for judicial opinions, declarations, technical subject matter, substantive pleadings, etc., all of these documents could be extracted and stored in a database as described below. The events for litigation cases could then be tracked in exactly the same manner as other events noted below. This would allow for a richer database of materials than that normally offered by traditional reporting services, which tend to focus solely on precedential opinions but not other content that may be of equal or greater interest to the community as a whole.

In the examples below, specific organizations might be described, but unless otherwise indicated, it should be apparent that in general an "organization" comprises some sort of entity that has personnel (including at least some human participants) who review submissions (typically in the form of documentation) in accordance with a set of procedures (which be related to substance, format, time etc. and can vary). For each submission the organization typically generates a number of measurable events, which may be reflective of the status of the submission, a determination on the merits of the submission, etc. An "event" therefore may be as simple as providing an electronic flag/indication in a publicly accessible file/database that a submission has reached a certain status or treatment within the organization.

FIG. 1 illustrates an organization analysis system 100 implemented in accordance with an exemplary embodiment of the present invention. An entity 105 may include a natural person, a corporation, etc. The entity provides a submission 107 to an organization 115, which, for purposes of the present disclosure, is identified as the target organization to be monitored/characterized. In the preferred embodiment, as noted above, the entity is the USPTO, and the submission 107 includes a patent application, a request for patent reexamination or patent reissue, a response to a communication, a petition, or some other form of documentation that the PTO is empowered to review and act upon. It will be understood that the submission 107 may be in electronic form or other tangible form, including paper or other format accepted by the organization 115.

The submission 107 is then processed by order/processing support logic 112, which again can be a combination of human and/or machine handlers. In some environments the submission may be examined manually by personnel 114, and classified by them in accordance with rules 116 and/or procedures 118 to put into an electronic docket (not shown) for later uptake by other such personnel. In the case of a reexamination request, the reexamination documents would be scanned into an electronic system, and a variety of classification data would be captured or generated and stored for inclusion as part of an organizational record. For example, a control number can be assigned to the submission (reexamination request), along with other identifying information such as the name of the requester, the number of the patent for which reexamination is requested, the name of the representative for the requester, the inventor name, the title of any associated litigation, etc., etc.

As the personnel 114 (or an automated artificial intelligence agent) review and process submission 107, a variety of events (122, 124) are generated by event logic processor 120, which can be in the form of a combination of computer hardware and software control modules. The event logic processor 120 can reference the rules/regulations 116, procedures 118, etc., and determine a schedule of when personnel 114 are required to act on the submission. For example, an examiner may be required to generate an initial written report within a certain number of days after the submission is deemed complete within the rules and procedures.

As the personnel 114 act on the submission they (or logic 120) generate a set of n events 122, 124, etc., which can range from substantive to procedural. For instance, the examiner may draft and issue an initial determination that a submission 107 raises a substantial new question (SNQ) of patentability within 90 days of a reexamination request. This information is communicated from the target organizations internal computing system (not shown) to one or more externally accessible databases 126 and websites 128, such as the aforementioned PAIR system described above. At this point the information acted upon and generated by the target organization is available for inspection and review by outside third parties through an electronic network 129, which in preferred approaches is the Internet.

During the process of the submission the target organization may also report out or contact entity 105 through link 109, which, again, may take any number of forms, including physical mail, electronic networks, etc. These communications between organization 115 and entity 105 may also be reported in database 126. At the end of the process organization 130 issues a final output report 130 to entity 105. In the case of a reexamination request this may be in the form of a reexamination certificate, a ruling on an appeal by the Board of Appeals, or some other terminating event which effectively ends participation by organization 115. Again for other contexts it will be apparent that other types of events will be appropriate, and it will be understood that the explanation has been simplified to highlight the important aspects of the invention.

As further seen in FIG. 1, an organization/event analyzer 110 consists of a number of components which facilitate review and analysis of data associated with target organization 115 by any number of users employing client devices 140. The latter devices may include conventional PCs, laptop computers, mobile devices, tablet devices, and any other known computing device which can access system 110 through a network link 119 and interface 150. As with link 129, link 119 is preferably an Internet based connection using conventional protocols, but it will be understood that other access mechanisms are possible.

Interface 150 is responsible for interacting with a client browser, and includes one or more routines responsible for presenting a graphical user interface to users embodied in a web page as is typical in a client/server system. An example of a preferred interface is shown in FIG. 7 and discussed in more detail below. Other non-GUI interfaces could be implemented as well, including for text/SMS which are common in mobile environments.

Returning to FIG. 1, databases 142 store a number of organization/user data items as explained in more detail below, including indexed text data for rapidly finding information of interest in response to user queries processed by Query logic 160. The format and composition of databases 142 is explained in further detail with reference to FIG. 5 below.

Returning to FIG. 1, the routines associated with Query Logic 160 preferably include options to permit users to specify searches across documents, events, and personnel to locate information matching specific criteria, such as, for example, an identification of pending reexamination cases that have received a reexamination certificate within the past X years within a certain examining group. These criteria are shown in more detail in FIG. 9 discussed further below, and other examples will be apparent to the skilled artisan from the present teachings.

Again with reference to FIG. 1, Catalog and natural language (NL) logic 170 and Monitoring Logic 180 are responsible for collecting and analyzing documents and other associated metadata associated with the submissions 107. The operation of the routines for this component are shown in more detail in FIG. 3 discussed below. Generally speaking the information used by system 110 in FIG. 1 may be gleaned, compiled and/or aggregated from parsing organization database 126, rules 116, procedures 118, and by examining other public sources of information such as broadcast messages 182 (which may be so-called TWEETs as published by TWITTER) and other press/company releases 184.

Alert logic 185 is responsible for identifying triggered alerts, classifying and issuing alerts, etc., as seen generally below in FIG. 8. This logic can also be used, generally, for controlling RSS feeds, generating Twitter messages, and other similar data publications for the content processed by system 110. For example, it may be desirable for the system to maintain a running visible list of most-recent cases submitted to the entity for consideration, which, in the case of reexaminations, would be a specific request identified by a control number. By publishing an ongoing/updated list, users can be kept apprised of the most recent developments at the PTO. The entries in the list can be associated with tags and other metadata tied to the documents within a web page so that the users can select the entries from a conventional browser and see at a glance what the submission looks like. This allows for a one-stop experience for the user who now no longer has to manually traverse screens and guess about control numbers to locate the most recent submissions.

Processing and Prediction Logic 190 includes routines for performing additional analytical operations on the content and substance of the submission and user queries. For example, a user can request an indication of an expected average time period that will elapse between two events associated with a submission 107—such as in the case of a reexamination request, some indication of when to expect an Office Action. This type of calculation module is described in more detail in FIG. 4 and preferably uses both historical performance data for organization 115 as well as dynamic loading data associated with demand/capacity measurements of such entity to render a useful prediction of an estimated time to completion for an event.

Profiling Logic 192 includes routines for performing additional analytical operations on the behavior, characteristics and performance of the personnel 114 associated with entity 115. For example, a user can request an indication of which reexamination cases an Examiner is working on, the state of such cases, and historical information on affirmance/rejection rates and the like. This type of profiling module is described in more detail in FIG. 2 and preferably uses both historical performance data for organization 115 as well as dynamic loading data associated with demand/capacity measurements of such entity to render a useful prediction of personnel behavior.

Exceptions Logic 194 processes events which occur outside the normal course of the expected path of progress of a submission. For example in the context of a reexamination proceeding, one or more parties may file a petition seeking specific relief that is outside the parameters of the given rules, such as requesting more time, more pages for a response, etc. As discussed further below in connection with FIG. 6, these types of petitions are compiled and analyzed as well to give insights into the operations of the target organization. Other types of exception processing examples will be apparent in other contexts.

Figure 10:
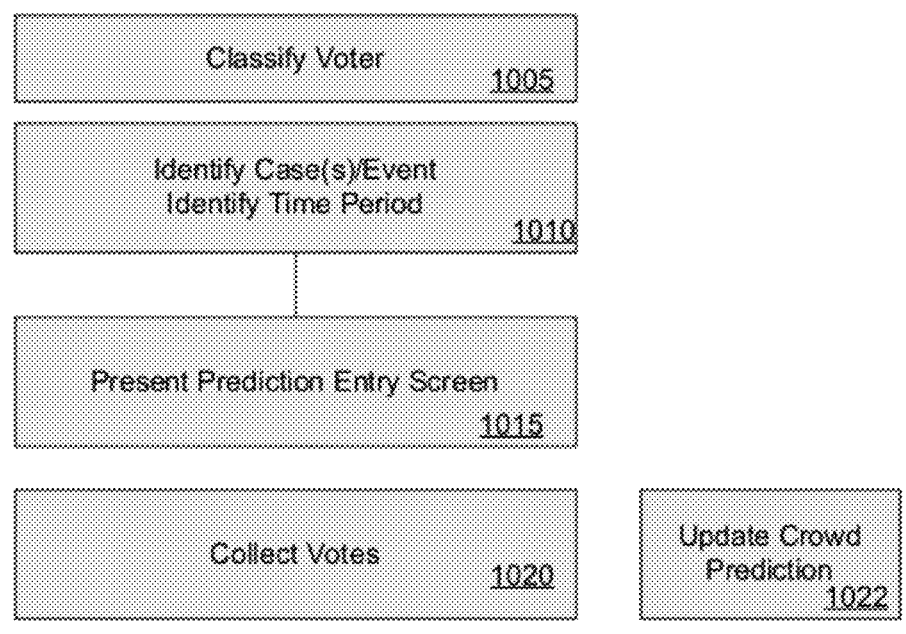
FIG. 10 illustrates a crowdsource type prediction process implemented in accordance with an exemplary embodiment of the present invention.

An additional component 196 for crowd-community sourcing logic can also be employed in a preferred embodiment. The details of this are shown in FIG. 10 below. This feature can be used to solicit generic user feedback, expert feedback, etc., to provide voting and similar input from the community of users on the expected outcome and timing of events. For example, a group of participants could be asked to give their predictions on the outcome and timing for a particular reexamination proceeding. A similar tool used by Piqqem at their website of the same name is used to predict the value of securities, and could be modified under the present teachings to permit users to predict the outcome of legal events, including reexamination of patents. Certain types of participants could be authenticated to confirm their identity as experts. The results could be published for public consumption and entertainment. Again, other examples will be apparent to those skilled in the art from the present teachings.

Figure 2:
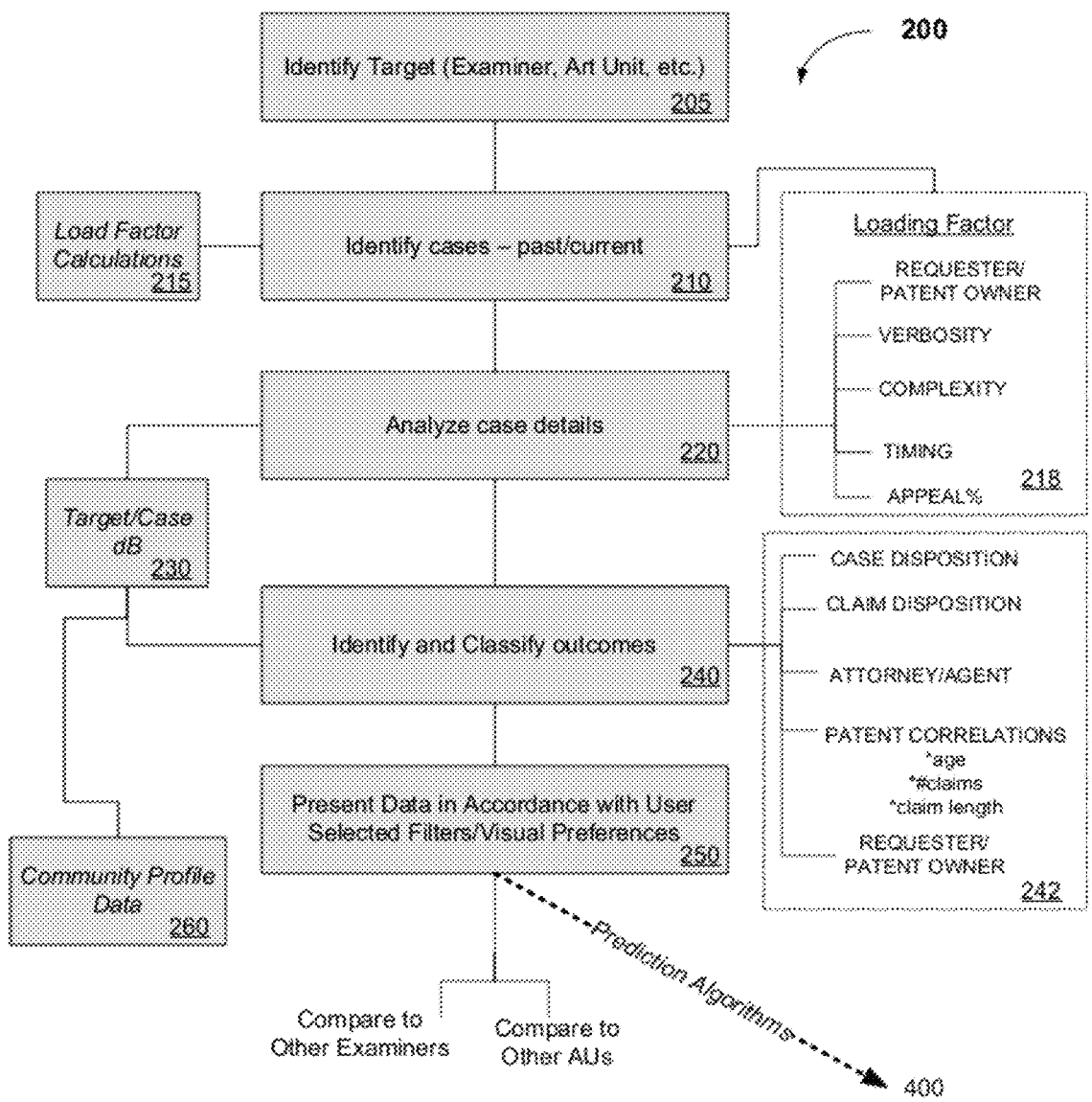
FIG. 2 illustrates a personnel analysis/profiling process in accordance with an exemplary embodiment of the present invention.

Looking at FIG. 2, this illustrates a personnel analysis/profiling process 200 in accordance with an exemplary embodiment of the present invention. The steps shown here are preferably implemented using the software modules and hardware identified with reference numeral 192 in FIG. 1. As noted earlier, conventional systems do not publish or permit users to develop "profiles" of the target organization personnel. A profile can include a spectrum of useful information, ranging from basic information such as the identity and number of cases being handled by the Examiner (which is typically only accessible to internal personnel) all the way to advanced correlations indicating their propensity for sustaining or rejecting certain legal positions. For example, an Examiner may be found to have a much larger than average reversal rate on appeals, or a much larger than average usage of 112 rejections relative to their peers, and so on. This type of information is extremely valuable to patent holders, legal representatives, court officials, and the general public, as it permits a degree of analysis and accountability that is currently not possible.

At step 205 therefore, the user can specify a particular target to be profiled, which, in a preferred embodiment, can be a human examiner, or a some larger logical group of personnel, such as an entire examining group, individuals within an art unit, etc. For example, the target to be studied may be Examiner S. Smith, or Art Unit XXX where he/she works.

In step 210 the target's prior and current cases are identified from information compiled in databases 142 as noted above. In preferred embodiments the totality of the content for the cases is stored, including not only the transactional data (indicating events and dates) but also the actual correspondences (Office Actions), submissions and other materials exchanged with the applicant in a case. The data is preferably text-indexed as well to allow for ease of review and querying.

Step 215 includes an optional load factor calculation for the target. This can be as simple as an identification of the total number of cases being currently handled by the target, to a more advanced analysis which considers a relative number of cases compared to historical norms, other examiners, etc. For example, it is possible to characterize an Examiner's current workload not only by reference to cases, but also a status of such cases. This is because he/she may have a certain number of cases in a state which does not require significant further input at this time by him/her. Stated another way, an Examiner with 10 cases that are completed is identified to have less loading than a second Examiner with half as many cases but more expected actions. In this respect, it is more accurate to calculate expected required actions across an Examiner's cases in a predefined time window to estimate the loading of such individual. Other examples will be apparent to those skilled in the art. It will be understood that the degree of sophistication and detail will be a function of a desired application's level of accuracy and complexity.

The loading factor can be a dynamic variable that affects other calculations as noted below. For example it may be discovered that a particular Examiner's page count or rejection rate varies significantly according to their current loading factor.

At step 220 the individual cases for the target are then analyzed with the results being stored in a reference target/case database 230, which, as alluded to above, may be part of databases 142. The analysis and data stored for each target may take into consideration any number of target specific factors 218, including:
  identity of requester
  identity of patent owner
  inventor name/patent number
  representative filing request
  representative responding to request
  verbosity of the target (number of pages, words in selected documents, such as a Office Action)
  timing (dates correlated to document filings and other events by the target)
  appeals, appeal results and appeal % for the target Other types of data can be compiled of course. It will be understood of course that all or some of this data can be precompiled and thus made available very quickly in response to a query. Moreover since most cases proceed very slowly, it is relatively easy to keep up to date on the current behavior/profile of a target. Some of the data is useful for quick reference purposes (i.e., which representatives may have experience/knowledge with a particular Examiner) while other parts of the data are useful for understanding a personality, behavior, work rate, reputation, etc.

At step 240 the outcomes of the cases for the target are identified and classified. The outcome data is preferably stored in the case database 230 as well. The analysis and data stored for each case may take into consideration any number of case specific factors 242, including:
  case number
  patent number
  case disposition (reexamination certificate issued, reexamination denied, etc.)
  individual claim disposition (i.e., claim 1 confirmed patentability, claim 2 unpatentable under 102, claim n unpatentable under 112, etc.)
  attorney/agent involved with case
  identity of requester
  identity of patent owner
  patent correlations, including age, # claims, claim length, etc.
  appeal results At step 250 the user can be presented with the data in accordance with any desired filter and/or visual preferences. Any of the parameters/factors noted above can be used to filter the profile report for the target in question. For example the user could query which cases an Examiner had been involved with and which reached appeal. Or the user could specify that this set should be further broken down graphically by size (length of pages) of the reexamination request, and so on. The data can be presented in list, tabular, or graphical form depending on the information in question. Some types of reports (such as comparing Examiners or art units by overall reexamination duration) may be plotted more easily in chart form. It should be noted that any number of known techniques can be used to generate the reports and form thereof. Furthermore, while the preferred embodiment uses the example of a patent reexamination and a patent examiner, it will be understood that the invention has wider scope and usage and will be implemented with different objects and personnel in other environments.

As seen in FIG. 2 the user can also avail him/herself of certain prediction tools 400, which are described in more detail with respect to FIG. 4 below.

Note that in some instances the system may permit the users (or some selected subset of profilers) to contribute additional individual scoresheets or personality/profiling data for the targets as seen in step 260. Preferably this data is collected anonymously and with protection for the privacy of the contributors to encourage full and fair disclosures on the personnel of the target entity. For example a scoresheet (not shown) may request information from participants on a scale of 1-10 on several aspects of the profilee, including:
  demeanor (pleasant→hostile)
  professionalism
  cooperativeness—willingness to compromise
  decisiveness/consistency of analysis
  rigorousness/thoroughness of analysis of issues
  knowledge of rules
  knowledge of subject matter
  accuracy of analysis
  preference for 102 rejections
  preference for 103 rejections
  preference for 112 rejections
  interview utility/efficacy
  etc.

From this data it is possible to compute a reputation or authoritativeness score for the target based on one or more of these factors, either alone or combined with the case disposition data below. For example an Examiner may have a reputation score that reflects an overall average of some subset of the figures above computed across all surveyed persons.

To prevent gaming or distortion of the profiling, the credentials of users may be authenticated as a prerequisite. For example in the case of a patent application or reexamination, the name of the inventor, the serial number, or the representative registration number can be solicited. Contributions can be checked to prevent duplication and other efforts to manipulate the results. The data is preferably encrypted/de-personalized as it is stored in database 230 to avoid tracing of the profile contributions.

Conversely, to see the more detailed personnel profile information (or any of the other data/predictions the system can generate) it may be desirable to limit dissemination of such data to users with a particular status, or to users who have been authenticated, etc. In some embodiments it may be useful to "auction" such profile information to a limited number of users who provide a bid that exceeds some threshold number, or even limit the absolute number of users to some figure so that at any moment in time (and for a defined period) only a limited group has access to the detailed personnel profile information. Access to the information could be controlled on a rolling basis so that with each time cycle the users could participate in a new auction with the result of a different group being qualified to access the data in question. This restricted access may be used, again, for certain specific analyses so that the larger community still has access to the bulk aggregate information of interest. Other examples and variations will be apparent to those skilled in the art.

Also to preserve privacy it may be desirable in some embodiments to only permit review of aggregations of the user contributed profiles, and not individual reviews. Thus, for example, an Examiner may be revealed to have a professionalism score of 8.5 across all contributors. The system preferably also permits users to query/plot individual targets relative to each other so that a user can see at a glance the relative perception/scoring of the Examiner by a community of representatives. The data can be segmented as well to compute different reputation scores depending on the type of surveyor (inventor, representative, etc.). Other applications of this technique for scoring reputations of targets will be apparent to those skilled in the art.

Figure 3:
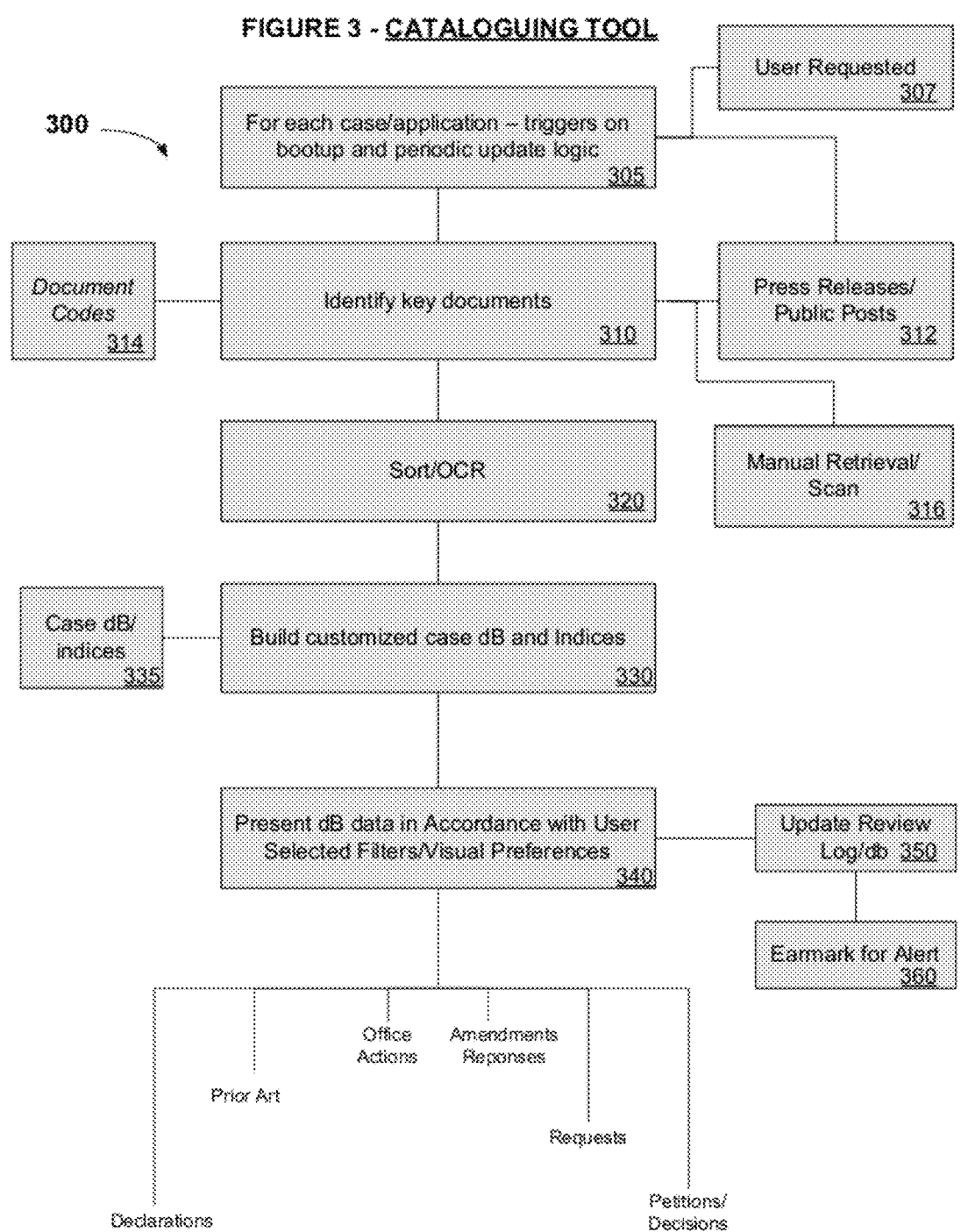
FIG. 3 illustrates an organization data collection and cataloguing process implemented in accordance with an exemplary embodiment of the present invention.

FIG. 3 illustrates an organization data collection and cataloguing process 300 implemented in accordance with an exemplary embodiment of the present invention. The steps shown here are preferably implemented using the software modules and hardware described earlier in FIG. 1 under reference numerals 170, 180.

Figure 11A:

The main purpose of this process, as alluded to above, is to construct and maintain the databases 142 to ensure their currency. As an initial step 305 the system identifies and catalogs every case/application being handled by the target organization. The data acquisition process preferably employs a standard, open source web browser (such as Firefox) instrumented via a plugin mechanism to send a set of data from viewed pages to a data acquisition server (which may be part of databases 142). The injected code navigates a viewed page and any tabs (see FIG. 11C) extracting data and sending extracted data to the data acquisition server.

The data acquisition server code also maintains a list of requested data and responds to queries for instructions from the browser plugin with details (e.g. a reexamination control number) of the next data to be acquired. The plugin accomplishes the tasks of navigating the pages, selecting tabs as well as checking boxes and clicking on buttons and links as needed to view and capture and transmit the requested data. When solution of a CAPTCHA is required the plugin can be configured to halt operation until a person provides the solution. If the acquisition server is authorized it is possible that in some instances the CAPTCHA can solved via automated machine logic using known techniques.

Figure 14A:
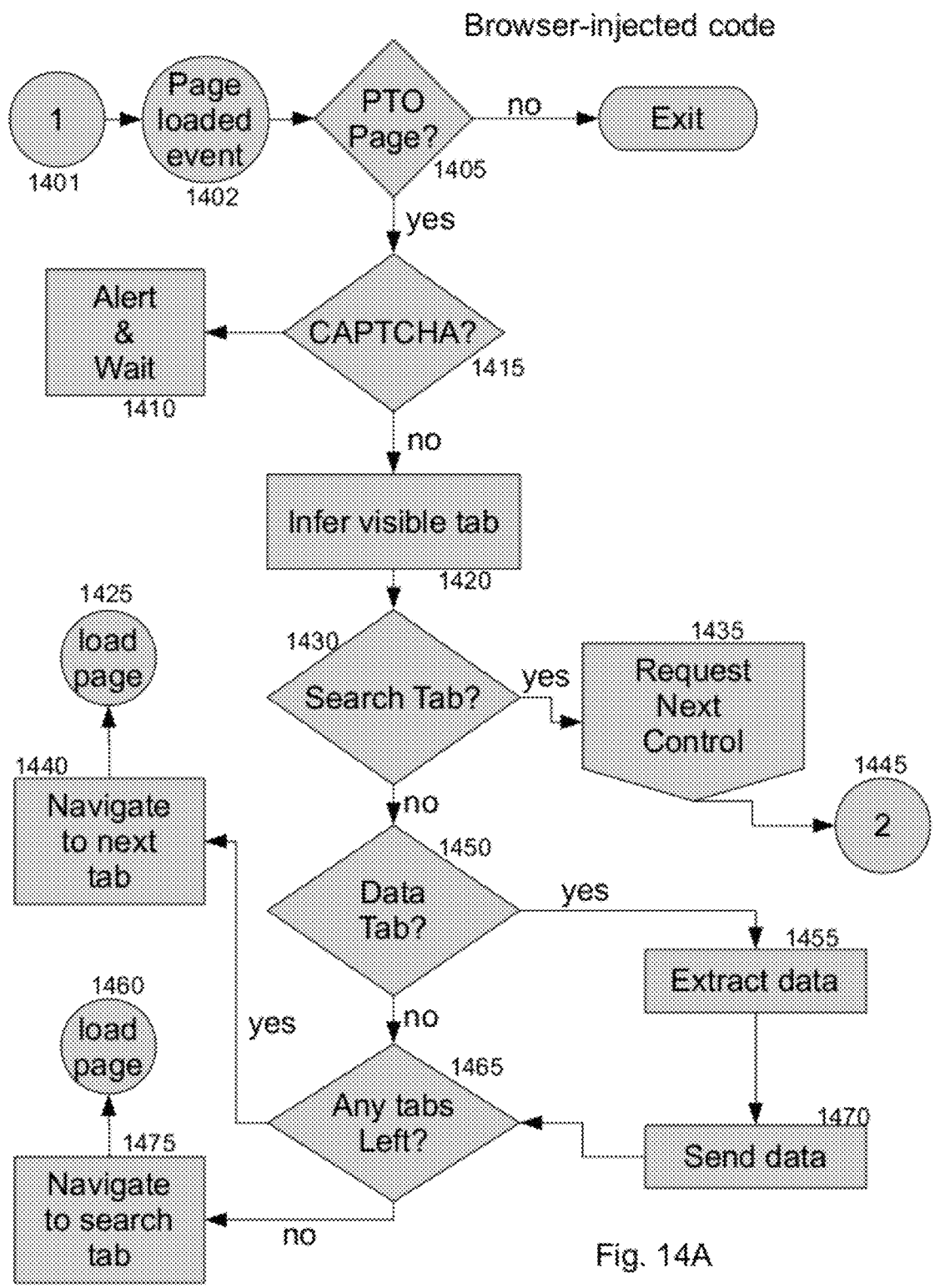
FIGS. 14A and 14B illustrate a preferred embodiment implemented by a scraper system of the present invention.
Figure 14B:
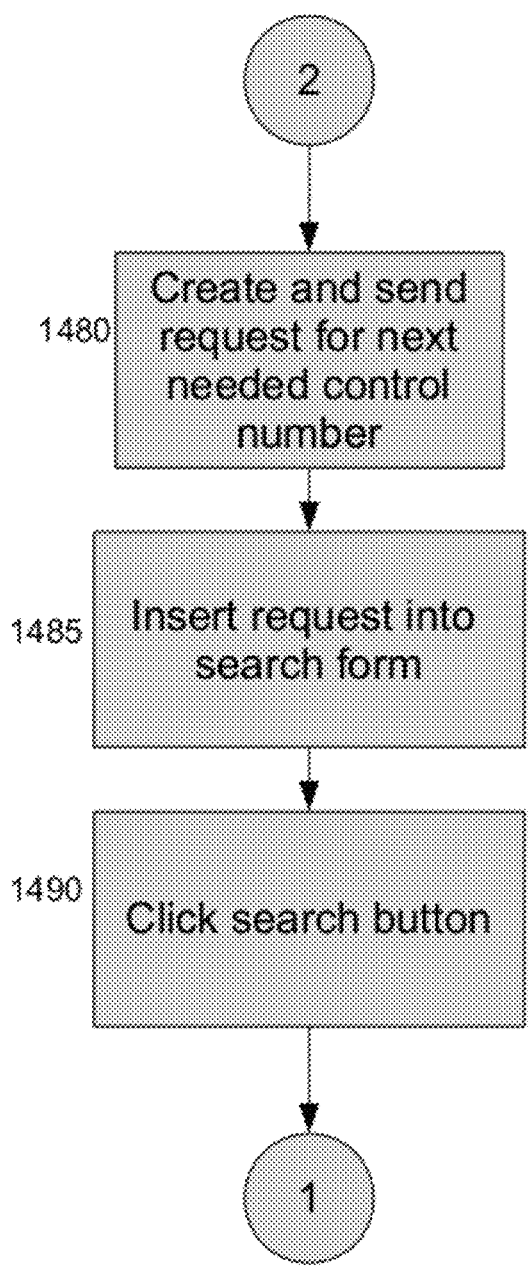

A flow diagram of the operations performed by a preferred embodiment of a scraper system 1400 which can be used for retrieving data from online databases is provided in FIGS. 14A and 14B. The data scraping system 1400 preferably is divided into two major components: code injected into pages viewed by a web browser and operations running on a data collection server. The injected code preferably selects, processes and sends information to the collection server and interrogates the collection server for further scraping tasks. The data collection server 1500 (FIGS. 15A and 15B) preferably keeps a record of what data have been requested from browsers, what data have been sent by browsers and maintains the database of the information collected. The data collection server also manages which data collection tasks will be handed out. The data collection server may run on the same machine with browsers or on a separate machine. The browsers and the data collection server preferably communicate via HTTP requests (from the browser) and responses (from the data collection server). A single data collection server can manage multiple browser instances running on multiple machines.

With reference to FIG. 14A again, the data scraper 1400 is preferably implemented through an add-on to a FireFox web browser, although other programs with browser-like capability can be employed instead. The add-on permits the injection of code into web selected pages beginning with event 1401. The add-on filters pages by URL and injects code into pages that match a URL template. The injected code is preferably executed after the browser's "onload" event 1402 (when a page has completed loading).

The injected code inspects the content of a matched page at 1405 and takes actions appropriate for that page. For example, in the case of a PAIR database maintained by a governmental agency, the PAIR pages will be either a search page, a CAPTCHA page or a data page. If the presented page contains a CAPTCHA at 1415 the injected code creates an alarm 1410 (which may be visual, audible, etc.) and stops to allow a data collector to solve the CAPTCHA and continue the scraping process. Note that in some instances the CAPTCHA solving can be performed by another remote computing system (not shown). It will be understood that in the event a CAPTCHA is not utilized, this section of the scraper is not required. Furthermore it will be appreciated by those skilled in the art that the nature of the pages will be a function of the particular database being examined by the data scraper.

If the presented page is a PAIR search page at 1430 the injected code sends a request 1435 to the data collection server 1500 asking for the next case (e.g., a patent application, a patent reexamination, or some other assigned reference number) to be scraped at 1445 and as seen in FIG. 14B. Note that the "next" case can be determined at 1480 by reference to a purely numerical sequence or any other desired sequence based on a desired priority of data capture. After a response is received it is entered into the search box 1485 and the "SEARCH" button is selected (manually or automatically) at 1490. This causes the browser to load a new page.

Looking at FIG. 14A again, if the presented page is a data page at 1450 the data are digested at 1455 and sent to the data collection server at 1470. In the case of PAIR, the data pages typically have several different "tabs" (buttons which cause a new page of data to be displayed). Each tab is preferably processed at 1465 to extract all relevant data from the agency record. The injected code examines tabs present on a page at 1465 and if the currently selected tab is not the last tab, then the next tab is selected at 1440/1425 or 1475/1460, triggering the display of a new page of data associated with such tab.

PAIR (and similar governmental databases which have limited reliability) frequently fails to display requested data, often presenting a page containing an error message. The injected code preferably automatically attempts to try to navigate back to a usable page upon such a PAIR error. Note that prior to extracting data optional benchmarking tests can be performed to determine a reliability and/or loading of the associated PAIR system. In instances where such system appears unreliable or overloaded the scraper 1400 can defer data collection to another time to comply with any regulatory restrictions on data access limits and reduce errors.

An Image File Wrapper (IFW) tab is treated differently when examining PAIR records. When the IFW tab is selected additional code is executed that selects and initiates the download of portable document format (PDF) files. The downloaded PDF files are preferably held on the machine where the browser is running so that they can be collected and split up (if needed) and stored later on the machine where the data collection server is running. Other image or data files may be collected as well for the purpose of optical character recognition to enhance data review of the governmental agency database.

Figure 15A:
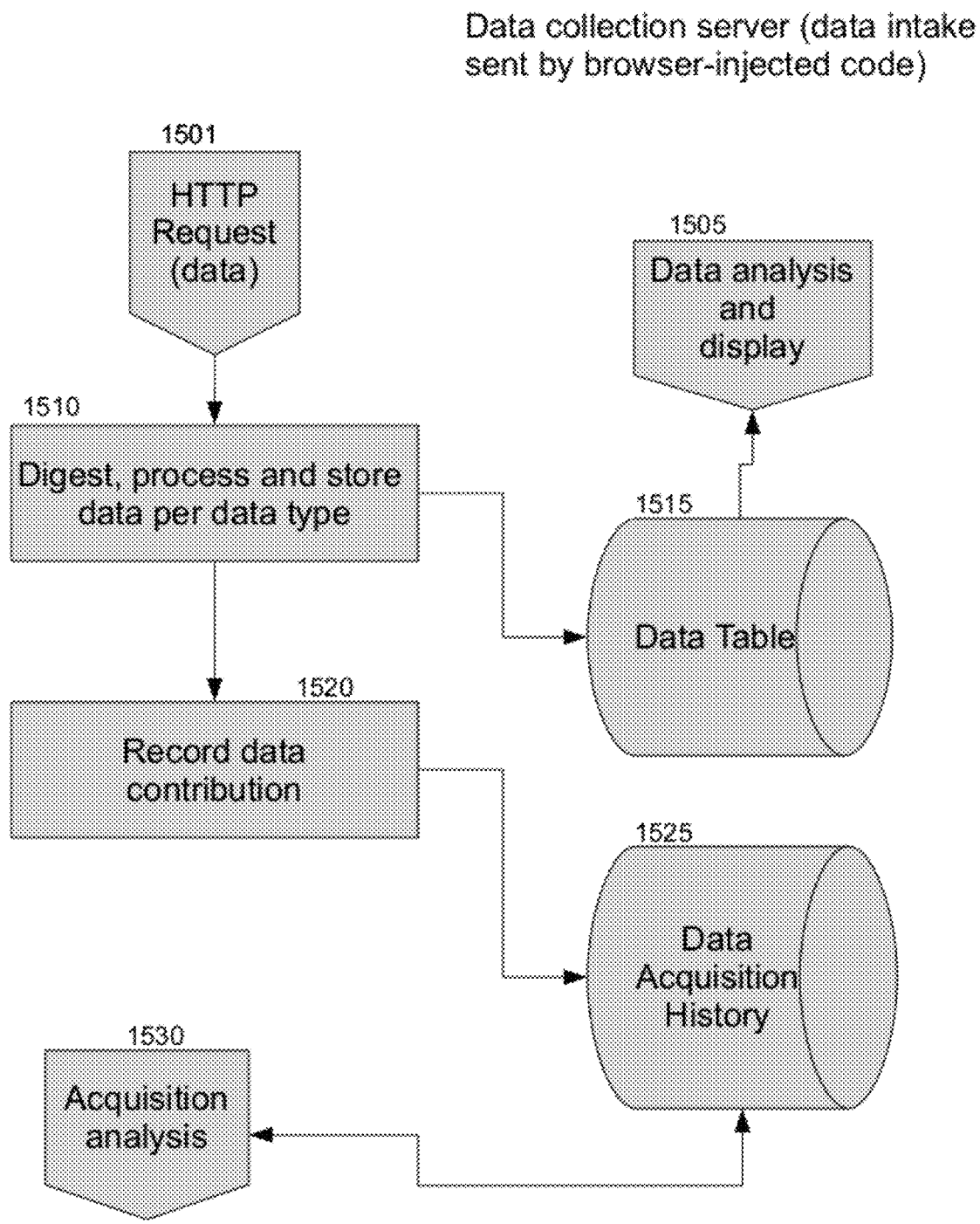
FIGS. 15A and 15B illustrate a preferred embodiment implemented by a data collection server system of the present invention.

FIG. 15A shows that a data collection server 1500 accepts the data sent by the browser-injected code, processes it and saves it to a database. It also preferably responds to requests for a control number to be scraped. It further preferably provides configurable tools to manage the control number request queue and display information about the collected data.

The browser-injected code (FIG. 14A) sends information to the data collection server preferably as HTTP requests at 1501. The data collection server parses the data at 1510, manipulates it as necessary and updates a collection database 1515. Records can also be kept at 1520 of the contributions of each browser within an acquisition history table 1525 (since multiple instances can be run) that contributes data and which browsers have been sent which control numbers to scrape.

Figure 15B:
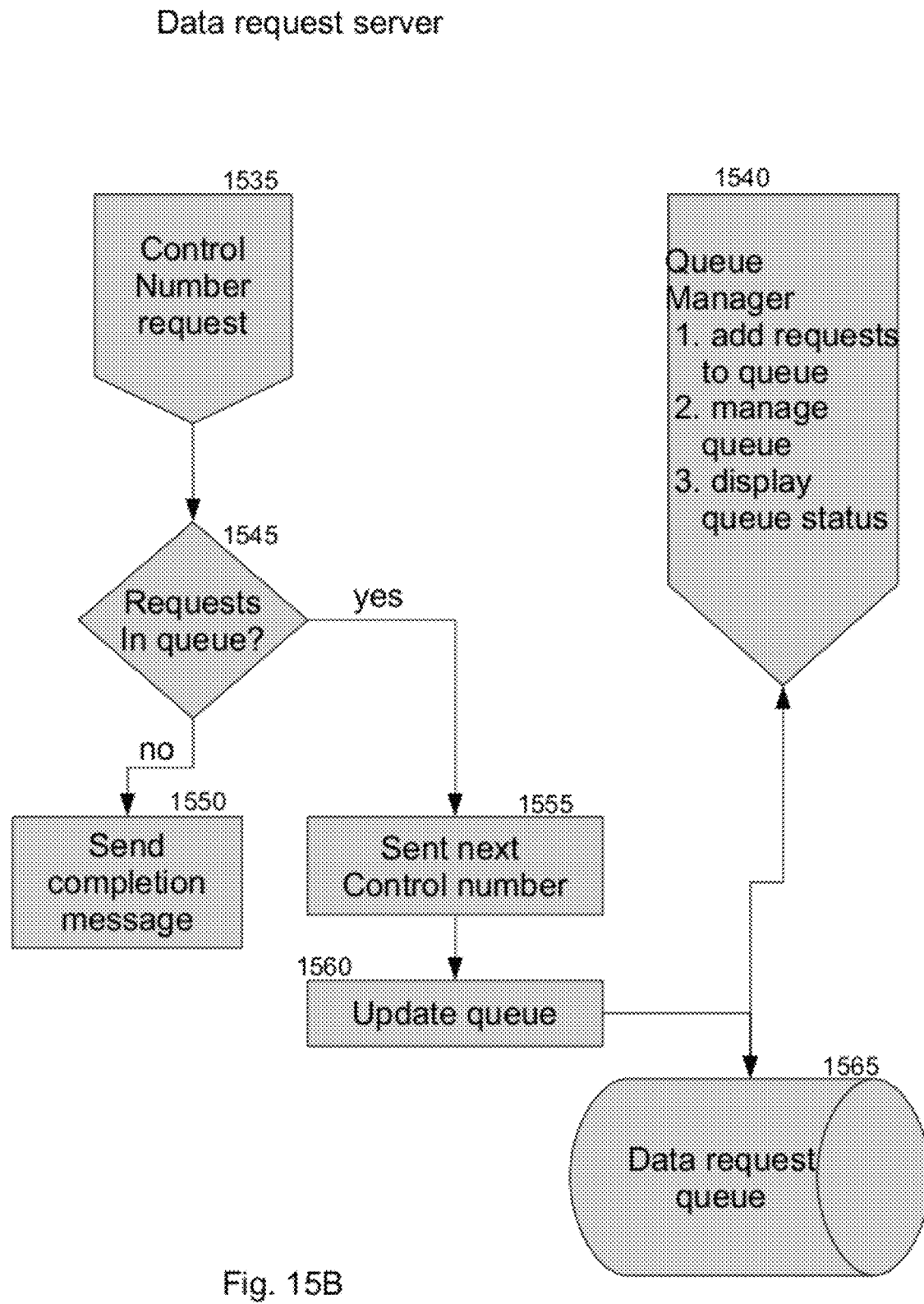

The data collection is driven by a data request queue 1565 (FIG. 15B). The queue 1565 can be loaded with ranges of control numbers 1535 or can be updated at 1545 according to the data that have already been acquired. The updating mode at 1555 and 1560 is used to ensure that the database stays adequately up-to-date while re-checking data from older control numbers at some desired frequency. It will be understood that any number of request queue strategies may be employed depending on the nature of the proceedings involved.

The update request queue is managed by a queue manager 1540 and is constructed preferably by assigning a priority to each known control number. For example in the preferred example of a post grant challenge such as a reexamination, cases that have been completed (e.g. with a Reexam Certificate Issued event) are given a small priority while active reexams may be given a higher priority. In some instances a priority level may be based on how recently there has been some activity—again other examples will be apparent to skilled artisans and it is expected that the particular implementation will be domain dependent.

A data collector 1500 can determine how many reexams to scrape, and submit the number at 1535 to the data collection server. In some embodiments the server can randomly select a priority scheme with queue manager 1540 so that many different reexams to be scraped are assigned a likelihood of selection proportional to the priority of the reexam. In the case of customer driven selection schemes, a priority may be assigned in accordance with a particular customer's status with a service provider collecting the proceeding data. When all requests have been processed a completion message can be generated at 1550.

The bootstrapping of the data is thus followed by periodic updates, which are preferably performed on daily basis to ensure that new materials are brought to the attention of the system users as quickly as possible. For example in a reexamination context, the PTO transaction records and/or image files in databases 126 (FIG. 1) are scanned to identify new events/entries. In a preferred embodiment described below the main focus is on reexamination cases, but it will be understood that other cases can be automatically processed and compiled as well, including reissue cases and user-selected cases 307. The latter in fact may be requests for automatic updating of pending applications that have not yet issued. For example the user may want to study cases for a competitor to identify upcoming issuances and/or predict likely claim coverage in the future. The data retrieval can be done through a conventional web interface 128 in accordance with the target organization's rules for such access, but it will be understood of course that if an API is made available by the target organization this can be used as well. This would allow for the organization analyzer data to be updated more rapidly and with far less overhead.

For example, the USPTO PAIR site is not searchable, and does not even identify the most recent cases that have been filed/initiated. Thus they must be identified automatically using an auto-discovery technique. To do this, the present system preferably starts with the most recent confirmed case (which hypothetically has an assigned reference number of XXX) and then increments the reference number by some constant (which can be 1, 2, etc.) to locate additional records/filings in the PAIR database. The incremented case number (XXX+1) is then "searched" (under control of monitoring logic 180 and catalog logic 170) to see if there is a corresponding record in database 126. Using this indirect approach the present system can glean the state of events within target organization 115 (here the PTO) without direct access to the latter's internal databases. Again, it will be understood that other techniques may be used in the event the target organization does make its data available through more conventional access routes.

The updates are also preferably performed using some form of prioritization. That is, the system may designate certain cases as active or inactive depending on whether they have reached a termination event. In such instance, cases with a termination event may not be checked or serviced very frequently as there is unlikely to be further developments. It is possible, of course that some exceptions events may occur, and for that reason it is desirable to periodically check even on an infrequent basis. However, to conserve resources, bandwidth, etc., it is preferable to prioritize updates in accordance with a probability model (discussed below in more detail) that determines which cases are most likely to be the subject of an update at any particular moment in time.

The operation of the data collection server is shown in FIGS. 15A and 15B.

The probability model preferably studies events within the target organization to determine their relative temporal relationship. For example it may be determined, from analyzing all or at least selected ones of the organizations cases that a first event (E1) 122 generated within target organization 115 by logic 120 (FIG. 1) for a particular case is correlated very highly with a second event (En) 124 within a certain time window T1, which may span a period of N days. Other events could be similarly correlated to determine their relationship, and to generate a table of calculated expected probabilities {P1-Pn} of new events occurring within a time window for each case {C1-Cn} under analysis. Thus a sorted table may be constructed each day by monitoring logic 180 which looks like:

| Case | Probability of new event | Likely new event type |
|---|---|---|
| Cx | X | E1 |
| Ct | X -) | E2 |
| ... | | |
| Cn | X-n | none |

The present system uses this information to assign a priority for researching and updating databases 142 in accordance with an update schedule. In other words, in the absence of some over-riding consideration, the system would construct an update schedule by considering the highest likely event (E1, with a likelihood of X) to occur (for case Cx) and would start the review of databases 126 and updating of databases 142 using this case first, and then progress through the entire set of cases until completing the list of cases, or some other marking point. For example, it may be decided that only cases above a certain threshold probability Y should be evaluated on a daily basis, while cases below this should be checked less frequently, say on every second day, every week, etc.

Other schemes will be apparent to those skilled in the art from the present teachings for generating an update schedule. The system preferably is knowledgeable of the current state of internal rules 116 and procedures 118 as part of the probability model estimation evaluation. As these are typically published and available to the public, it is not difficult to incorporate them on a dynamic basis as part of the probability model. For example, after filing a reexamination, the USPTO has a certain number of days (90) fixed by regulations, to issue an initial determination. Therefore, there is a strong correlation between such events which is easily identifiable, and if such regulations are varied (to change the time to say 60 days), the system should quickly learn to revise the models based on this dynamic parameter rather than solely prior historical information. Other organizations may have similar temporal restrictions which can be gleaned and exploited this way to optimize a prioritization of cases in an update schedule.

In other instances it may be desirable to monitor the usage patterns of the users of analyzer 110, and to base a prioritization of updates on such usage instead. In other words, if system 110 notes that certain cases are widely accessed, it may bump the priority of such case on an update schedule. To do this, the system can simply log the accesses/queries performed in connection with a certain case (say Ct). These can be sorted, again, into table form to identify a relative popularity/interest level within the community for the cases being handled by target organization 115:

| Case | Popularity/Interest |
|---|---|
| Ct | P |
| Ca | P -) |
| ... | |
| Cn | P-n |

Thus rather than using a probability score as noted above, the system may in some instances use a popularity or interest score for the update schedule. Alternatively some mix of the two can be used in accordance with system objectives, performance, etc., and after routine testing. In such embodiments the popularity/interest score may be used to augment, modify or modulate the probability determinations made for the cases as noted above, to generate a modified update schedule that reflects and incorporates community interest as well.

Returning to FIG. 3, at step 312 the system may also locate additional press releases, public posts, etc. from sources 182, 184 and other conventional content sites. These materials are then correlated with the cases as desired, so that, for example, a particular reexamination case for a particular patent/company (say ABC corp) can be associated and paired with additional information about the company. This allows users to quickly see more context and supporting details that may be germane to their understanding of the proceedings. For example, a press release may indicate that company ABC had filed a patent lawsuit on Jan. 1, 2010 for patent number XXX, and this could be paired with the reexamination case for the same patent number to give the user additional insights on the implications and impact of the proceedings.

From the set of documents at the target organization (and other sources) the system identifies a subset of key documents at step 310. Again, the system may decide to filter, ignore, or prioritize the intake of documents to give more importance to some types of documents over others. As an example, within a particular case, a first type of document (e.g., a reexamination request) may be processed more quickly than a second type of document (e.g., a status request letter or the like). Other examples of prioritization will be apparent to skilled artisans.

At step 314 the documents are preferably coded in some convenient fashion to make them more easy to be indexed, sorted, queried and/or analyzed as noted below. It may be desirable, for example, to segment and categorize the documents in a different fashion than they are found natively within database 126 (FIG. 1).

As is to be expected, in some instances the documents relating to cases handled by the organization may not always be in readily accessible form in a database 126. In such instances it may be necessary to manually inspect, retrieve and scan the documents for a file/case to ensure completeness as seen in step 316. Since the USPTO records are available to the public, it is not expected that this would present a significant burden. Moreover in some cases it may be possible to secure copies of some documents in this fashion which are not otherwise accessible through the PAIR site.

A sorting operation and preferably an OCR operation is performed on selected documents at step 320. Since many of the target organization documents are not available in text form, this aspect of the invention permits users to search and locate information across cases in a manner that is not possible at this time.

From this data one or more customized case databases 335 and associated indices are constructed at step 330. The customized databases may be in the form of separate files, tables, etc., and may be configured using any number of known techniques.

A user may then query the customized database at step 340, using any number of desired terms or filters. As seen in FIG. 3, the user can search for text terms appearing in Declarations, prior art, Office Actions, Amendments, Responses, Requests, Replies, Petitions/Decisions, etc. Other items can be searched as well and it is understood that these are but examples. In other non-PTO domains it will be useful to store and segment the customized database in accordance with the underlying data associated such domains. The data can be presented in any desired form, including as a report, as a graph, etc., much in the same way as discussed for the data presentation step 250 (FIG. 2) and as depicted below in connection with FIG. 9.

At step 350 the system preferably logs the user's request/query into a review database, which can be part of the databases 142 mentioned earlier. Here the system can compile user access to specific cases, specific documents, etc., which can be used for prioritizing an update schedule (noted above). In addition this information can be used for optimizing a content mix for the site. For example, it may be discovered that the cases for a particular company are widely studied, and this can affect and determine the types of press releases and other external data that is accessed, retrieved and catalogued for general consumption.

In some specific instances the user can configure (or the system may autoconfigure) an alert for the cases reviewed by the user, or even other specific cases designated by the user at step 360. In other words if the system notes that the user accessed and studied a particular case, it can then create a programmed alert to inform such person of future events for such case. The alerts can be programmed to use any number of desired delivery options as described below in connection with FIG. 8.

Figure 4:
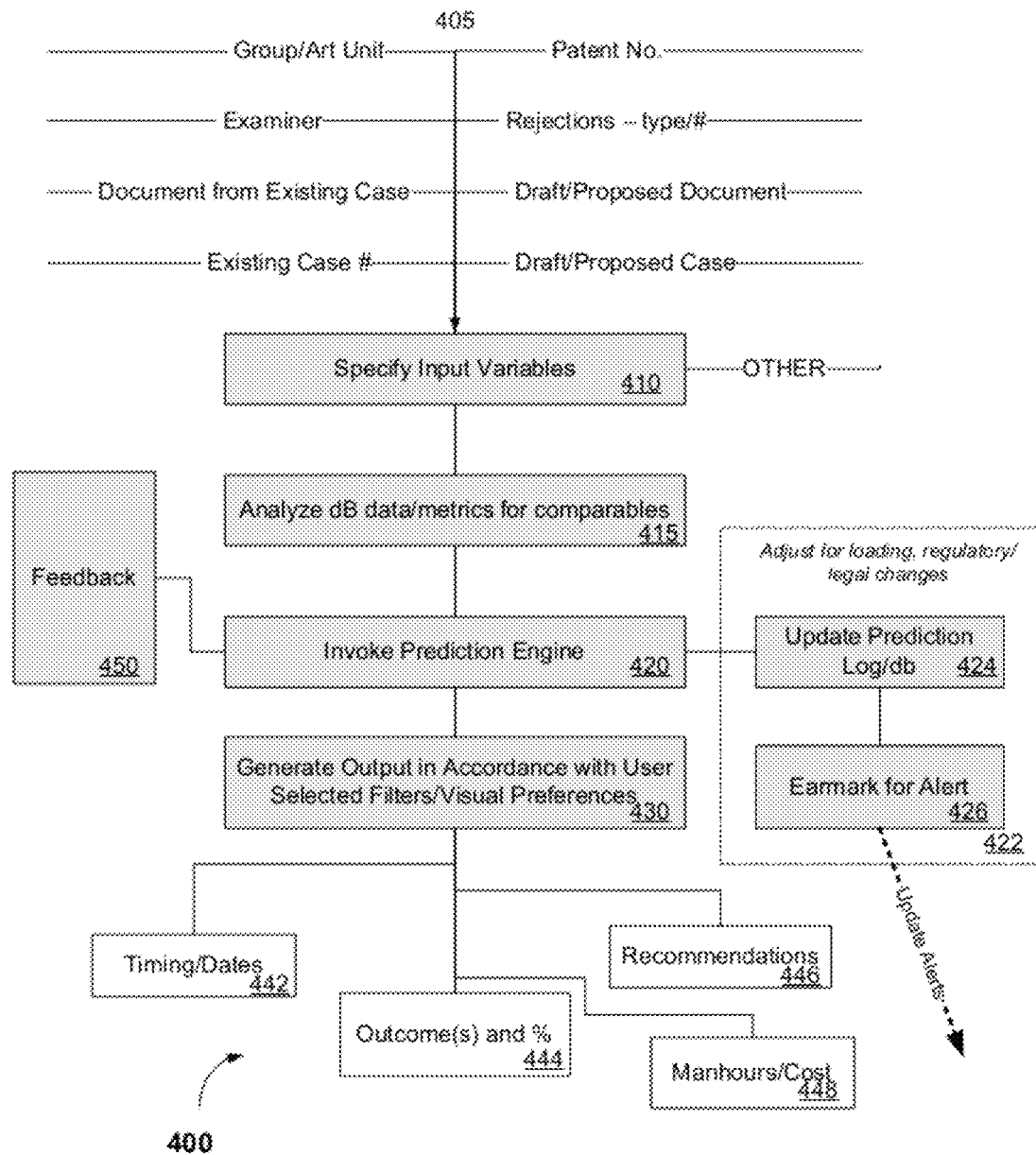
FIG. 4 illustrates an event/outcome prediction process implemented in accordance with an exemplary embodiment of the present invention.

FIG. 4 illustrates an event/outcome prediction process implemented in accordance with an exemplary embodiment of the present invention. As seen therein, a prediction engine 400 can make use of a number input variables or parameters as the basis for providing a prediction. Any or all of the following can be provided as input variables 405: a case #; a document from a case; an Examiner; a Group art unit; a patent; a rejection type; a draft/proposed document; a draft/proposed case. Other inputs can be used of course depending on the application.

In general, the system allows a user to ask questions or prediction outputs for timing, outcomes and recommendations. As an example, the user can provide a case number, and ask for a prediction of timing for the next event in the case, or for timing of a specific event. More specifically, the user can provide a reexamination control number, and be informed that the next likely event is a patent owner response within the next N days. Alternatively the user can request a prediction of when a particular event (such as a reexamination certificate issuance) is likely to occur. In other instances the user can ask about cases that are still pending to get a sense of their timing, and an expected issue date for a case. Again other examples will be apparent from the discussion herein.

Thus at step 410 the user specifies one or more of the above variables using any well-known conventional graphical interface. The input mechanism can make use of any desired input tool, such as using an numeric input, a text input, a graphical input, etc. In some instances, as noted, the user can specify a document (by reference number) or even upload a specific file for the system to consider.

During step 415 the system analyzes its databases (see FIG. 5) to look for data to be used to respond to the prediction request. For example, in the context of asking when a next event is likely to occur in a case, the system would identify and analyze the current state of a case, and other cases which have/had similar states. For instance, the case may in a state where an Requester's Reply has been received. Other cases in which such event occurred would then be put into the mix as the data set to be used for comparison. In addition, the Examiner's profile (including productivity rate and current loading) could also be considered. For example, a particular Examiner may be particular fast or slow in generating Office Actions, or may have a particularly light or heavy loading of other cases. These could be used as well as part of the data set for comparison. The documents in the case may also be considered. As an example, the length of the Reply and the Patent Owner's statement could be considered, and compared to the lengths of prior submissions in other cases. Again, it will be understood that the determination of the comparables can be based on any number of desired factors, including a target confidence rate, computation time, etc.

In addition it is possible to segment a user/subscriber base in accordance with a user status level, so that different types of users are given prediction information that is a function of such level. A user with the highest level, for example, may be provided a detailed calculation that takes into account a first number of variables that is much larger than that used for a user with a lower status level. In the latter case a base simple calculation might be used from a lesser number of variables. In this respect, users can elect what type of treatment or information they wish to receive.

At step 420 the user can invoke the prediction engine to process the aforementioned input variable, and, using the comparables noted above, combined with simple Bayesian logic, Hidden Markov Modelling or other known technique generate one of any number of desired prediction results. As noted earlier the prediction engine 420 also preferably considers loading and regulatory changes as noted at 422 in rendering a prediction. The predictions can be logged within a database 570 (FIG. 5) as noted in step 424 for later referral and/or automatic updating. The prediction may also be earmarked for alert status at step 426, so that as a prediction value changes for a prediction, an alert can be generated to appropriate users. The alert itself can be stored in a database 590 as noted in FIG. 5.

The results can be generated/output at step 430 in accordance with any desired visual scheme appropriate for the data set, including list form, graphs, charts, etc. Where graphs/charts are used, the system can annotate the output to indicate statistical confidence levels and the like for the benefit of the user. As noted earlier, the prediction type may include one or more of:

a) a timing or date for an event 442; this may be expressed as a date, a number of days, or a window of time; in very basic instances this can be used to identify the likely date for issuance of a reexamination certificate, or expected date of issuance of a still pending application.

b) an outcome or a percentage likelihood of such outcome or event 444; this may be expressed as a positive or negative result, and/or in numeric or visual form for the different possible outcomes; the results may be classified in the aggregate, or may be broken down if desired on a claim by claim basis. The outcome may also indicate whether the system predicts that the claims will require modification (or amendment) to survive the reexamination process. In other embodiments the system may identify whether a pending application is likely to result in an issued patent.

c) a recommendation or suggestion 446; this may be used by practitioners and expressed as an express suggestion to add/remove a rejection type, amend one or more claims, or modify a proposed document in accordance with insights gleaned from comparable documents;

d) an estimate of the number of manhours and/or cost associated with the case, or which are required to complete the case. This can be based on evaluating the current state of the case, the number of documents/pages associated with the case, studies and/or surveys of average billing rates, reexamination costs, etc. Large entities may find this information particularly useful for budgeting and planning purposes, and it will be understood that the principle could be applied to regular prosecution as well, so that IP managers can get a firm grasp on expected upcoming legal expenses needed to support a group of patent applications.

While some exemplary predictions were noted above, it will be apparent that based on the databases maintained in the system (see FIG. 5) a number of additional predictions can be generated as desired. Some examples include:

Example #1

Group Art Units—the system can provide a prediction of all events expected as output for some or all of a set of cases currently pending across one or all Group Art units. In effect, this can be used to forecast a cumulative output of the target entity within any desired target window.

Example #2

Group Art Units: Alternatively, the system could predict when a future, hypothetical unfiled case would be likely finalized by the target entity. This could be used for planning to evaluate options vis-à-vis using the reexamination process versus a litigation action.

Example #3

Examiner—the system can provide a prediction of all events expected as output for some or all of a set of cases currently pending with an Examiner. In effect, this can be used to forecast a cumulative output of the Examiner within any desired target window.

Example #4

Document—the system can provide a prediction for certain types of documents which can be characterized or associated with a definite resolution or outcome. The resolution or outcome may be binary, or may be expressed as percentages, etc. The documents may be as simple as the result of a petition for an extension of time, or a more complex document such as the Request itself. The document in question can be compared statistically to prior documents similar to it using any number of metrics as part of the evaluation. In effect, this can be used by interested parties to understand the expected potential outcomes, and therefore how the target entity's process should be factored into other proceedings. For example the prediction tool 400 may estimate—based on analyzing the content of the Request itself—that the chances of a particular reexamination succeeding in invalidating a patent are extremely high or extremely low. This calculation is useful when the case is relatively young, and can be part of an evaluation process for estimating the value of an underlying patent, settlement with a patent owner, etc.

Example #5

Case—the system can provide a prediction for the resolution of a particular case at a later stage of proceedings, which, again, can be characterized or associated with a definite resolution or outcome. The resolution or outcome again may be binary, or may be expressed as percentages, pie chart allocations, etc. This may be based on a number of factors, including as noted a total number (or at least selected ones of) documents found in the reexamination proceedings. The documents in question can be compared individually statistically to prior documents similar to them using any number of metrics as part of the evaluation, or can be evaluated as a whole against other collections. As before this can be used by interested parties to understand the expected potential outcomes, and therefore how the target entity's process should be factored into other proceedings.

In the situation where a case represents a still pending application, some embodiments of the invention can monitor PTO documents to identify basic documents such as notices of allowance, issue date notifications, etc., to provide estimates for when a particular application will issue as a patent. This feature in effect acts as a form of early patent radar to alert a user to the potential impact of new intellectual property. It is expected that businesses will avail themselves of this option to gain competitive intelligence, insights, etc., on competitors who may be in the process of securing new patents in the immediate future.

Other types of predictions may be based on hypothetical or simulated cases or documents (or portions thereof) which have not been filed, for the purpose again of developing optimized strategies and understandings of the target entity. This type of "what if" analysis can be used by a myriad of interested persons, including decision makers, litigation attorneys, prosecution attorneys, etc., to understand and formulate appropriate strategies.

Example #6

Patent—this prediction tool can look at a target patent, and, based on its characteristics, determine a potential outcome and timing for a resolution. As is well-known, patents can be analyzed with respect to a number of different characteristics, including general technology area, specific classification, specification word content, claim wording/content, inventor pedigree, assignee name, priority date, citations, prior art cited, underlying Examiner, and many other factors known in the art. Using these characteristics the system can compare the target patent against all (or some selected group) of patents which have been subjected to reexamination to determine the probability of success, timing, etc. It should be noted that the outcomes can be specified with different degrees of granularity, so that for example, specific target claims can be examined within the target patent, along with the patent as a whole.

The data predictions can be used, of course, in a converse manner to provide comparative reports to visualize a breakdown of timing/outcomes for patents based on the above characteristics. For example, a user can ask to have a plot of claim length versus rejection rate, rejection type, timing, etc.

Example #7

Rejections/Type—this prediction tool allows the user to specify a quantity and type of rejection to determine potential timing and outcomes. For example the user can identify/compare the difference between having a single 102 rejection for a claim, compared to having two or more of the same type. Or, the user can specify multiple types of rejections (102, 103 and 112). In this manner the user can review relevant references, claims, etc., and determine an appropriate strategy for a contemplated filing.

As above the data predictions for rejections can be used, of course, in a converse manner to provide comparative reports to visualize a breakdown of timing/outcomes based on the rejections. For example, a user can ask to have a plot of rejection types versus outcomes, timing, etc. The user may use such information to identify an optimal mix of proposed rejections to make so that they can ensure a more careful and longer examination period in the target organization. This can save expected fees, as well, as the drafter of the reexamination may determine that certain rejections are unlikely to be successful for a particular patent, and thus if they are only marginal to begin with they can be removed.

Example #8

Proposed Document—here the prediction tool allows the user to provide/upload a document that they propose introducing into a particular case. The document is analyzed against other comparable documents to identify characteristics that would tend to indicate its utility, potential for successful outcome, and timing. Both statistical and semantic processing can be employed to analyze word, sentence choices, etc. Natural language processing of documents to identify similarities and differences is well-known, and any number of suitable techniques could be employed herein. For example the user can author/generate a petition for an extension of time, upload an electronic file with the contents, and have the system predict a likelihood of success of such petition being granted. In addition, the system can identify/flag other petitions that are most like the user's (from a content perspective) to help him/her identify examples of outcomes that are favorable or unfavorable.

Example #8

Proposed Case Request—As with example #7, this prediction tool can parse a specific type of document, namely, a completed submission/request, to identify its potential for success, and an expected timing for resolution. As before, the Request can be is analyzed against other comparable documents using natural language techniques to identify characteristics that would tend to indicate its potential for successful outcome, and timing.

Again it should be noted that all of the above predictions may be based on a variety of factors, including a current dynamic loading experienced by the personnel, historical/seasonal variations, etc. In a preferred embodiment the system continually receives feedback 450 of actual events and results from pending cases, as for example can be determined from database 560 (see FIG. 5) and others below. This information is used to calibrate, fine tune and alter the prediction engine behavior to better mirror and reflect real world conditions.

As can be seen above, the system allows the user to identify and exploit biases and predilections that would otherwise be obscured—if not invisible—based on day to day observation of the workings of the target organization. By analyzing the output and events in bulk and across the entire organization, the system identifies event correlations, document correlations, etc., which are hitherto not seen since the data has not been compiled, maintained and dynamically evaluated in this manner. Using the prediction tool the user can also mix and match parameters to consider multiple constraint dimensions. For example the user can predict the optimal rejection types for a particular claim in a particular patent.

In addition to the USPTO as a target organization that can be evaluated for predictions, it will be apparent that other types of entities could be analyzed in the same way. For example, decisions of the Board of Appeals could be examined in the same manner, and the personnel of such entity (a panel of judges) similarly studied to identify correlations in behavior and processing of submissions (in this case, appeals). Thus, both the outcome and timing of appeals could be estimated by embodiments of the invention by analyzing appeal submissions, and a panel of judges reviewing the submission. Since the panels are frequently correlated with particular subject matter, it is not difficult to predict a panel composition for a particular case. In instances where the applicant requests oral argument the panel composition is in fact then defined for the user. Thus, given a set of judges, or an expected set of judges, the invention can be used to predict an outcome and timing for an appeal.

In other instances it is possible to further collect data on the personnel of the entity, such as by observing them in public when they are hearing oral arguments and the like. The resulting oral arguments are frequently captured in electronic form, and can be transcribed to identify content associated with the individuals. The oral arguments for the CAFC for example are kept in an online accessible database their website and can accessed there. The present system can be augmented with appropriate conventional speech recognition routines and supporting logic (not shown) to identify a prosody of each individual during a hearing (from the audio signal) on a continuous basis to determine a prosody or affinity score of the judge for the party in question. The content (questions, statements) made by the judge can be similarly identified using such routines and scored to determine a positive or negative valence/affinity for the party in question. The combination of content and prosody score can be used, in conjunction with historical information for the judges, to determine a likelihood of a resolution of the case in favor of one party or the other. Historical information can be compiled for each judge to identify signature word content choices, key prosody identifiers, etc., along with outcomes for the cases, and timing tags to indicate when/for whom the statements were made in the context of the hearing. For example it may be determined that a particular judge's use of certain expressions is strongly correlated with ruling for/against a certain party. By analyzing these correlations across a wide set of rulings the invention can be used to study a judicial organization for its predilections and observable biases.

In still other embodiments it can be expected that product reviews, stock reviews, etc., can be predicted from entities that provide such functions. Other administrative agencies which use well defined procedures could be modeled as well.

Figure 5:
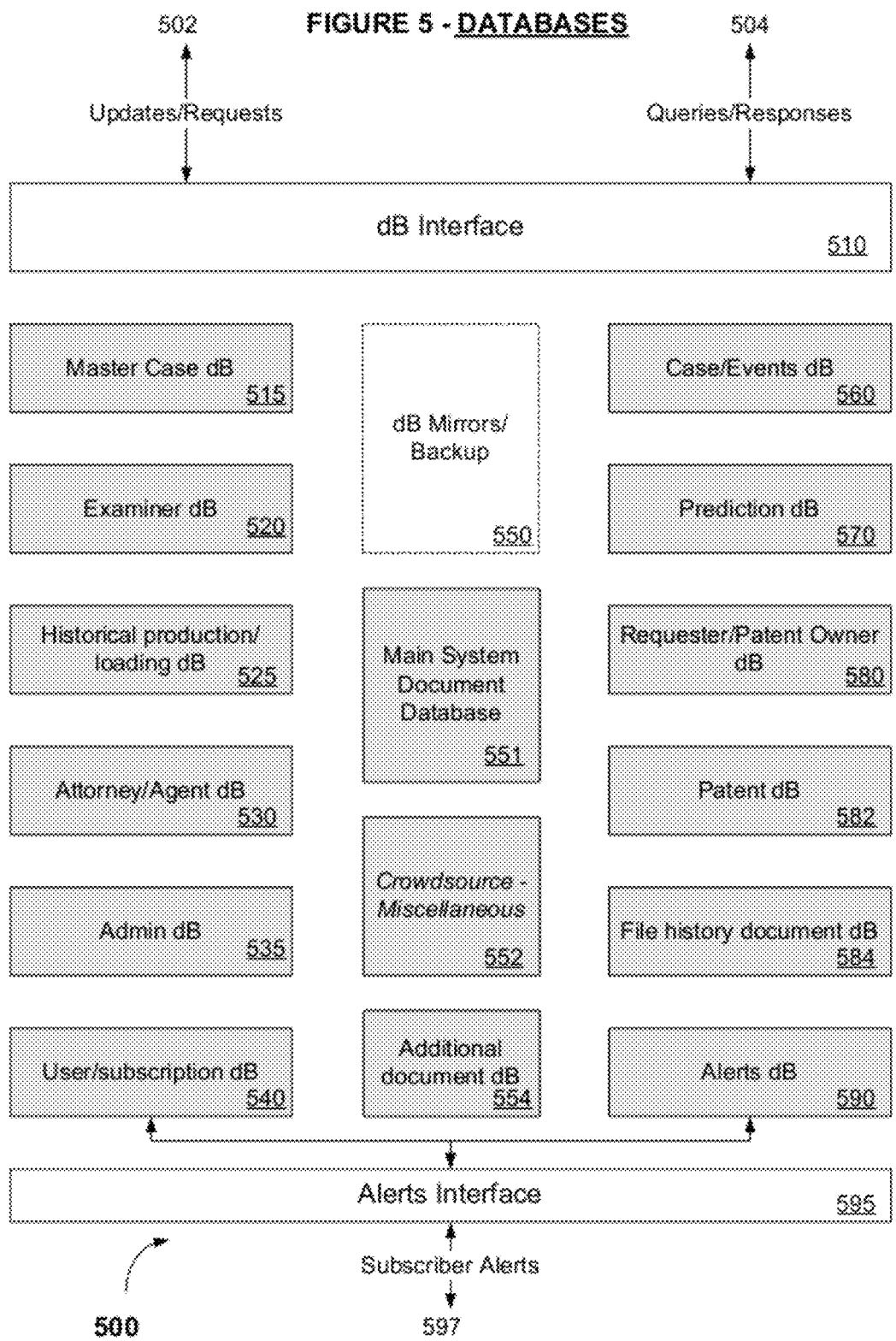
FIG. 5 illustrates a database system implemented in accordance with an exemplary embodiment of the present invention.

FIG. 5 illustrates a database system implemented in accordance with an exemplary embodiment of the present invention. As alluded to above, a number of specialized and customized databases are used in the preferred embodiment to support operations of the analyzer 110. These databases support a number of records and field definitions, including those provided in Appendix 1, although it is understood that this is not an exhaustive list and others could be used in commercial embodiments. Furthermore those skilled in the art will appreciate that other organizational forms and schema can be used by the databases without departing from the spirit of the present teachings.

As seen In FIG. 5, the analyzer 110 builds and updates the databases using a number of requests and updates 502, which, as noted above, are generated and controlled through cataloging logic 170 and monitoring logic 180. The user queries (and responses thereto) 504 against the databases are provided over a network connection and through an interface 510.

A first type of database is a mirror/backup database 550. The purpose of this database is to try and emulate or approximate the content of database 126 as close as possible. This allows for creating a second access path to the target organization data through bandwidth, routing, etc., that does not impose a processing load on the entity in question, but which may be more optimized for public consumption. For this reason it is expected that embodiments of the invention will be attractive to individuals and other companies who want to access the target organization's data in a more robust manner, and/or through faster connections, without worry that the data is not a 100% duplicate. Note that in some instances it may be desirable to "scrub" database 550 so that obvious errors are removed, while in some embodiments it may be required to duplicate the content exactly, including with any blatant errors.

In a preferred approach a main system master case file and document database system 551 is also maintained. This database (which is comprised of multiple databases) has a structure/format optimized for ensuring rapid retrieval of relevant documents for the cases, and thus may vary significantly from that used by the mirror database 550. Therefore the raw data for each case is maintained here (with events and links to events), which may be sanitized or corrected for obvious errors. In addition the original documents (or links to the documents for retrieval from another storage system) are stored within this database system to permit users access to the image files typically associated with PAIR, such as stored typically in Acrobat PDF versions. Furthermore, as noted above, text indices are also actively maintained and constructed for each document OCRd by the system to ensure text based and search predicate based querying of the underlying content in the submissions.

A master case db 515 includes records used by the system with data that is extracted from the original case records found in database 126 as well as other data generated by the system to identify a case. For example each case may be given a system reference number that is matched to a case submission number for the target organization (i.e., a control number within the PAIR context). Other fields within the master case db may include patent numbers, inventor names, Examiner names assigned to the case, attorney names, assignees, etc. Result data may be retained for each case as well, including disposition and histories of claims rejected, the basis therefore, and final dispositions of the cases, such as whether the reexamination/reissue resulted in a certificate, a final rejection, etc. In the case of pending applications similar information would be maintained as well.

An Examiner database 520 contains names and other profile data associated with the personnel of target entity 110, and their respective work groups (which can be art units). The profile data may include a list of cases worked on, and other survey data collected as noted earlier.

A production/loading database 525 tracks loading of the organization by case with time and by Examiner. This can be done in any convenient fashion, including through chronological snapshots which create a record, for each time period, of the cases being actively worked on, and the identity of the Examiners involved. Other techniques for determining the loading can also be used by correlating other data as noted below. It will be understood that the time period can be set to any desired value (daily, weekly, etc.) to monitor the organization's productivity and loading.

The attorneys and agents working on the cases are also tracked in database 530. This can include basic information such as names, addresses, firms, registration numbers, requester/patent owners represented, number of cases in active status, etc., and can also include more advanced data such as the identity of all cases worked on, links and references to documents authored, success or failure rate in cases, and so on.

Administrative information associated with the running of the analyzer is stored in database 535. This can include basic information about users and subscribers, and may also include more advanced data identifying the state of the currency of the data in the system, the level of accuracy measured for the system, and so on.

User subscription data is maintained in database 540, including identifying information, plan level data, account balances, company affiliations, contact information, profiling information 260 provided (see FIG. 2) and any other types of data desired for this purpose.

Database 552 is used to store crowdsource/vote data as noted above. Again identifying information for each contributor is kept, along with an indication of a case and a vote value provided for such case. For example, a user can provide a "vote" which is multi-dimensional and specifies: a) that a particular Examiner; b) will reject a particular case identifier; c) under a particular theory; d) on a particular date. Other forms of data can be received and processed as desired, such as a probability of success predicted for a specific case by the voter, and so on. Other examples will be apparent to those skilled in the art. Authentication information can also be maintained to minimize and reduce vote fraud.

Events are logged for each case in database 560. In a preferred approach, this database contains an entry for each event generated by target entity 110 for any case being processed. The events are preferably logged with reference to multiple indicia including some or all of the following: an event number; an associated case reference number; a system reference id number; an event classifier (e.g., what type of event occurred) and a time stamp. Other types of data may also be included if desired, including an entity responsible for the event, links to any documents associated with the event, and so on.

A prediction database 570 is used to maintain prediction that is either generated in response to user requests, or auto-generated periodically in response to the former and/or program conditions as noted above in FIG. 4. For example, a user may ask to know the expected date between two events in a particular case. A log of this prediction, along with the prediction value, is maintained for the user. If a sufficient number of users request the same or similar data for the case, the system may be configured to refresh the prediction automatically so that upon a future invocation the result can be presented faster. Dedicated caches may be associated with the user's account as well to make the data even more quickly available. In this manner the system can appear to perform in an extremely timely manner by predicting the user's request in advance, and caching the result so that it is available for access and inspection. The system can also automatically generate different types of predictions off-line, as noted earlier, for the same purpose (to expedite presentation of results) based on some programmed priority logic.

A database of reexamination submission requesters and/or patent owners and their identifying information is also preferably maintained in a database 580. Like the attorney/agent database 530, other data can be maintained and cross referenced for each requester/patent owner, such as associated reexam numbers, patent numbers, assignees, attorney/agents, and so on, along with more advanced information, such as success rates, number of cases in active status, etc.

A patent database 582 may include basic bibliographical information for the patent as conventionally stored at the USPTO site, along with cross reference information to reexam numbers, system reference numbers, etc. The actual patent documents, in electronic form, can also be stored here. Document links can also be provided to be able to access and retrieve patent related documents easily within a graphical interface presented to the user. File history documents (such as may be present in a prior prosecution proceeding for the patent) can be maintained in a database 584.

In some embodiments it may be desirable to consolidate and maintain as much information concerning a patent in question as is feasible to provide a one-stop service. Accordingly additional types of documents (petitions, appeals, press releases, Internet content, etc.) can be also stored and text indexed as seen for database 554. Database 554 may also be linked to (or have data from) the USPTO's assignment database so that users can be informed of a current assignee and any prior records of transfer. Since this is normally kept outside the aforementioned PAIR system, this again allows for a better one-stop user experience by integrating multiple otherwise disconnected databases together.

While some current organizations offer basic patent services (such as obtaining copies of the patent themselves) it is extremely impractical if not impossible to easily glean the totality of data for an issued patent that is subject to reexamination in context, including for example previous prosecution, prior art cited against it, the communications with the Examiner, petitions, board decisions, etc.

An alert database 590 is used to store notifications which are sent or will be sent to subscribers. These may be indexed by subscriber, or case/event number. As noted above, subscribers can ask to be kept abreast of developments for a particular case, or if a particular prediction of interest has changed dramatically beyond a preset threshold. For example, if the timing between two events, or the likelihood of success is calculated to change by more than 10% the subscriber can be alerted. Users may choose to be alerted of specific events as well, such as a notice of intent to issue a reexamination certificate, or a notice of allowance (for a pending case), an issue date notification (for a pending case) and so on. Other examples will be apparent to those skilled in the art.

The alerts pass through an interface 595 where they can be directed (see FIG. 8) in any known or to be discovered electronic channel to the users/subscribers 597. As can be seen above, it is possible and indeed likely that there is overlap in the coverage of the various databases, and that some of the databases above may be simply indices, tables or subsets of other databases. By formatting the data this way it can make the presentation of the data within a graphical interface much faster nonetheless. While the preferred approach above is presented in the context of a reexamination analysis system, it will be understood that other applications will require different data and schemas. A final decision on the composition and schema for any implementation will invariably vary according to system design needs and requirements. Further it will be understood from the discussion above that these are but examples of the types and forms of databases that would be used in a preferred embodiment.

Figure 6:
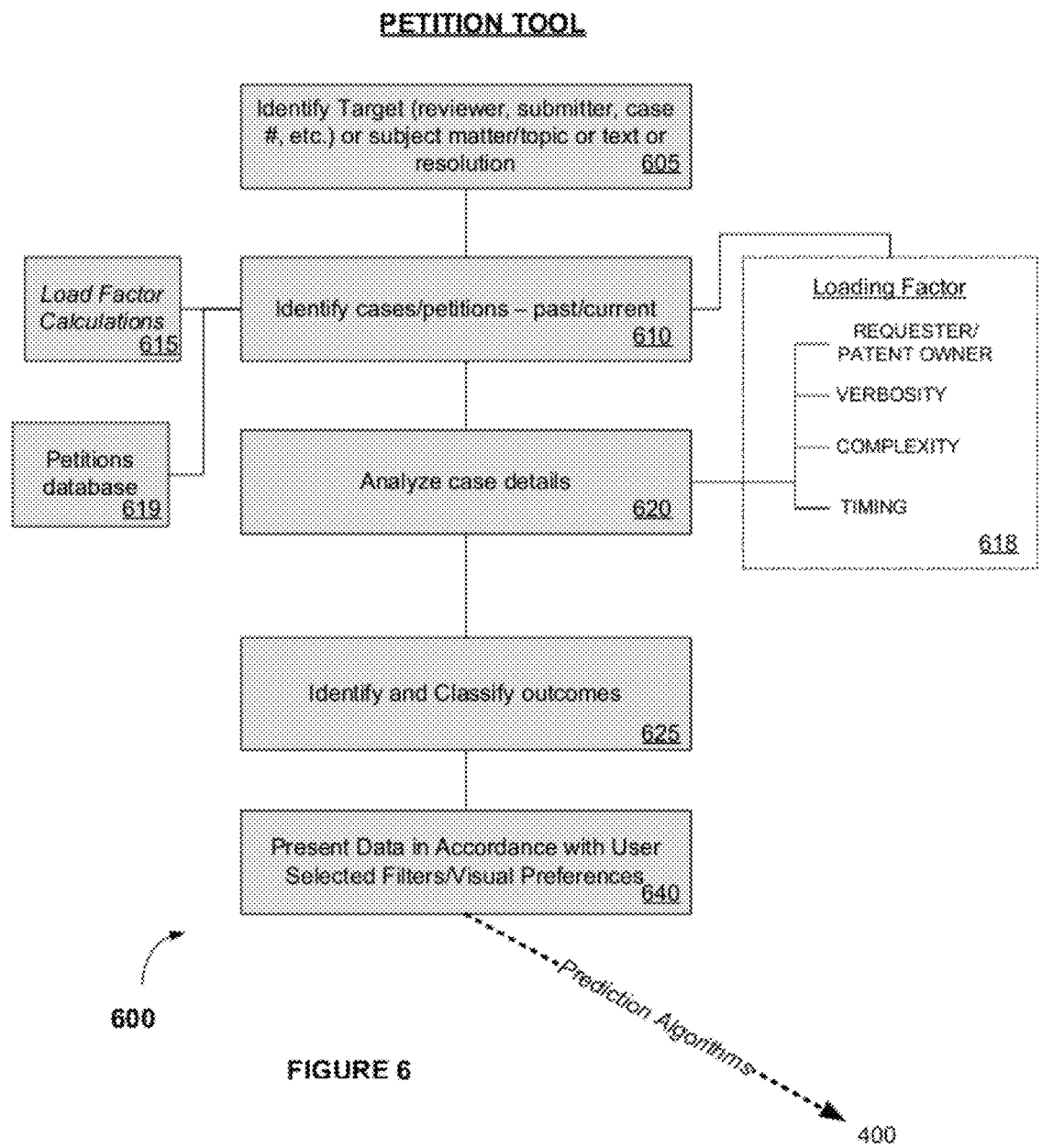
FIG. 6 illustrates an exceptions handling/analysis process implemented in accordance with an exemplary embodiment of the present invention.

FIG. 6 illustrates an exceptions handling/analysis process implemented in accordance with an exemplary embodiment of the present invention, which, in the case of a reexamination analysis domain, would include submissions such as petitions and the like. As is well-known, entities involved in reexaminations may file petitions for any number of reasons seeking relief from the rules and regulations governing such proceedings. For example a participant may request for additional time beyond a nominal due date to file a submission. Alternatively they may ask for a certain document of prior art to be considered even if it is untimely filed. In other instances they can ask to be excused from strict compliance with a page limit in their submission, and so on. Other examples are known to those skilled in the art, based on a current state of the Code of Federal Regulations (section 37) and the Manual of Patent Examining Procedures (MPEP). Other organizations will have their own specific governing procedures, rules, protocols, etc., which may be subject to an exceptions submission. While the present preferred embodiment is directed to a reexamination filing, it will be understood that the principles can be extended to locate petitions across a wider universe of filings within the target organization, including for example pending applications.

In general, the petitioner can ask to be excused from any mandate over which the target organization otherwise has jurisdiction to enforce. To obtain such relief they are required specifically to file a petition with the organization/entity and secure a favorable decision authorizing the rules exception. Depending on the nature of the petition, it may be handled by different groups or personnel within the PTO.

The exceptions handling aspect of the invention is also unique in that no current publicly accessible system exists for permitting practitioners and other entities to observe and monitor a collection of petitions and decisions. Thus, it impossible to simply search databases 126 for petitions by subject matter, by filer, by decision, by date, etc., to gain wider scale insights and understandings into the operation of the USPTO. As seen below, users can select and filter such submissions quickly and efficiently to identify outcomes, timing, etc. and obtain reports on the same in text, chart and/or graphical forms. In addition the users can easily identify and retrieve the actual decisions by the organization relating to the petitions, so that a comprehensive dataset can be presented in one convenient interface to the user.

In a preferred embodiment users can identify at step 605 a particular target type of petition, such as petitions handled by a specific person/group within the PTO, petitions associated with a particular case, petitions associated with a particular submitter, petitions containing certain content (text) or more generally those classified in accordance with a particular type of relief sought, or by reference to a resolution (which may be favorable or unfavorable for example). In both cases the user can be presented with any convenient form of pulldown menu to select a name, a subject matter/topic, etc. For instance, users can ask to see petitions associated with a particular type of relief, such as an extension of time, extra pages, a prior art submission, a declaration, etc. Alternatively the users can simply request to see every petition filed for every case, broken down logically according to type.

At step 610 any cases or petitions from a petitions database 619 (which may be information gleaned from one or more databases discussed in FIG. 5) matching the criteria specified are identified. In the event a submission resolution time is desired, the system can also account for load factors 615 as previously discussed.

Other identification/analytical data 618 associated with the petition submissions, such as the name of the submitter, the associated patent owner, the length or complexity of the document, and the timing associated with a related decision, can all be computed or determined as well at step 620, if it is not already conveniently available. The outcomes can then be summarized as well at step 625.

At step 640 the results of the petition/case search can be presented to the user in any convenient form as noted above. Comparisons can be made to identify particular correlations or trends of petitions or decision outcomes, timing with particular personnel, with particular art units, etc. The resulting report preferably includes embedded resource locator links to permit the user to easily find, review and utilize the actual content of the petitions and decisions, including text, graphics, etc.

Since the petitions and decision data is stored in both image form and text (OCRd) form, it can be searched for relevant text content. Accordingly users of the system are also able, for the first time: a) to search and consider such documents from a content perspective; b) to search across an entire set of such document spanning over multiple cases. For example users can locate and review petitions which discuss a particular rule, regulation, etc., or which make mention of a particular patent, person or precedent across all cases handled by the PTO. This is in contrast to existing architectures (seen on the top of FIG. 1) which only permits the user to access a single case at a time, and then, the data is not in any searchable form by the user. Thus, the present invention, by capturing the entirety of the organization data in an accessible form, allows for greater public review and understanding of the internal processes and predilections of such entity.

It will be noted that while the discussion for FIG. 6 is directed specifically to USTPTO Petitions, the present teachings are broad enough to encompass the operation of other organizations who have comparable exceptions events. Moreover, while not specifically shown, it will be apparent to those skilled in the art that other forms of events, such as decisions/orders by the Board of Patent Appeals and Interferences, can also be processed as noted above to provide insights into such entity. As with the general PAIR system, the BPAI system for finding, reviewing and understanding precedent is extremely minimal and lacks basic query functionality, including general text or other simple parameters. Using the present techniques this data could be extracted, compiled and organized to permit larger and easier public access and insights.

Figure 8:
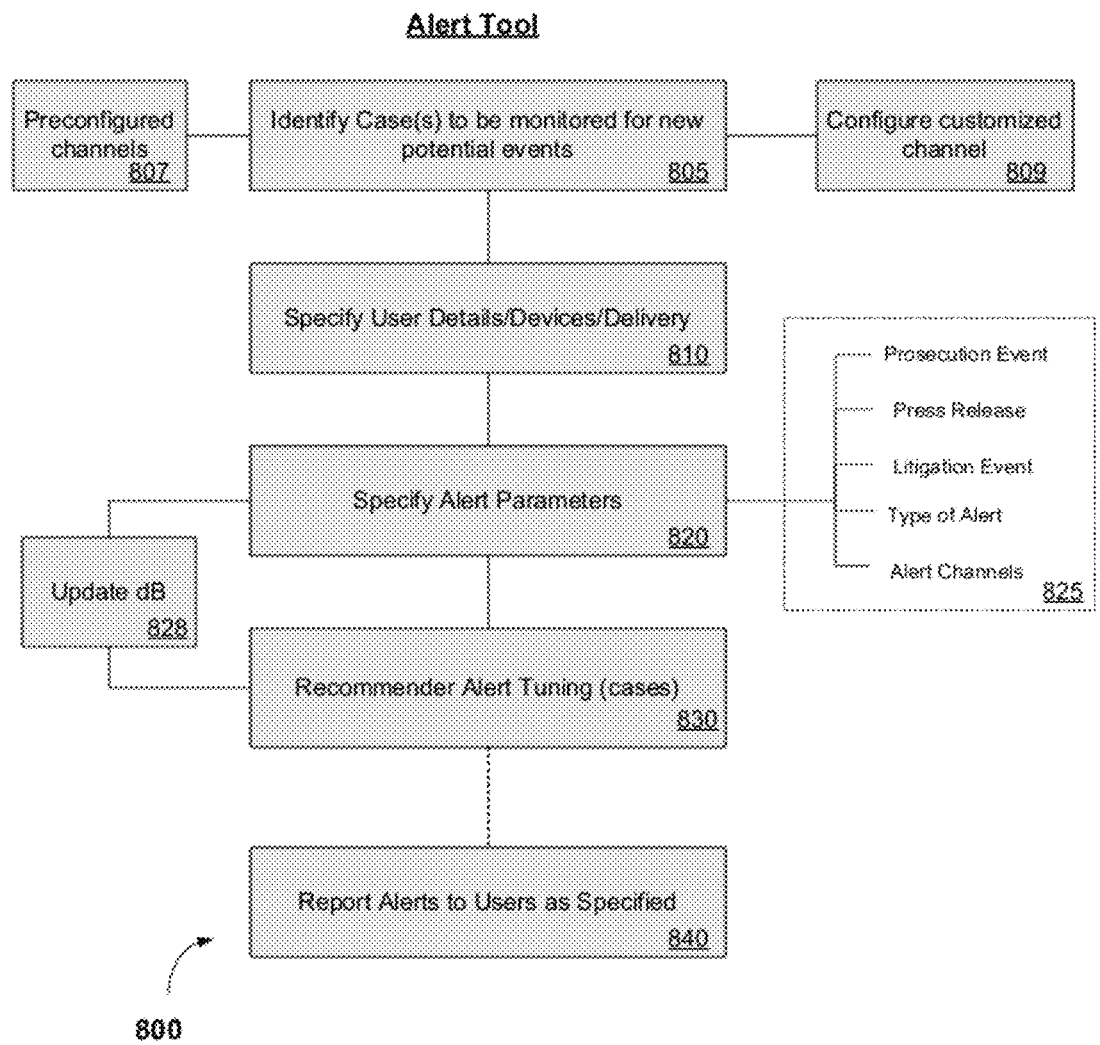
FIG. 8 illustrates an alert process implemented in accordance with an exemplary embodiment of the present invention.

FIG. 8 illustrates an alert process 800 implemented in accordance with an exemplary embodiment of the present invention. The intent of this feature is to permit users to be kept informed of changes in the underlying data or events taking place or associated with the target entity. While again current systems do allow for some notification of PTO related events, these are typically limited to individuals who are registered patents/agents. The present invention further mass enables and democratizes the information to make it more accessible and usable by the public. In addition, current systems do not permit users to search for channels/cases to subscribe to receive updates.

At step 805 the user is allowed to designate a set of cases for which he/she desires to receive alerts. In a preferred embodiment the user can specify not only specific case numbers, but also parameters associated with cases, such as patent number, inventor name, Examiner name, attorney name, requester name, etc. Any data associated with a submission may be considered to determine a set of cases to be monitored.

In some instances it may be desirable to subscribe to pre-configured specific "channels" 807 organized in some logical fashion by topic or subject. That channels may be identified with specific companies, specific Examiners, specific cases, specific events, etc. Any number of variants will be apparent to those skilled in the art. Alternatively a user may specify his/her customized channels 809, which, in some cases may correspond to a docket of cases that he/she (or their company) is affiliated with or responsible for. At this point it will be understood that the set of cases, as defined/filtered by the user, will be associated with a set of new potential events of interest that are generated as the target organization processes submissions.

The user can then specify or configure their requirements for delivery of the alerts at step 810, including defining individuals, email accounts, message accounts, portable devices, etc., which are to receive the alerts. Any number of different conventional options may be elected here.

At step 820 the user can specify alert parameters, including particular types of alerts and/or thresholds 825 that they wish to impose to filter the set of new potential events. For example, the "type" of event may be tied to a particular type of document being associated with an event, such as an Office Action, a Response, a Petition, etc. Alternatively the event may be based on a press release or litigation event (which may be derived from a separate news/litigation database or service) for a company in question that is associated with one of the cases.

All such actions, and others apparent to those skilled in the art, can result in a triggered/candidate alert. The user can specify that they nonetheless do not want to see such triggered alerts until a certain number of press releases (a threshold) are identified (which can be a form of confirmation) in recent news searches, and so on. In other embodiments the user can request that they only be sent an actual alert through one of the channels when the aggregate number of triggered alerts (across all channels) exceeds some number.

In addition, users can specify that they wish to be alerted based on user-defined thresholds which may be associated with a prediction generated by the process noted above in FIG. 4. For example, the user can specify that he/she wants to be informed if the system determines that the prediction for a first case outcome has changed by more than X % since a prior alert or review by the user, and/or now is above or below some other variable threshold. This allows for dynamic updates based not just on content changes, but also evaluation/prediction changes maintained by the system. Users can similarly be alerted based on measured changes in an expert or crowd sentiment garnered below (as seen in FIG. 10). Again, the user may ask that if a collective community sentiment and/or expert sentiment varies by more than Y % from a prior value, or has gone above or a certain value, the user would be provided an alert to be kept abreast of this change.

In addition, as alluded to herein, alerts can also be generated based on predictions made based on a calculation that a certain target event is likely occur within the organization with a certain confidence and within a certain time period. For example, an alert may indicate that a Notice of Allowance is expected with 90% certainty within the next 30 days, and so on. A prediction may be made that a particular case will be taken up by a particular Examiner, based on an examination of loading consideration of other examiners, and the subject matter of the case, and so on. Other examples will be apparent to those skilled in the art.

As the alerts are triggered and/or sent they are stored and updated in a database as seen in step 828. With this type of data the system can also monitor and develop correlations between users, channels and alerts to give recommendations to users at step 830 for new channels, cases, companies, alert types, etc. This can be implemented using any conventional collaborative filtering algorithm, corroborative filtering algorithm, etc. which uses some form of prediction. This technique can help users find and identify other subject matter of interest that they may have overlooked.

The alerts are then sent/reported to the users at step 840 in accordance with their preferred delivery mechanisms noted above. The data can be archived as desired for each user as well.

Figure 9A:
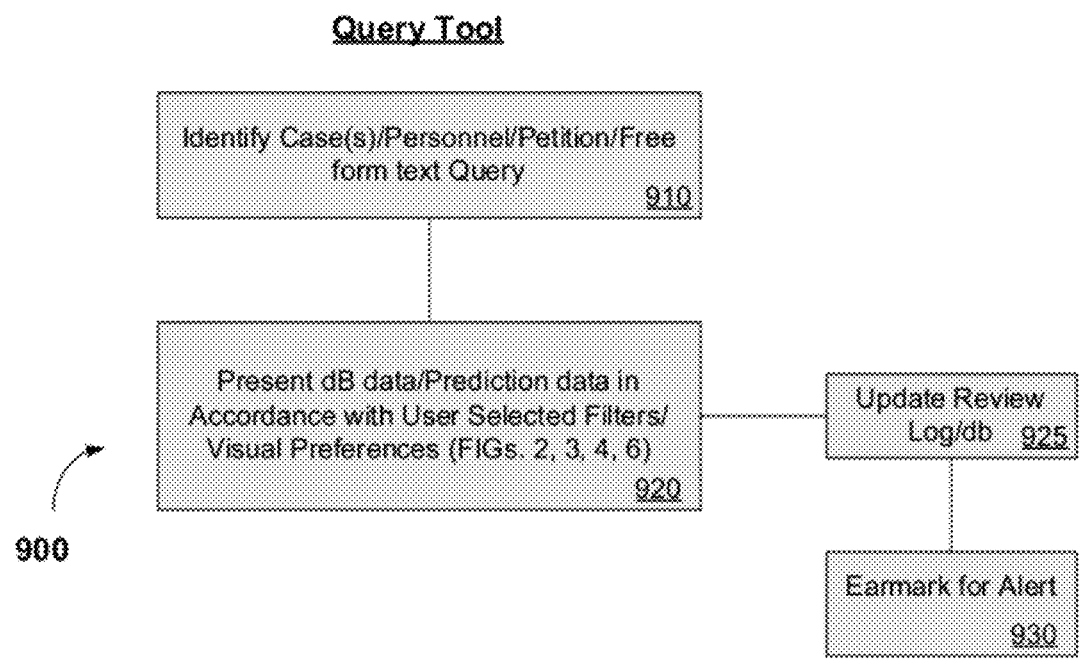

FIG. 9A illustrates a query process 900 implemented in accordance with an exemplary embodiment of the present invention. It will be noted that this figure is merely intended to show the general aspects of how a query process would be implemented consistent with the discussions above. Thus at step 910, the user is permitted to identify any one of a variety of predefined labels/identifiers for a case, a particular examiner (personnel), etc. by selecting entries using a conventional pull down list or similar visual selection tool. Alternatively the user can specify free form text to be matched by the items in question.

As seen at step 920, the user is then presented information from the relevant database (FIGS. 2, 3, 4 6) meeting the query parameters (terms and/or predicates) in accordance with a filter and format selected. A review database can be updated at step 925 to track user behavior and selections, which, as noted above, can be used for a variety of purposes, including deciding priority for updates, or earmarking potential alerts as seen in step 930.

Examples of the types of queries and reports possible with the present system are shown in FIGS. 9B-9G. Other examples will be apparent to those in the art, and it is understood that this query/report generator will vary in accordance with the particular target entity and design requirements. Moreover as noted above the form of visual output can be varied to suit user interests or demands.

For example, FIG. 9B shows that the user can ask for a report identifying the expected elapsed time between a Start event and an End event. The two events can be any based on any type of event associated with the target entity. In the case of a reexamination, for example, the user could designate the Start event as the receipt of the request, and the End event as a right of appeal notice.

As seen in FIG. 9C, a user has requested a report identifying an average time required for the PTO to render a decision on a petition in a reexamination context. The report here is in graphical form for visual appeal and understanding.

In FIG. 9E, a similar report has been requested to identify the total duration of a reexamination proceeding. In this case the data is presented in table/list form for convenience.

Figure 9D:
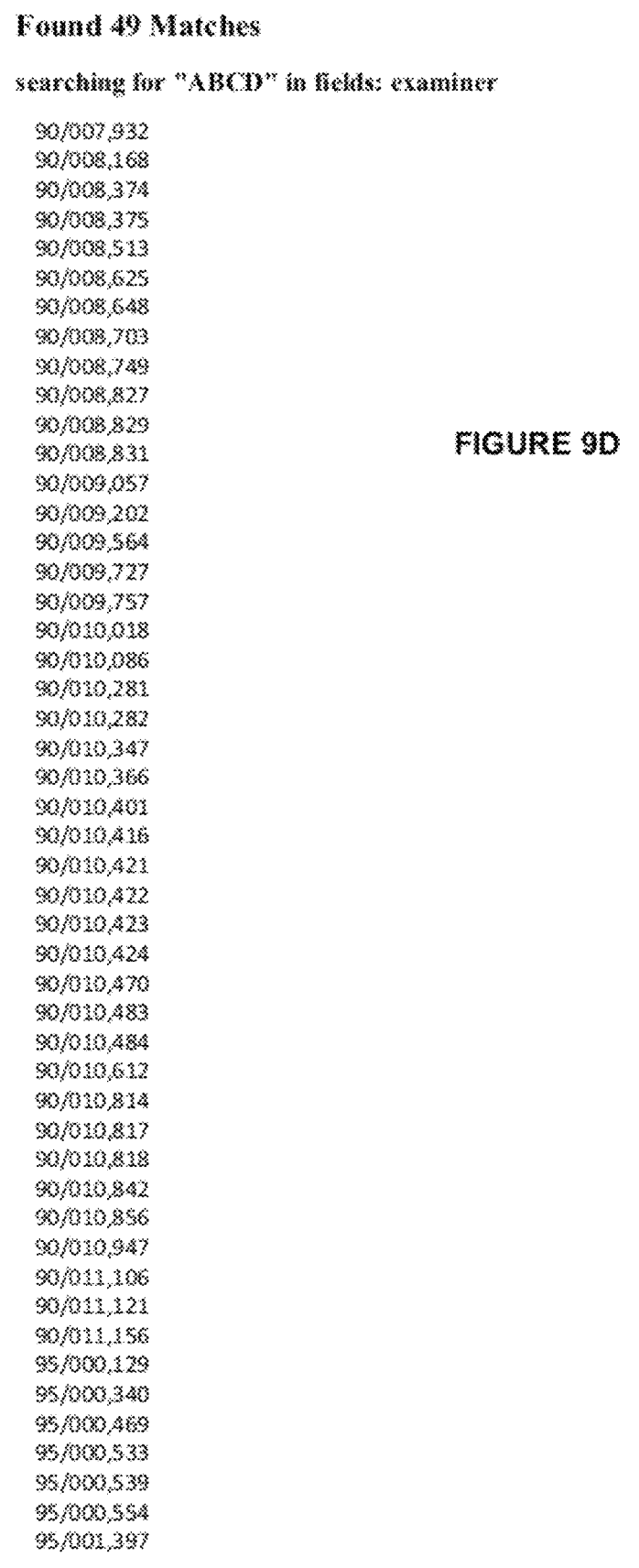

FIG. 9D shows a typical basic profile report for a person such as an Examiner, to identify the cases being handled by such personnel. Again other forms of output and other data could be shown as well. The entries are preferably coded to permit the user to then pull up a screen to see the totality of the record for the case in question, such as shown in FIGS. 7A-7I below.

FIG. 9F again shows that the user can filter and find particular cases and/or petitions of interest based on art units, document coding, etc. For example the user can ask to find any cases (and documents) in which an entity filed an opposition petition to a patent owner's petition. Or, if desired, they can designate a specific sequence of events and their type, to find related histories so that they may be surveyed and reviewed. These reports are expected to be useful to help practitioners and other interested parties understand and assess better the inner workings of the entity in question (here the PTO).

FIG. 9G shows a specific example of a report identifying petitions for extensions of time, and instances where such requests were granted or denied. Again this information can be used to glean insights and understandings of the relevant guidelines, thresholds and rationale used by the entity to evaluate petitions on the merits.

From the above it will be understood that these are again but examples of the types of reports that can be easily extracted using conventional tools from the data collected in databases shown in FIG. 5 above.

FIG. 10 illustrates a crowdsource type prediction process 1000 implemented in accordance with an exemplary embodiment of the present invention. In this instance the term "crowdsource" is understood in the conventional sense used today, wherein contributions by a large number of persons are aggregated and leveraged to derive a better answer or estimate for a problem. This aspect of the invention allows users to participate and/or review the contributions by other users to the process of determining the likelihood of an outcome of an event, timing of the event, and so on. In some instances it may be desirable to authenticate the credentials of some contributors (using any convenient mechanism) to establish their status as an expert in the subject matter. For example, patent attorneys/agents/litigators (or other experience persons) may be qualified as "experts" by the system, and have their insights, votes, etc., tallied separately, or even given more weight.

Accordingly at step 1005 the voter is classified according to their status, which may be one of multiple levels or labels. For example, a user may be designated as novice, average, expert, etc. In some instances the user's membership status may be factored into their voting capability/status.

At step 1010 the case or event is selected by the user, along with a relevant time period. Again the selection can be facilitated using any conventional tools, including the query interface discussed above. The user for example can vote on specific cases, or even specific events. As an example the user may contribute a vote on when an Examiner may render an Office Action, and/or if the Office Action is expected to be favorable or unfavorable on a specific claim. Other examples will be apparent.

The user is then presented with an entry prediction screen, which, as noted above, may take any convenient form, including similar that offered by the Piqqem site. The main difference, of course, is that instead of predicting the performance of securities, the present invention allows users to provide predictions associated with the entity's behavior. In other embodiments the users may be permitted to vote on related patent matters, such as the result of a litigation, trial, etc., or the amount of damages expected to be awarded, the likelihood of an injunction and so on. Again any factor associated with patents may be presented for prediction within an interface/voting screen.

In some embodiments it will be desirable to tally and recognize contributors based on their prediction performance. As with other sites which perform this function, the recognition can be calculated and presented to other members of the site in any convenient fashion.

FIGS. 7A-7I illustrate components of a graphical interface system implemented in accordance with an exemplary embodiment of the present invention. It will be understood by those skilled in the art that the depictions, format, functions shown in these figures are expected to be varied significantly in any commercial embodiment. Moreover many aspects of the interface have been stripped down or simplified to facilitate an understanding of the more salient features.

Unless otherwise stated, it is intended that the boxes and content shown in FIGS. 7A-7I would be coded with hyperlinks and similar capability to allow for ease of access and browsing. In some instances the interface is expected to have dynamic behavior which might not be visually depicted in the figures, but will be understood to be part of the user experience.

Figure 7E:
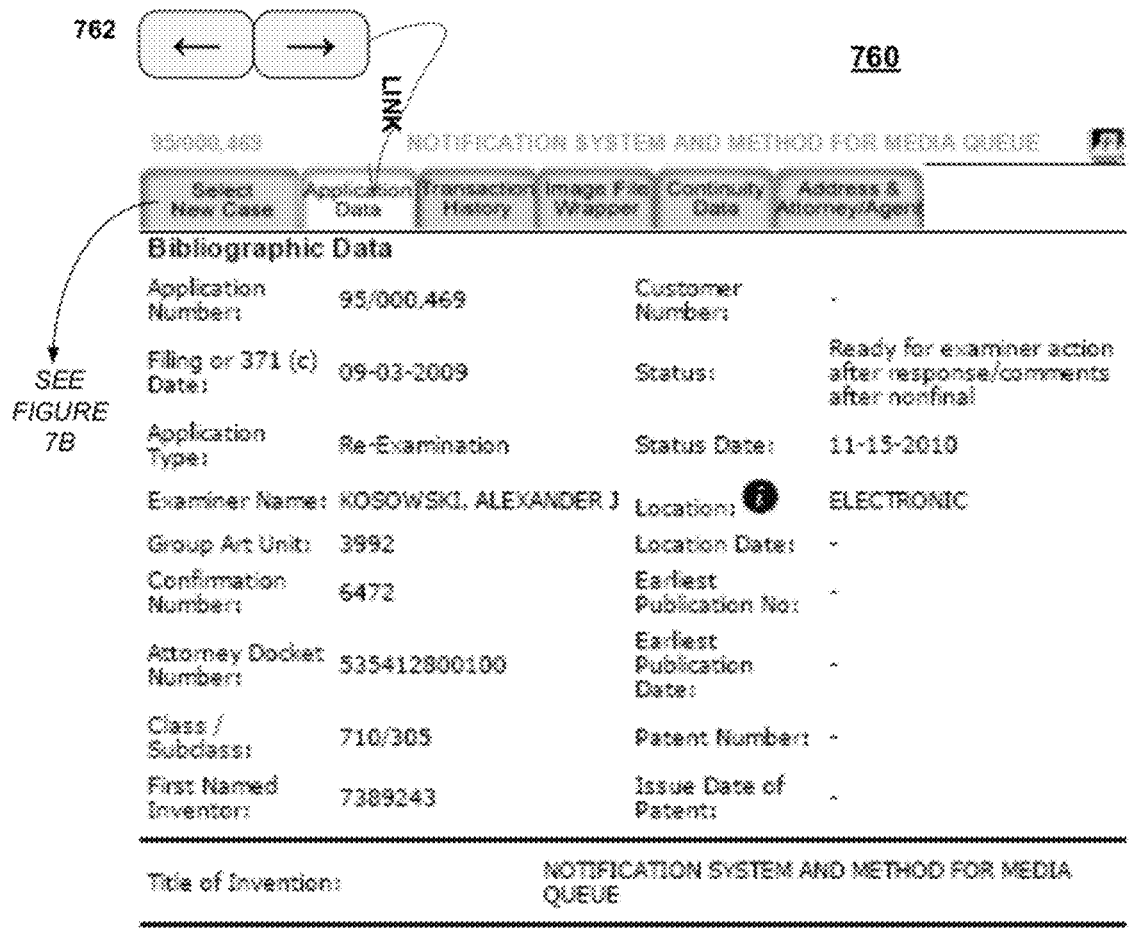

Beginning in FIG. 7A, a user is presented with a main home page 700 that is displayable within a conventional client web browser. Home page 700 includes a number of functions and content which can be accessed by the user by selecting on any of the icons shown therein using conventional web page coding. These functions are tied to the description above and for the most part are self-explanatory. In brief they include:

PTO records—by selecting this link the user can access/review and browse records from the PTO in the same manner as they would from accessing the PAIR site (see FIG. 7E). In effect this aspect of the invention allows a user to emulate an experience provided by the target entity's web based interface, albeit with a more flexible experience since the user can traverse the entity's database using conventional web based commands. In the case of the PTO records, for example, this means that the user can traverse records in any convenient logical form (i.e., by case number, Examiner, etc.)

Reexams—selecting this link allows the user to review/search reexamination records using a variety of advanced search tools and multiple dimensions as discussed above. A detailed version of this interface is presented to the user as seen in FIGS. 7B-7E. Note that—with minor content/context changes—the Reissues, Pending Apps, Litigations and Board of Appeals decisions can be implemented using a similar interface to that shown in FIG. 7B so they are not shown separately.

Figure 7F:
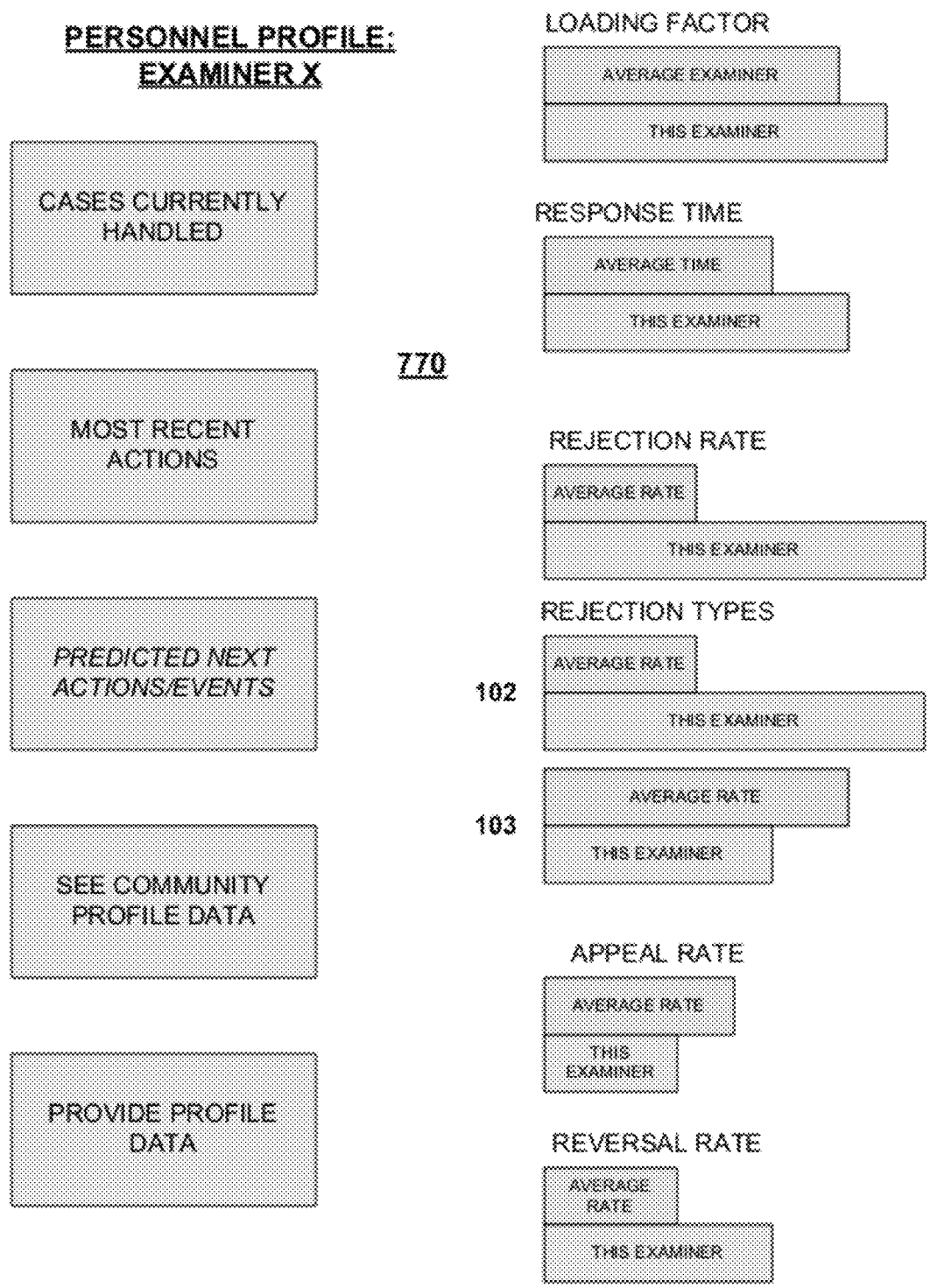

Examiners—selecting this link takes the user to a screen shown generally in FIG. 7F. Here the user can access and modify profile data for the Examiner in question.

Attorneys/Agents—selecting this link takes the user to a screen shown generally in FIG. 7H. Here the user can access and modify profile data for the attorneys/agents in question.

Companies—selecting this link takes the user to a screen shown generally in FIG. 7I. Here the user can access and modify profile data for the companies in question.

Documents—selecting this link takes the user to a screen shown generally in FIG. 7B. Here the user can perform advanced searching functions as discussed in detail above.

Predictions/Crowdsourcing—selecting this link takes the user to a screen shown generally in FIG. 7G. Here the user can access information on predictions provided by the community, and contribute as well on the same subjects.

Alerts: selecting this link takes the user to a screen to configure alerts so that they can be kept abreast of updates/specific events as noted above.

In addition, other dynamic content, culled from the databases described above (FIG. 5) is presented to the user within the main screen 700. The entries here can shown in a dynamic window (programmed through AJAX or similar coding language) so that the user can see/scroll through them quickly. While certain preferred items of data are illustrated below, it will be understood that these are merely examples. The details of any particular embodiment in a particular domain may use all or some of these, and it will be understood that additional information can be selectively presented as well. This includes:

A rolling update of the most recently filed cases, along with their identifying information {id, patent #, title, assignee, date, etc.} and preferably with such data hyperlinked so that it can loaded as desired by the user.

A rolling update of the most recent events taking place in the entity/organization. This may be presented in the form: {Case id, date, event} etc.

Updates on activity in selected cases chosen/selected by the user. This can be presented in the form: {Case id, user label, patent #, date, event . . . }

Alerts for the user based on their selections/filters. This information can be shown as {alert type, case id, user label, patent #, date} etc.

News/press releases/litigations: this can be based on a search of news stories and the like to return relevant items germane to the entities involved in the cases/events.

Predictions: this presents information to users of predictions provided by crowdsourcing items of interest, such as a prediction for a winner for a patent case.

As seen in more detail in FIG. 7B, the interface 720 can be considered as a main search input screen that is a gateway to many of the functions noted above in FIG. 7A. Again the interface is preferably presented within a user's browser as part of an online accessible analysis system. Here a user can request to review reexamination cases (or whatever records are being kept for the target entity) in accordance with any number of predefined criteria. For example, they can ask for cases matching a particular patent number, Examiner, etc., as discussed above. It will be understood that the user can specify that multiple filters be satisfied for the records in question, so that only cases for a particular Examiner/Assignee combination are retrieved, and so on. In addition in some embodiments the interface may have additional logic installed to permit the user to type in a query and have it auto-completed (using any conventional mechanism) based on the actual records. In addition, as seen at the bottom of interface 720 the user can specify to consider only records which have documents matching a general text field entry, or transaction records with specific codes, etc.

Interface 730 shows an example of a more elaborate search implemented by embodiments of the invention. For example the user can specify a particular type of document (by code), a certain first phrase, and a logical predicate (search operator such as within x words) followed by another phrase, and other date restrictions. Other types of filters can clearly be implemented as desired.

FIG. 7C shows an example of an event/case browser 740 that can be implemented in accordance with the present teachings. This is preferably what is seen by the user after invoking the search screen of FIG. 7B, and illustrates an example of a case-level review tool. The user's search filter/query is preferably shown in a box above the results.

In a preferred approach the user can move throughout the result set using any convenient field, by selecting one or more of the column labels. For example, the user can scan and review cases using a control number, a filing date, patent number, inventor, assignee, status, etc. Other types of high level data could be presented of course. Sorting of the results can be achieved by selecting a control field (not shown) associated with the columns as well.

It can be seen that the tool 740 permits the user to review an entire dataset if desired as well in an extreme case where no filter is imposed. The user can thus immediately and at a glance move back and forth through a raw dataset of reexamination events in a manner that is not possible using any conventional tool, including PAIR. This flexibility allows for the user to emulate the capability of an internal tool otherwise being the only mechanism available/required for the purpose of reviewing and analyzing the organization's data in this fashion. The productivity and time savings associated with this tool are also substantial, as it permits an outside user to perform analyses that would otherwise take several hundred manhours of manual online access to perform using conventional tools. More importantly embodiments of the invention take the guesswork and speculation out of the picture by ensuring, through the automated updates noted above, that the events published in database 126 from the organization's internal data are accurately located and extracted.

FIG. 7D shows an interface 750 that depicts a format for a single case record. In this screen the user can see effectively all significant information for a case, including typical bibliographical data (shown in the top part of the window) and more detailed transaction and image file wrapper data blended on the bottom of the window. The transaction and image file wrapper data can be loosely designated as events in this instance which are also presented in a convenient location within a single window (without having to traverse other tabs). It is understood that some entries may in fact represent multiple documents (for example a set of exhibits for an information disclosure statement, or a declaration) and these may also be retrieved or accessed easily and conveniently within the interface.

As seen in the right hand side of the interface, the user can be given different types of selection buttons as well, so that he/she can navigate seamlessly across different case numbers, different patent numbers, etc., all within interface 750. This interface, therefore, integrates multiple elements of the prior art into a single location to further increase utility, productivity, etc., as the user does not lose access to fundamental data concerning the case whilst examining certain materials more closely. In some instances therefore it may be desirable to open any desired documents from an image file wrapper directly within the interface again for the user's convenience. While this illustrates one embodiment of a case-record review tool, it will be understood that there can be countless variations on this approach consistent with the present teachings.

Embodiments of the present invention can also be configured to imitate a functional interface presented by the prior art PAIR system discussed above, to allow a greater number of users access to this important public data. From direct observation it can be seen that the PAIR system throttles access to some extent using CAPTCHAs, timeouts, etc. Since the site has limited resources available to meet worldwide demand for this important data, it is apparent that it would benefit the public and the governmental agency to develop a more robust secondary access channel.

Figure 11B:
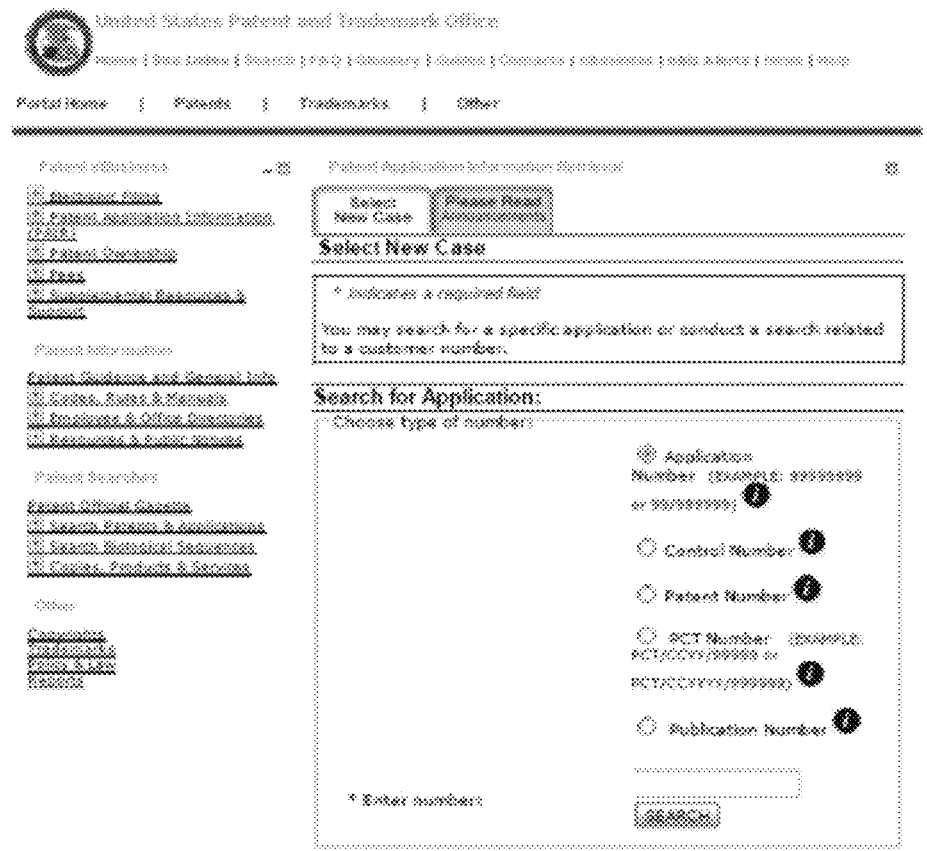
Figure 11C:
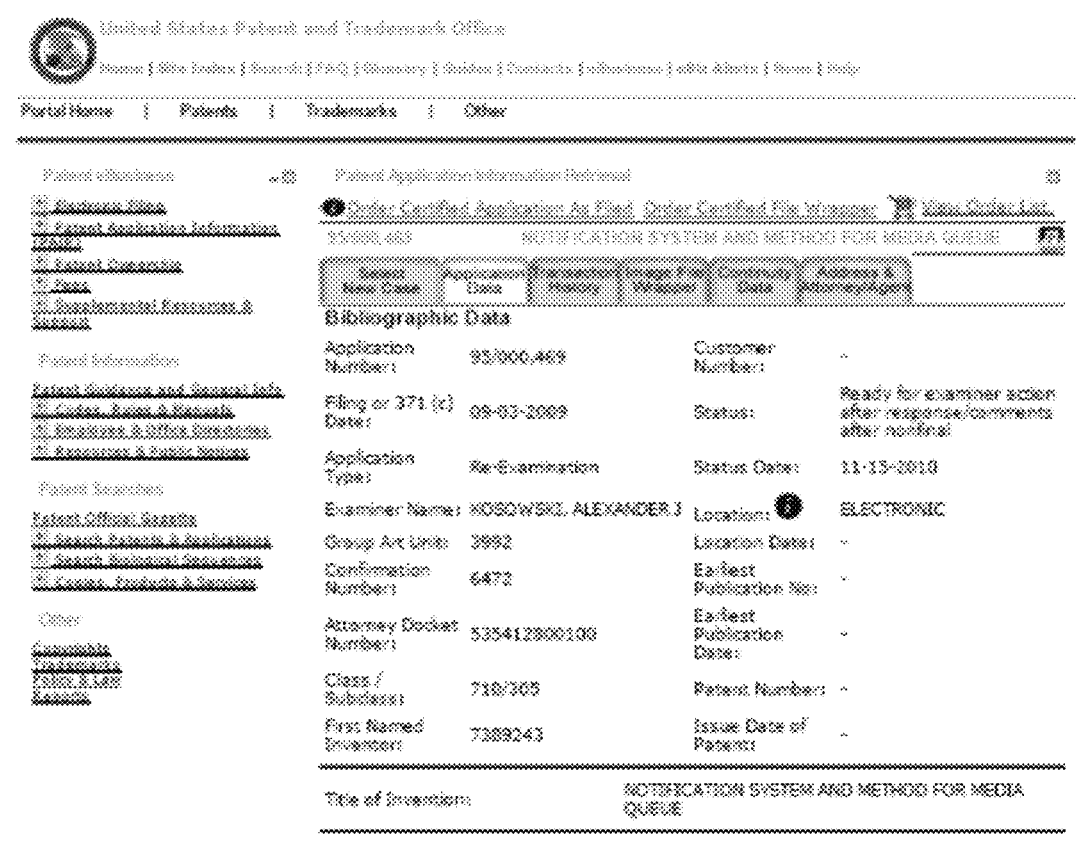

Thus in FIG. 7E the user can be presented with an interface 760 that effectively emulates the organization and format of the data as presented in the PAIR system (or any other system that the invention is intended to model/analyze) online access tool. The present invention therefore can supply the underlying data in exactly the same pathway, selection logic and format of the prior art. To make the system somewhat more user friendly, however, the interface can be enhanced, as shown, so that the tab designated "Select New Case" can instead invoke the interface shown in FIG. 7B (rather than more restricted selection logic shown in FIG. 11B). This would make the task of finding relevant cases much more efficient. In addition, the emulation interface 760 can be programmed so as to not require a periodic CAPTCHA (or re-CAPTCHA) for the user's convenience.

Finally, another useful enhancement which can be added to augment the emulated experience is the addition of an additional browsing button 762, which can cause successive cases to be presented within the interface using a single click. The active logical tab can be highlighted and linked as shown so that for example, selecting the arrow keys moves backwards/forwards by one case when the "Application Data" tab is highlighted. In other cases it may be desirable to skip forwards or backward using Attorney/Agent as the logical grouping, and so on. In still other instances it may be desirable to provide additional document linking or selection logic within the emulated interface. Other examples will be apparent to those skilled in the art.

FIG. 7G depicts an embodiment of a community prediction/voting interface 780 that can be used to effectuate some of the functions discussed above. As seen there, a user is identified by name and by status, which, as noted earlier, may vary in accordance with any number of parameters. The object of the vote or prediction is highlighted on the top right, along with links to other pertinent information to educate and assist the user in determining their vote/prediction contribution.

The graphical editor allows the user to manipulate a data entry point in two dimensions, so that in this instance, the user can specify both a time prediction value (along a horizontal axis) and an outcome prediction value (along a vertical axis). The graph can be annotated with convenient labels to assist the user in inputting his/her vote. In some instances the graph/chart can be controlled to give visual feedback while the user is inputting data, to permit him/her to see more distinctly the values they are contributing for the parameter in question. The user can be shown his/her prediction along with a crowd prediction, an expert prediction, etc., using any convenient and conventional visual output tool appropriate for the data in question. While the example is shown for a two parameter vote, it will be understood that additional dimensions of data beyond two could be captured, and for other prediction value types.

A representative example of a Personnel Profiling interface 770 is shown in FIG. 7F. The labels here again are self-explanatory based on the descriptions above. As seen generally here on the left hand side of the interface, the user can elect to see case data for the Examiner, recent actions, community profile data, etc. The user can also see what actions/events are expected next from this individual. In some cases the user can also contribute profile data.

On the right side the user can be presented with a variety of useful data metrics about the individual, along with a comparison of their data to their peers. Other types of data could be studied of course as well. Again it will be understood that the implementation can be done in any number of variations depending on the underlying data and events being studied.

In a similar fashion a representative example of an attorney/firm Profiling interface 790 is shown in FIG. 7H. The labels here again are self-explanatory based on the descriptions above. As seen generally here on the left hand side of the interface, the user can elect to see case data for the Attorney/Firm, recent actions, community profile data, etc. In some cases the user can also contribute profile data.

On the right side the user can be presented with a variety of useful data metrics about the attorney/firm, along with a comparison of their data to their peers. Other types of data could be studied of course as well. Again it will be understood that the implementation can be done in any number of variations depending on the underlying data and events being studied.

FIG. 7I illustrates a representative example of a Requester/Patent Owner Profiling interface 795. The labels here again are self-explanatory based on the descriptions above. As seen generally here on the left hand side of the interface, the user can elect to see case data for the entity, recent actions, community profile data, etc. In some cases the user can also contribute profile data. Additional data in the form of press releases, attorneys/representatives used, etc. can also be accessed and reported.

On the right side the user can be presented with a variety of useful data metrics about the attorney/firm, along with a comparison of their data to their peers. Other types of data could be studied of course as well. Again it will be understood that the implementation can be done in any number of variations depending on the underlying data and events being studied.

Figure 12:
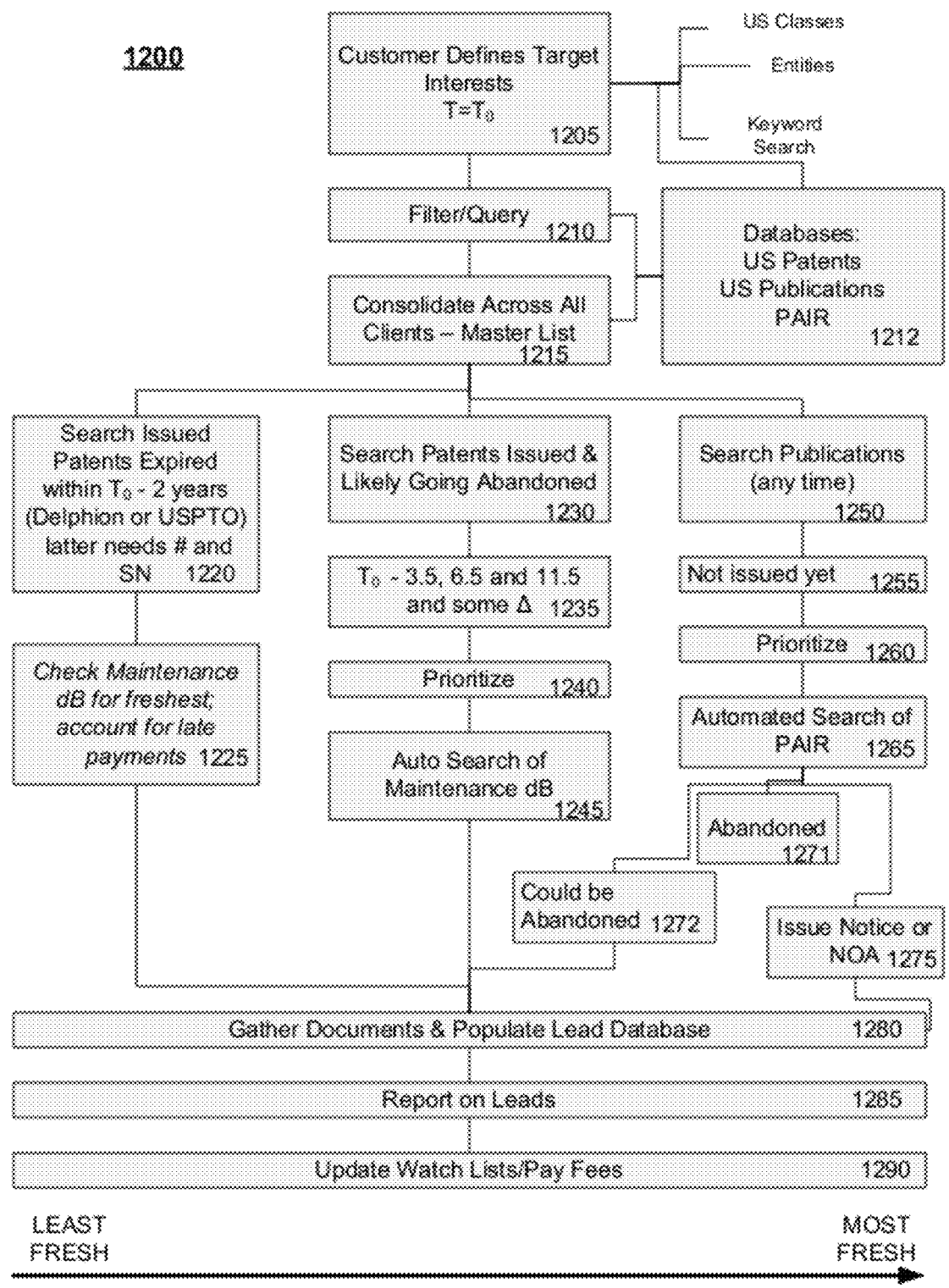
FIG. 12 illustrates a patent asset discovery process implemented in accordance with an exemplary embodiment of the present invention.

FIG. 12 depicts a patent asset discovery process implemented in accordance with certain embodiments of the invention. As is well-known, US Patents are subject to periodic maintenance payments which are required to keep them in force. Presently these payments become due at the beginning of the 3rd, 7th and 11th years post-issuance. If the owner of the patent does not pay the maintenance fee within a particular window (which presently is 1 year) after the initial maintenance due date the patent becomes abandoned/lapsed and no longer enforceable against third parties in an infringement action. These payments, and activities surrounding them, can be considered as just another type of "event" (as described above) to be identified and analyzed by embodiments of the invention.

In some cases patent assets are intentionally abandoned by their owners because they are perceived (subjective or objectively) to have little or no remaining value, or perhaps value that is not commensurate with the cost of obtaining such value. In some instances, however, a patent owner may not be aware of the maintenance fee requirement, or may not receive the fee notification, and the patent lapses due to inattention. This can cause valuable assets to be lost due to simple carelessness or lack of appreciation by the patent owner of the true value of the patent assets.

To remedy such mishaps there is a procedure by which patent owners presently can "revive" patents which have become abandoned due to lack of maintenance fee payments. To avail themselves of this option, however the patent owner must meet certain requirements (such as establishing that the abandonment was unintentional or unavoidable) and pay an extra petition fee. Furthermore, in some cases the petition must be filed within 2 years of the abandonment.

The USPTO puts out an Official Gazette every week (in electronic and print form) which identifies which a list of patents have become recently expired. Unfortunately the OG is usually a few weeks behind, so by the time it is published it is too late to remedy any missed payments. To assist patent owners, however the OG does also publish a prospective list of patent numbers which will require payment in an upcoming period. By manually checking these two lists patent owners and other interested parties can learn of patents which have expired and/or which may go expired. This information is useful as a means of discovering potential assets that may have gone unappreciated but which may still have useful value.

Clearly the above infrastructure is not optimal for preserving the value of patent assets, or helping third parties discover valuable patent assets. The method shown in FIG. 12 ameliorates these deficiencies by a discovery service provider who automates the discovery process, optimizes the timing of the investigation, and can consider records and information that have hitherto not been examined using similar tools to those discussed above for researching the PAIR database. In the present example the main databases 1212 to be examined include: 1) a database of issued US Patents; 2) a database of published US patent applications; and 3) a PAIR database containing status information on patents and patent applications such as described above. It will be understood that these are but examples, of course, and other databases could be mined, as well, including those for trademarks, foreign patent assets, or other types of tangible/intangible properties which are subject to periodic maintenance fees (or other proactive action by an applicant) to maintain their extancy.

At step 1205 a customer or interested party can define their interest in potential target patent assets (and events surrounding the same) with reference to any number of criteria to a discovery service provider. In a preferred embodiment the user can specify that they wish to examine patents which fall within a certain class (e.g., class 705), or which belong to a certain entity, or which related to certain subject matter, contain certain keywords. It should be apparent that any number of matching criteria can be used for this purpose.

At step 1210 additional filters and query logic can be imposed as needed to properly formulate the query to a database of potential patent assets. For example, time restrictions may be imposed to prevent discovery of assets for which there is no potential revival or use. Alternatively the user may specify that there are only interested in assets which have a certain priority date, or which issued within a certain time period, etc. Other examples will be apparent to those skilled in the art.

In the event multiple users are to be serviced by examining the databases, the user/client requests can be consolidated at step 1215 in a master list to avoid duplication of effort. That is, it is possible that there will overlap in the search coverage, and more than one user may want to examine a particular database in more detail. By consolidating requests the system can reduce the amount of overhead and processing/bandwidth requirements.

The search can than proceed across multiple databases to discovery patent items of interest that are on a master list generated at step 1215. As seen on the bottom of FIG. 12, the degree of freshness of items can be varied in the search depending on the desired comprehensiveness. For example, a user may elect to only examine older items which have already expired (using the path shown on the far left); or they may elect to also consider items which have not yet expired, but are likely to go abandoned, as seen in the middle path; or they may choose to look at pending applications which have not even issued yet to find items which are abandoned or indicated to be allowable/issued in the near future; or they may choose to elect all or a subset of these and some other variant (not shown). It can be seen that the invention allows the full gamut and spectrum of possible patent assets to be reviewed to discover potentially useful assets that have gone abandoned (or are likely to do so), or which match some other criterion or parameter desired by the user, such as a particular status state during an application process.

As seen on the far left therefore, a first option is performed there through step 1220. The system takes the master list as an input and search all patents on it which expired within N (preferably 2) years of the target date (T0) for failure to pay maintenance fees. It will be apparent that N and the target date can be set to any convenient value, but, in most cases, T0 will be a present date or a future date. For example on January 1 a user may want to know all the patents which expired 2 years before February 1. This is because, as a practical matter, it is difficult to coordinate and prepare a petition on short notice to have a case revived (if necessary). Some users may also set N to be very small so that the search is only looking for recent cases. The search for expiration of patents for failure to pay maintenance fees can be done using any conventional database, including the USPTO PAIR system and from offerings by third parties such as DELPHION. Both of these systems (and others) have logical fields for identifying a maintenance status of patents.

In some instances it may be the case, however, that the indication for the patent is in error because the patent owner has remedied the deficiency. The data in the OG or other databases may be "stale" in some cases therefore. To ensure that the user receives most up to date information on such expired cases and events for the same, the present invention can also automatically check a USPTO maintenance database at step 1225 to identify a status for one or more cases. To do this an automated script (akin to the one described above for the USPTO PAIR review) can be employed to work from the master list, one at a time, ascertain their maintenance status events and record the same in an expired patent report list.

At step 1280 any number of desired relevant documents and data items can be collected based on the report list. For example, in the case of a report on expired patents the user can be given a report that includes the patent details, along with information on the current patent owner (which may be gleaned automatically from assignment records as noted below) as well as a copy of the patent in question, maintenance fee payment records, new maintenance fees due, petition fees required to bring the case into compliance, etc. Other documents can be collected of course as needed.

A lead report is generated at step 1285, which is packaged to include the additional supporting material/data items and communicated to the user for their consumption. At this point the user preferably has a full complement of materials to help them assess the value of the lead patent asset, along with sufficient lead information to contact the patent owner and, if desired, procure the same.

At step 1290 a service provider may update an overall "watch" list for the user (or the user base) so that a record is kept for each event and item presented to a user. In some cases users can be given notifications/alerts of individual events detected at this point, in the manner described above. This permits users to profile and identify acquisition leads far in advance of competitors. For example, a user could be informed through SMS, email, etc., of a recently discovered asset that has just gone abandoned (or changed status) since a last iteration through the applicable database(s).

In some instances a service provider may be given instructions by a user to automatically pay a maintenance fee for the patent if it otherwise meets certain criteria specified by the user concerning timing, cost, etc. For example the user may specify that the provider should pay the fee to reinstate (or even maintain) a patent if the cost is below some threshold, and so long as the time from expiration does not exceed some time period. This type of preemptive action may be useful in some cases given the cost/benefit analysis associated with reviving cases (compared to the cost of simply maintaining) and as potential leverage in discussions with the patent owner.

Returning to step 1230 in the middle of FIG. 12, the user may also elect a second option to have additional items/events to be examined for lead generation, including patents that have not yet been abandoned, but are likely to do so in within a certain time period. The advantage of this approach (which may be performed in addition to or in lieu of the prior option) is that the user/client then has a larger window of time to review the asset, negotiate with the patent owner, etc. Moreover since the patent asset has not actually expired there is less potential hazard and impairment from having to meet a legal threshold for reviving a case. At step 1235 the system thus finds those patents from the master list which are due to expire within an upcoming window of time defined by the target time T0 minus a maintenance window and some adjustment time delta, which, again can be controlled by the user. For example the user may want to locate cases which have already gone past a penalty period (3.5 years, 7.5 years 11.5 years) but are still more than a certain number (delta) days from expiration in order to give them sufficient margin to conduct their due diligence.

In addition it should be apparent that the system can also learn from prior historical behavior of specific patent owners (or based on subject matter, anticipated costs, etc.) to identify entities that are more or less likely to permit an asset to go abandoned. Accordingly at step 1240 the system can prioritize a search to identify assets in an ordered priority of expected likelihood of abandonment. This ordered priority list then is used at step 1245 to perform an automated search of the patent maintenance database. If a record is indicated as having been paid, the system ignores the item. Other ways of prioritizing the discovery process will be apparent from the present teachings.

Otherwise, as previously explained for step 1280, a report and documentation package is prepared for the user for extant patent assets meeting the desired profile. These leads can be reported out at step 1285 as before. In some cases at step 1290 the user/client may ask that the service provider put the asset on a special watch list. Items on this watch list are monitored by the service provider within the maintenance database proactively, and up to the last minute, to determine if the patent owner has paid the fee. The client may authorize the service provider to pay the maintenance fee under user-defined parameters, as noted above, to prevent degradation of the asset. Note that in some cases where the user "rescues" the asset before it goes abandoned, they may nonetheless not be able to reach agreement with the patent owner, in which case they have lost the benefit of the payment without any return consideration. In many instances, however, due to the value of finding leads earlier, and the value of such leads, this type of loss may be more than acceptable in an overall acquisition program.

For some types of patent assets the client may also instruct the service provider to send an urgent communication to the patent owner to alert them to the impending expiration. This has the benefit of getting the patent owner's attention and, in the event a deal is not consummated but the patent asset nonetheless goes expired, the patent owner will have greater difficulty availing themselves of the benefit of the rule concerning "unintentional" abandonment since they were imbued with notice prior to the expiry of the patent. The user/client therefore is somewhat protected against the patent owner concluding the opportunity with a third party since after expiration the asset would be impaired. The user can thus avoid having the opportunity spoiled by a third party, or in some instances where infringement exposure exists, the user (or an affiliated entity) can even avoid the risk of potential infringement since the patent asset may no longer be revivable within the requirements of the patent regulations/statutes. This technique therefore could be used by competitors to mitigate risk from patents that might otherwise be problematic if they were not to expire. That is, if the patent goes expired after being notified of the potential for expiration, or a petition to revive is not filed before such notification, it is possible the patent cannot be revived under the present standards. By automating this type of technique certain entities can reduce their overall exposure to competitive portfolios by optimizing the chances that these assets are not revived.

Returning again to the middle of FIG. 12, the third path which the user/client can request for lead generation is that service provider examine prosecution events for published applications at step 1250 for a certain desired status or event. Preferably the system also filters out cases which have already issued at step 1255, although it should be understood that embodiments could be combined with conventional patent issuance alert services to supplement their capabilities. For example, some companies allow users to be alerted in response to certain events such as when patents issue in certain subject areas, classifications, etc. The present invention extends the knowledge reach to a much more advantageous stage or state where the application has not yet issued.

This information can be used by a variety of different entities for a variety of different purposes. For example, a first company may desire to monitor the expected issuances or allowances of another company. By seeing which cases are allowed, issued (or predicted to become such) the invention permits a competitor to assess whether it has prior art or other materials that are germane to the application. If it determines that these materials are relevant it can make the decision to submit/introduce these materials during the initial examination—as opposed to a post issuance challenge where the rules and timing may not be favorable. This improves the overall quality of examination as well since applications can be expected to be better vetted before they are issued.

In other instances the information for events can be mined for other purposes. For example the filing of a change in attorneys might be indicative of a quality change at a law firm, or a change in ownership of the patent application. The ownership change in turn may be reflective of an ongoing or prospective asset purchase that is not well-known. An entity status change from small entity to large entity may also reflect either a merger with (or purchase by) a larger company, an increase in personnel, or a successful licensing of the patent application to a larger company.

Similarly it is well-known that many publicly traded companies' stock is affected by public announcements of issued patents. In other instances the rejection of a patent application on a key aspect of the company's product line may similarly affect its economic prospects. The present invention can be used to automatically mine these situations and find prospective issuances/rejections before they are widely known, giving the trader an advantage against the rest of the market. Accordingly a stock trading decision can be based on an automatic identification and evaluation of events surrounding an application this way. For example a rejection or notice of allowance of a key application can constitute a material event that needs to be reported by a company. By identifying these events automatically and rapidly, the invention can be used as an input signal to trade particular equities. Other events and data can be mined of course for similar reasons, and the invention is not limited in this respect.

Again at step 1260 the system can perform an optimization or prioritization operation to identify leads which are most germane to the user's request. For example, the system could use a priority date/filing date to conduct the in depth search. Other factors can be considered as well, for example, the system may be programmed to use a list of companies whose stock performance varies most dramatically in response to patent developments (pro or con). By assessing the most volatile companies first, the invention can thus find trading opportunities earlier as well.

At step 1265 the system then proceeds to work from the prioritized version of the master list to identify the current status and related events of the selected cases in the USPTO through the Public PAIR database, or any other convenient database containing such data. This automated tool works as noted above for the other software routines which can examine PAIR records to identify the current status of cases and events surrounding the same. The system can then consider any one of a number of desired status codes or events to select them for final inclusion on a lead list. For example, the application may have a status that the application has gone abandoned (for failure to respond to an Office Action for example) or that the application is expected to issue in the near future (from an issue notification or a notice of allowance), or that a change in status has been indicated (from small entity to large entity), or a change in attorneys, etc. While the assets in this case are merely pending applications, they may still have significant value to a third party. This aspect of the invention allows a third party to dig deeper into the USPTO and identify lucrative leads before they become issued patents through monitoring of these events.

The desired status/event codes are thus identified at steps 1271 (abandoned) step 1272 (could be abandoned), has an issue notice or notice of allowance, change in attorneys, change in entity status, office action rejection, etc. (step 1275) and so on. The user has the option therefore of pinpointing and selecting cases which meet a desired profile, and permit the user the opportunity to identify events about the patent owner, and exploit a potential deal for the asset long before it shows up in the conventional US patent database for publication. For example, an issue notification event is typically generated several weeks before an actual issuance date. By availing themselves of the present invention, interested third parties can identify and develop leads much further ahead than their competitors. Notice of Allowances or issue fee payments events are issued even further ahead of time, and can be similarly mined and exploited as desired to identify leads.

As suggested above an IP manager at a company can thus study and evaluate competitor patent developments before they become issued, and, as noted, take preemptive action in some cases to ensure further review of an application in light of new prior art that may not have been considered. This is a potentially superior option than having to wait for a patent to issue and then being forced to deal with it in an adversarial capacity while it enjoys a presumption of validity.

In other instances the system may detect that a particular application *should* have an abandoned status, even if one has not been specifically identified by the USPTO. This can be determined from an examination of the prior entries in the file history in PAIR. By analyzing the file history therefore and comparing it to other cases an automated system can predict a future event, such as the fact that an application is likely to go abandoned. This information, too, is useful since the invention does not have to rely on an explicit status indicator to classify the asset. Rather, the invention can assign a tentative status level based on an assessment of the overall file materials. This information may be useful to third parties, the patent owner, etc.

For pending application lead identifications the same steps as before can be performed to collect relevant materials at step 1280 and populate a lead database. In this instance however the system may go a step further and collect more detailed information from the prosecution database in order to give the user/reviewer a richer picture of what events are transpiring in the USPTO with the application. As an example, the user could be given any Office Actions, amendments, petitions, decisions, prior art, status changes, etc. for the case to help them make an overall assessment much easier in one convenient package.

The report is then generated (with supporting documentation) at step 1285 as before. A watch list can be updated at step 1290 in the same manner. Here the watch list may include items that the system suspects (or predicts) beyond a threshold are likely to change status in an upcoming period, and therefore should be checked more regularly to see if such status does in fact change. Accordingly, in the prioritizing search of PAIR (step 1260) this expected change probability data for each item can be used as a factor to initiate accesses to the external database. Other uses will be apparent as well. Again, in selected cases, and to the extent permissible by law, a user may elect to rectify or cure any defects to remove an abandonment designation within the file. While not shown, it is possible that in some cases the service provider could be given a commission, payment, or some other form of remuneration for discovery of assets that are acquired by one of its clients.

From the above it can be seen that embodiments of the invention can be used to effectively perform lead generation (and entity data mining) at a more comprehensive and deeper level than prior art tools to unearth patent acquisition opportunities. Other embodiments will be apparent to skilled artisans from the present teachings.

Figure 13:
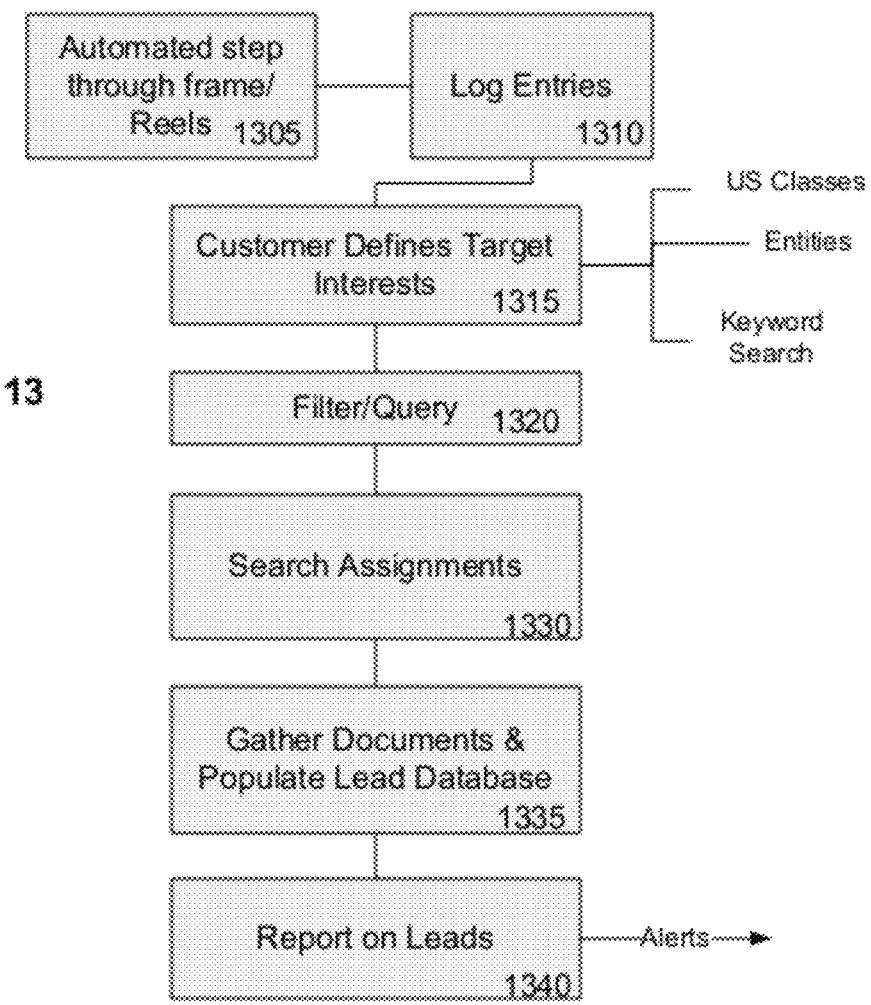
FIG. 13 illustrates a patent assignment discovery process implemented in accordance with an exemplary embodiment of the present invention.

FIG. 13 depicts an assignment discovery method implemented in accordance with one embodiment of the invention. As is well-known, patent assignments filed with the USPTO are recorded on microfilm reels. The assignments are indexed, therefore, based on an reel/frame number combination. Typically each frame corresponds to a single page of a document that is recorded, and each reel is used to store hundreds of frames.

As noted above, the current databases for reviewing assignments are somewhat difficult to access and cryptic as they are again maintained at the USPTO. While they permit a user to search for assignments across a number of parameters, they do not permit users to easily search and browse by time or entity. For example, there is no mechanism by which a user can simply ask to see the most recent assignments (irrespective of entity or patent) from a certain date. This information is useful since entities may be affected by the transfer of rights in patent assets, and yet not receive notice of the same in a timely fashion.

Accordingly, at step 1305 the invention develops a list of existing reel and frame numbers from studying the USPTO database. In one embodiment the system can simply query the database with a range of reel/frame numbers, starting with 0001/0001 for example, and automatically incrementing these figures until it reaches a reel/frame combination that matches a current date (or a most recent date) and/or that is no longer valid (because there is no current record corresponding to an entry yet). For example the system may determine that the most recent reel/frame combination is MMMM/NNNN; in the next update process the system would pick up from there and look for a next valid frame/reel combination. Thus the invention can figure out where the personnel within the organization have left off and are expected to proceed anew in a next document recording cycle.

At step 1310 the entries are logged and maintained in a separate database that includes all the relevant fields from the assignment database and preferably additional items as well (such as US classifications, patent text, etc.). As with the reexamination records noted above, the assignment recordings are thus now accessible through the service provider and do not require a user to have to navigate through the USPTO system. With this data the system can provide an interface (see FIG. 7E) which effectively mimics the USTPO assignment interface, but which nonetheless is adapted and modified to let users easily browse back and forth in time within a single reel to identify consecutively recorded documents by sequence, time, etc.

For users who want to do more comprehensive searches and receive alerts of assignment activity, the system permits a customer to define their target interests/criteria at step 1315. The user therefore can specify the name of an entity, a US class for the patent, a patent number, keywords in the patent, etc. Other examples and fields can be used of course as well depending on the desired functionality.

At step 1320 the system then uses the user defined filter to construct the desired query. This is then executed against the assignment database at step 1330, and documents can then be gathered at step 1335 in the same manner as noted above for FIG. 12. A user lead database can then be updated as well, which typically consists of records sorted by user and assignments located/reviewed for example for later perusal, updating, etc.; other formats can be used of course.

A report is then generated for the user at step 1340, and alerts can be provided to those persons who wish to be kept abreast of new developments in this database based on their customized criteria as noted above for FIG. 8. For example may want to simply see a list of all assignments for the most recent day, or only see materials from a particular entity, or group of entities, or for specific subject matter, etc. Any number of criteria can be use of course. As suggested earlier, an investment entity may use this automated technique to monitor new additions to a company's portfolio. For administrative purposes a tally can be kept of which entities, patents or subject matter are most frequently accessed.

Figure 16A:
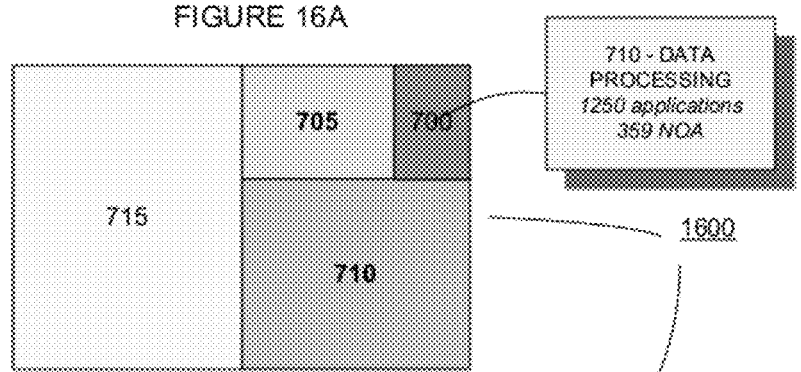
FIGS. 16A and 16B illustrate a preferred embodiment of a visual heat map graph/output of the present invention.
Figure 16B:
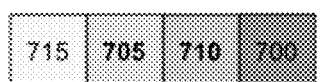

FIGS. 16A and 16B depict alternative embodiments for presenting relevant report data to users of the aforementioned methods. As seen in FIG. 16A, a user can present a query, and receive a report in the form of a visual graph which may include a type of heat map 1600. The heat map can include components with a visual size and shading to denote a result of the query in convenient perceptible form, so as to complement a conventional raw data, bar graph, or similar output.

For example, a typical query can specify whether the user wants to examine applications that are pending, issued, abandoned, etc. with a certain date range, and which match a certain class (705, 710, etc.) or contain one or more user selectable keywords. The user can further specify whether they want to filter based on a particular Examiner, entity (i.e., company or individual), representative (patent attorney, agent, etc. or alternatively ask for all or a subset. Finally the user can specify the target event to be identified for the applications, which event may include a simple indication that that application has been filed, to a more a more mature event, such as the fact that the application has received a Notice of Allowance (NOA). Any of the available tags used by the USPTO within PAIR to designate specific events can be used for this purpose. Alternatively, as mentioned above, a transaction record history, or text/content of submissions can be mined and indexed to respond to the query.

The user can also filter the output by means of a threshold, so that for example only matching classes which have a particular number of applications, target events, etc., or ratio of target events/applications in excess of some figure are presented in the output. In other instances a timing relationship can be requested, to identify average times of prosecution in each of the targeted classes or categories.

The resulting heat map 1600 is then presented to the user in visual form as noted, so that the relative number of applications matching the query is represented by a size of the corresponding image block. For example, the number of applications in class 715 could be perceived to be much larger than the number of applications found in class 700. The sizes of the matching classes could be normalized and scaled to fit within a defined area of a window using any number of conventional techniques. While rectangular blocks are shown, it will be apparent that the heat map 1600 may be embodied in other visual form using a pie chart (with wedges) or some other polygonic shape.

A shading of the respective blocks can be used to denote a magnitude of an absolute or relative number within each class that matches the target event. Thus, a darker shading may indicate more matches to the target event, a lesser shading may indicate fewer matches, and so on. Colors or other indicators may also be employed of course.

The raw statistical information may be optionally presented directly on the heat map, or in some cases might be more conveniently presented by a mouseover type action as shown in FIG. 16A. As seen therein, a cursor position is detected and an overlay or other technique is used to present the additional raw data to the user, such as the fact that there were 1250 applications in Group 710 during the relevant time frame selected, and of those, 359 had been given a notice of allowance (NOA).

FIG. 16B describes an alternative embodiment in which the blocks are not scaled to denote size, but, rather, are arranged in a spectrum to better denote the relative relationship between the matching classes with respect to the target event. As is apparent, this visual query and report may be employed for the purpose of performing a high level strategic review of the USPTO (or some other organization) to identify the proliferation of technologies, productivities or propensities of art units, Examiners, etc., or even to identify an expertise of particular law firms. Portfolio analysis is another key area where the invention could be employed to assess large scale costs, timing, valuations, etc.

For example, a query can be made to identify and sort areas within the PTO by a ratio of allowances to patent applications. This can be used to understand, plan and budget for prosecution related activities, or make predictions and projections on the number of cases that may be allowed in a particular set of patent applications in a portfolio.

In another instance, the behavior of particular classes of subject matter can be tracked to identify trends in filings and allowances. The number of filings can be used for competitive intelligence to identify areas of exploitation by competitors. Areas where allowances are higher can be targeted so as to maximize prosecution efforts in particular areas of technology which have the highest potential for securing protection.

Individual examiners can be profiled of course to see an overall behavior of the organization. The examiners may be sorted into a spectrum as shown in FIG. 16B (by number of applications, number of target events, or some relationship between the two) to illustrate a relative relationship between such personnel.

Representatives can be similarly examined to identify areas of expertise, success, etc. For example, a prospective customer may desire to identify practitioners, firms, etc., who have a large number (or some threshold number) of applications in a particular area, and/or who have achieved a certain degree of success in particular areas. The provided reports allow for an objective measure of the performance of such individuals and firms to guide better selection of assistance.

Competitors (entities) can also be studied, to identify a breakdown in applications by subject matter area, and corresponding success (as measured by target events) in such classes (or technology areas). This information, too, can be used for driving decision making in companies for patent acquisitions, planning, etc., by focussing or avoiding areas where examination resistance, behavior or timing is poor.

The tools of the invention can also consider changes over time, so that differences between different periods can be mapped. For example, a user may inquire and identify which classes, technology areas, etc., have shown a greatest change in application numbers, target event/application ratio, etc. This information, too, can enlighten decision makers to understand which personnel or subgroups within the entity are changing behavior, or to better understand a collective behavior of one or more competitors.

Additional queries and reports can of course be created, and the above will be understood as simply exemplars. Any number of combinations of filters and variables can be specified to provide a desired visual and numerical report of interest. The present invention, by permitting a deeper and more thorough analysis of the US patent system, allows for greater insights, planning and prediction than prior art approaches.

To implement the above functions a server computing system used by the described embodiments is preferably a collection of computing machines and accompanying software modules of any suitable form known in the art for performing the operations described above and others associated with typical website support. The software modules described below (referenced usually in the form of a functional engine) can be implemented using any one of many known programming languages suitable for creating applications that can run on client systems, and large scale computing systems, including servers connected to a network (such as the Internet). Such applications can be embodied in tangible, machine readable form for causing a computing system to execute appropriate operations in accordance with the present teachings. The details of the specific implementation of the present invention will vary depending on the programming language(s) used to embody the above principles, and are not essential to an understanding of the present invention.

From the present teachings it can be seen that embodiments of the present invention effectively implement solutions to the problems identified in the prior art, including RFPs put out by the US government for public access to certain key data in PAIR and PALM databases that is not otherwise available in bulk or network access form. New data sets of both complete and current information can be created, which will have significant value to practitioners and other entities who rely on decisions from these types of administrative agencies. One additional benefit of the invention is the fact that it offloads substantial traffic from US PTO networks, and thus allows a separate channel of access to benefit the public at no cost to the government. By opening up this previously unaccessible information on a wider basis the invention can also further facilitate the identification of potential technical experts, prior art, etc.

What is claimed is:

1. A method of operating an access computing system comprising:

using the access computing system to access a set of records maintained by a target computing system in a first database associated with a first entity over an internet based network, said first database being configured to respond to user queries for said records over said network using a first query protocol presented in a first interface;

wherein said target computing system first query protocol restricts a user to using a first set of N parameters (N>=1) for locating matching records in said first database, said first set of N parameters being data fields associated with the set of records;

further wherein said first interface of said target computing system constrains the user to use said first query protocol when accessing records in said first database, and further constrains the user to view only a single record at a time within a web browser;

automatically generating a prioritized schedule with the access computing system identifying an ordering for accessing said set of records, which prioritized schedule is based in part on both the following computing operations:

a) processing and identifying a likelihood of new data appearing within said set of records based on historical analysis of data change patterns in said records in said database, including computed correlations of occurrence and timing between distinct successive events in such records; and b) processing and identifying a likelihood of user interest in selected ones of said set of records based on historical analysis of user access, including other users of the access computing system, to such set of records;

automatically retrieving said set of records in accordance with said prioritized schedule by automatically generating queries with the access computing system that emulate a user accessing said records using said first query protocol;

configuring a second database with the computing system to store said set of records;

configuring a second interface for accessing said of records in said second database, said second interface including a second query protocol which includes both said first set of N parameters for locating matching records in said second database as well as at least one search parameter in addition to said first set of N parameters;

wherein said access computing system allows access to the set of records maintained at the target computing system using a different interface and a different protocol which emulates and enhances access options for querying the set of records, including by permitting the user to view more than one record at a time within said web browser.

2. The method of claim 1, wherein said data fields include a single numerical entry field.

3. The method of claim 2 wherein said single numerical entry field is an identification number used by the United States Patent & Trademark office to designate a serial number for an application, a control number for a reexamination, a patent number or a publication number.

4. The method of claim 1 further including steps: identifying text content associated with image files in said records; and permitting a user to search said text as part of a query in said second interface.

5. A method of operating an access computing system under control of a first entity comprising:

configuring a first access server computing system and a first database coupled to said first access server under control of said first entity;

using said first access computing system to access a set of records maintained by a target computing system in a second database over an internet based network, said second database being configured and controlled by a second entity to respond to a user query for said records over said network using a first query protocol presented in a first browser interface which restricts access to no more than one record at one time in response to a single query parameter specified by a user;

wherein said first access computing system accesses said target computing system through an Internet browser interface based on emulating a user providing said user query, including by automatically passing a plurality of single locator identifier parameters to said first query protocol sequentially in time to retrieve a corresponding plurality of records in said set of records;

automatically generating a prioritized schedule with said first access computing system identifying an ordering for accessing said set of records, which prioritized schedule is based in part on both the following operations:

a) processing and identifying a likelihood of new data appearing within said set of records based on historical analysis of data change patterns in said records in said database including computed correlations of occurrence and timing between distinct successive events in such records;

b) processing and identifying a likelihood of user interest in selected ones of said set of records based on historical analysis of user access, including other users of the access computing system, to such set of records;

wherein said plurality of records are retrieved one at a time automatically by said first access computing system in accordance with said prioritized schedule;

storing said set of records in said first database;

providing a second query protocol presented in a second browser interface to make said set of records accessible at said first access server computing system;

wherein said second query protocol permits multiple records to be retrieved and presented in response to a single query presented to said first access server computing system;

automatically updating said first database in response to changes in said second database in accordance with said priority schedule on a periodic basis.

6. The method of claim 5 wherein said periodic basis is at least daily and said updating occurs in periods during which said target computing system is determined to have a lesser processing load.

7. The method of claim 5 wherein said priority schedule is determined by ranking records in said second database in accordance with a likelihood of a specific target event occurring for said records, which target event includes a notice of allowance and/or abandonment of a patent application.

8. The method of claim 5 further including a step:

generating an alert to one or more users in response to detecting one or more updates matching said users' alert criteria, which criteria can include a change in a computed prediction value for an outcome in an intellectual property proceeding.

9. The method of claim 8 wherein said alert criteria include one of the following events: a) a patent being abandoned; b) a patent likely to go abandoned; c) a patent application being abandoned; d) a patent application likely to be abandoned; e) a patent application to issued; f) a patent application likely to be issued; g) an entity status change; h) a change in attorneys; i) a rejection of the claims.

10. The method of claim 5, further including a step:

defining a queue of requests for said priority schedule used by said first access computing system for retrieving said corresponding plurality of records, which queue is serviced with separate individual automated requests to the target computing system through injected code.

11. The method of claim 10 wherein said queue includes a list of one or more of the following: patent application numbers, patent reexamination numbers, or patent numbers.

12. The method of claim 10 wherein said queue of requests is prioritized based on recent activity detected in said set of records.

13. The method of claim 10 wherein said queue of requests is made to a patent information retrieval (PAIR) database, an assignment database, a maintenance fee database, or an appeals board decision database.

14. The method of claim 10 further including a step: measuring a response time or availability of said target computing system and adjusting said first access computing system access to said target computing system based on results of said measuring.

15. A system for indirectly analyzing and predicting behavior of a target organization, which target organization processes input submissions from third parties using a staff of human personnel in accordance with a first rule set to generate output events, the system comprising:

a first access server computing system and a first database operatively connected to a network;

first module for configuring said first access server computing system and said first database under control of said first entity;

a second module adapted to use said first access computing system to access a set of records maintained by a target computing system in a second database over an internet based network, said second database being configured and controlled by a second entity to respond to a user query for said records over said network using a first query protocol presented in a first browser interface which restricts access to no more than one record at one time and further constrains the user to view only a single record at a time within a web browser;

said second module also adapted to automatically generate a prioritized schedule identifying an ordering for accessing said set of records, which prioritized schedule is based in part on both the following operations:

a) processing and identifying a likelihood of new data appearing within said set of records based on historical analysis of data change patterns in said records in said database including computed correlations of occurrence and timing between distinct successive events in such records;

b) processing and identifying a likelihood of user interest in selected ones of said set of records based on historical analysis of user access, including other users of the access computing system, to such set of records;

said second module being further adapted to automatically retrieve said set of records in accordance with said prioritized schedule by automatically generating queries with the access computing system that emulate a user accessing said records using said first query protocol;

wherein said first access computing system accesses said target computing system by automatically generating queries through an Internet browser interface based on emulating said user query, including by automatically passing a plurality of single locator identifier fields to said first query protocol to retrieve a corresponding plurality of records in said set of records;

a third module for storing said set of records in said first database;

wherein said second module is adapted to automatically update said first database in response to changes detected in said second database in accordance with said priority schedule on a periodic basis;

a fourth module adapted to retrieve and present multiple ones of said set of records in response to a single query presented to said first access server computing system.

16. A method of operating an access computing system under control of a first entity comprising:

configuring a first access server computing system and a first database coupled to said first access server under control of said first entity;

using said first access computing system to access a set of records maintained by a target computing system in a second database over an internet based network, said second database being configured and controlled by a second entity to respond to a user query for said records over said network using a first query protocol presented in a first browser interface which restricts access to no more than one record at one time in response to a single query parameter specified by a user;

wherein said first access computing system accesses said target computing system through an Internet browser interface based on emulating a user providing said user query, including by automatically passing a plurality of single locator identifier parameters to said first query protocol sequentially in time to retrieve a corresponding plurality of records in said set of records;

automatically generating a prioritized schedule with said first access computing system identifying an ordering for accessing said set of records, which prioritized schedule is based in part on both the following operations:

a) processing and identifying a likelihood of new data appearing within said set of records based on historical analysis of data change patterns in said records in said database including computed correlations of occurrence and timing between distinct successive events in such records;

b) processing and identifying a likelihood of user interest in selected ones of said set of records based on historical analysis of user access, including other users of the access computing system, to such set of records;

wherein said plurality of records are retrieved one at a time automatically by said first access computing system in accordance with said prioritized schedule;

storing said set of records in said first database;

providing a second query protocol presented in a second browser interface to make said set of records accessible at said first access server computing system;

wherein said second query protocol permits multiple records to be retrieved and presented in response to a single query presented to said first access server computing system;

automatically updating said first database in response to changes in said second database in accordance with said priority schedule on a periodic basis which is at least daily.

17. A method of operating an access computing system under control of a first entity comprising:

configuring a first access server computing system and a first database coupled to said first access server under control of said first entity;

using said first access computing system to access a set of records maintained by a target computing system in a second database over an internet based network, said second database being configured and controlled by a second entity to respond to a user query for said records over said network using a first query protocol presented in a first browser interface which restricts access to no more than one record at one time in response to a single query parameter specified by a user;

wherein said first access computing system accesses said target computing system through an Internet browser interface based on emulating a user providing said user query, including by automatically passing a plurality of single locator identifier parameters to said first query protocol sequentially in time to retrieve a corresponding plurality of records in said set of records;

automatically generating a prioritized schedule with said first access computing system identifying an ordering for accessing said set of records, which prioritized schedule is based in part on the following operations:

a) processing and identifying a likelihood of new data appearing within said set of records based on historical analysis of data change patterns in said records in said database including computed correlations of occurrence and timing between distinct successive events in such records;

b) processing and identifying a likelihood of user interest in selected ones of said set of records based on historical analysis of user access, including other users of the access computing system, to such set of records;

c) processing and ranking records in said second database in accordance with a likelihood of a specific target event occurring for said records;

wherein said plurality of records are retrieved one at a time automatically by said first access computing system in accordance with said prioritized schedule;

storing said set of records in said first database;

providing a second query protocol presented in a second browser interface to make said set of records accessible at said first access server computing system;

wherein said second query protocol permits multiple records to be retrieved and presented in response to a single query presented to said first access server computing system;

automatically updating said first database in response to changes in said second database in accordance with said priority schedule on a periodic basis.

18. A method of operating an access computing system under control of a first entity comprising:

configuring a first access server computing system and a first database coupled to said first access server under control of said first entity;

using said first access computing system to access a set of records maintained by a target computing system in a second database over an internet based network, said second database being configured and controlled by a second entity to respond to a user query for said records over said network using a first query protocol presented in a first browser interface which restricts access to no more than one record at one time in response to a single query parameter specified by a user;

wherein said first access computing system accesses said target computing system through an Internet browser interface based on emulating a user providing said user query, including by automatically passing a plurality of single locator identifier parameters to said first query protocol sequentially in time to retrieve a corresponding plurality of records in said set of records;

automatically generating a prioritized schedule with said first access computing system identifying an ordering for accessing said set of records, which prioritized schedule is based in part on both the following operations:

a) processing and identifying a likelihood of new data appearing within said set of records based on historical analysis of data change patterns in said records in said database including computed correlations of occurrence and timing between distinct successive events in such records;

b) processing and identifying a likelihood of user interest in selected ones of said set of records based on historical analysis of user access, including other users of the access computing system, to such set of records;

wherein said plurality of records are retrieved one at a time automatically by said first access computing system in accordance with said prioritized schedule;

storing said set of records in said first database;

providing a second query protocol presented in a second browser interface to make said set of records accessible at said first access server computing system;

wherein said second query protocol permits multiple records to be retrieved and presented in response to a single query presented to said first access server computing system;

automatically updating said first database in response to changes in said second database in accordance with said priority schedule on a periodic basis which is at least daily;

generating an alert to one or more users in response to detecting one or more updates matching said users' alert criteria.

19. A method of operating an access computing system under control of a first entity comprising:

configuring a first access server computing system and a first database coupled to said first access server under control of said first entity;

using said first access computing system to access a set of records maintained by a target computing system in a second database over an internet based network, said second database being configured and controlled by a second entity to respond to a user query for said records over said network using a first query protocol presented in a first browser interface which restricts access to no more than one record at one time in response to a single query parameter specified by a user;

wherein said first access computing system accesses said target computing system through an Internet browser interface based on emulating a user providing said user query, including by automatically passing a plurality of single locator identifier parameters to said first query protocol sequentially in time to retrieve a corresponding plurality of records in said set of records;

automatically generating a prioritized schedule with said first access computing system identifying an ordering for accessing said set of records, which prioritized schedule is structured as a queue of requests used by said first access computing system for retrieving said corresponding plurality of records, and which is based in part on both the following operations:

a) processing and identifying a likelihood of new data appearing within said set of records based on historical analysis of data change patterns in said records in said database including computed correlations of occurrence and timing between distinct successive events in such records;

b) processing and identifying a likelihood of user interest in selected ones of said set of records based on historical analysis of user access, including other users of the access computing system, to such set of records;

wherein said plurality of records are retrieved one at a time automatically by said first access computing system in accordance with said prioritized schedule;

storing said set of records in said first database;

providing a second query protocol presented in a second browser interface to make said set of records accessible at said first access server computing system;

wherein said second query protocol permits multiple records to be retrieved and presented in response to a single query presented to said first access server computing system;

automatically updating said first database in response to changes in said second database in accordance with said priority schedule on a periodic basis.

* * * * *